US012012777B2

(12) United States Patent
Wood et al.

(10) Patent No.: US 12,012,777 B2
(45) Date of Patent: Jun. 18, 2024

(54) MERCHANDISE DISPLAY SECURITY SYSTEMS AND METHODS

(71) Applicant: InVue Security Products Inc., Charlotte, NC (US)

(72) Inventors: Ethan Evan Wood, Charlotte, NC (US); Wesley J. Blanchard, Fort Mill, SC (US); Matthew Kepner, Charlotte, NC (US)

(73) Assignee: InVue Security Products, Inc., Charlotte, NC (US)

( * ) Notice: Subject to any disclaimer, the term of this patent is extended or adjusted under 35 U.S.C. 154(b) by 236 days.

(21) Appl. No.: 17/826,022

(22) Filed: May 26, 2022

(65) Prior Publication Data

US 2022/0381066 A1 Dec. 1, 2022

Related U.S. Application Data

(60) Provisional application No. 63/194,329, filed on May 28, 2021.

(51) Int. Cl.
*E05B 47/00* (2006.01)
*G07C 9/00* (2020.01)

(52) U.S. Cl.
CPC ...... *E05B 47/0012* (2013.01); *G07C 9/00182* (2013.01); *E05B 2047/0017* (2013.01); *E05B 2047/002* (2013.01); *E05B 2047/0024* (2013.01)

(58) Field of Classification Search
CPC ................. E05B 47/00; E05B 47/0012; E05B 2047/0013; E05B 2047/0015–0018;
(Continued)

(56) References Cited

U.S. PATENT DOCUMENTS 5,845,523 A * 12/1998 Butterweck ............. E05B 41/00 292/144
5,848,541 A 12/1998 Glick et al.
(Continued)

FOREIGN PATENT DOCUMENTS

CA 2409851 A1 11/2001
EP 2290939 A1 3/2011
(Continued)

OTHER PUBLICATIONS

The International Search Report and The Written pinion from corresponding International Application No. PCT/US22/031194, dated Aug. 24, 2022 (11 pages).
(Continued)

*Primary Examiner* — Nathan Cumar
(74) *Attorney, Agent, or Firm* — InVue Security Products Inc.

(57) ABSTRACT

Security systems and methods are provided. In one example, a security system includes at least one lock configured to protect one or more items from theft from the fixture, wherein the lock comprises a plunger pin configured to be moved between a latched position and an unlatched position, and wherein the fixture is configured to be accessed in the unlatched position. The lock comprises a cam configured to be moved between a locked state and an unlocked state for allowing the plunger pin to be moved between the latched position and the unlatched position when in the unlocked state, wherein the cam is configured to be moved in response to receiving a wireless authorization signal to transition the lock between the locked state and the unlocked state.

39 Claims, 51 Drawing Sheets

(58) Field of Classification Search
CPC ........ E05B 2047/002; E05B 2047/0021–0025; G07C 9/00; G07C 9/00182; G07C 2009/0019; G07C 2009/00198; G07C 2009/00206; G07C 2009/00214; G07C 2009/00222
USPC ........................................................... 70/277
See application file for complete search history.

(56) References Cited

U.S. PATENT DOCUMENTS

| | | | |
|---|---|---|---|
| 5,933,086 A | 8/1999 | Tischendorf et al. | |
| 6,967,562 B2 | 11/2005 | Menard et al. | |
| 6,975,202 B1 | 12/2005 | Rodriguez et al. | |
| 7,027,808 B2 | 4/2006 | Wesby | |
| 7,089,035 B2 | 8/2006 | Ando et al. | |
| 7,098,791 B2 | 8/2006 | Okada | |
| 7,520,152 B2 | 4/2009 | Sabo et al. | |
| 7,558,564 B2 | 7/2009 | Wesby | |
| 7,694,542 B2 | 4/2010 | Loughlin et al. | |
| 7,737,844 B2 | 6/2010 | Scott et al. | |
| 7,937,070 B2 | 5/2011 | Stendal | |
| 8,457,622 B2 | 6/2013 | Wesby | |
| 8,487,756 B2 | 7/2013 | Karr | |
| 8,733,138 B2 * | 5/2014 | Favier | E05B 73/0035 70/57.1 |
| 8,860,574 B2 | 10/2014 | Grant et al. | |
| 9,057,210 B2 | 6/2015 | Dumas et al. | |
| 9,097,037 B2 | 8/2015 | McKibben et al. | |
| 9,118,701 B2 | 8/2015 | Wesby | |
| 9,133,649 B2 * | 9/2015 | Taylor | E05B 73/00 |
| 9,218,696 B2 | 12/2015 | Dumas et al. | |
| 9,270,755 B2 | 2/2016 | Forrest et al. | |
| 9,322,194 B2 | 4/2016 | Cheng et al. | |
| 9,322,201 B1 | 4/2016 | Cheng et al. | |
| 9,353,551 B2 | 5/2016 | Martinez et al. | |
| 9,359,794 B2 | 6/2016 | Cheng | |
| 9,470,017 B1 | 10/2016 | Cheng et al. | |
| 9,487,972 B2 | 11/2016 | Vetter et al. | |
| 9,512,643 B1 | 12/2016 | Keefe | |
| 9,528,296 B1 | 12/2016 | Cheng et al. | |
| 9,530,295 B2 | 12/2016 | Johnson | |
| 9,534,420 B1 | 1/2017 | Cheng et al. | |
| 9,574,372 B2 | 2/2017 | Johnson et al. | |
| 9,624,695 B1 | 4/2017 | Cheng et al. | |
| 9,644,399 B2 | 5/2017 | Johnson et al. | |
| 9,647,996 B2 | 5/2017 | Johnson et al. | |
| 9,652,917 B2 | 5/2017 | Johnson et al. | |
| 9,663,972 B2 | 5/2017 | Ulrich et al. | |
| 9,683,391 B2 | 6/2017 | Johnson et al. | |
| 9,683,392 B1 | 6/2017 | Cheng et al. | |
| 9,685,015 B2 | 6/2017 | Johnson et al. | |
| 9,704,320 B2 | 7/2017 | Johnson et al. | |
| 9,708,833 B2 | 7/2017 | Scheffler et al. | |
| 9,718,440 B2 | 8/2017 | Kim et al. | |
| 9,725,927 B1 | 8/2017 | Cheng | |
| 9,727,328 B2 | 8/2017 | Johnson | |
| 9,786,140 B2 | 10/2017 | Henson et al. | |
| 9,916,746 B2 | 3/2018 | Johnson et al. | |
| 10,017,963 B2 | 7/2018 | Johnson et al. | |
| 10,178,533 B2 | 1/2019 | Saldin et al. | |
| 10,210,681 B1 | 2/2019 | Grant et al. | |
| 10,258,172 B2 | 4/2019 | Grant et al. | |
| 10,378,241 B2 | 8/2019 | Al-Kahwati et al. | |
| 10,443,266 B2 | 10/2019 | Johnson et al. | |
| 10,487,543 B2 | 11/2019 | Sanford et al. | |
| 10,515,496 B2 | 12/2019 | Zabaleta et al. | |
| 10,648,197 B2 | 5/2020 | Zheng et al. | |
| 10,691,953 B2 | 6/2020 | Johnson et al. | |
| 10,783,731 B2 | 9/2020 | Imanuel | |
| 10,801,235 B2 | 10/2020 | Brown et al. | |
| 10,900,259 B2 | 1/2021 | Russo et al. | |
| 11,361,635 B2 | 6/2022 | Baker et al. | |
| 2001/0029760 A1 | 10/2001 | Viney | |
| 2004/0201449 A1 | 10/2004 | Denison et al. | |
| 2005/0210283 A1 | 9/2005 | Kato | |
| 2007/0247276 A1 | 10/2007 | Murchison et al. | |
| 2008/0236214 A1 | 10/2008 | Han | |
| 2012/0047972 A1 | 3/2012 | Grant et al. | |
| 2012/0280790 A1 | 11/2012 | Gerhardt et al. | |
| 2015/0013398 A1 * | 1/2015 | Taylor | E05B 47/0001 70/20 |
| 2015/0194002 A1 | 7/2015 | Kaczmarz et al. | |
| 2016/0189454 A1 * | 6/2016 | Johnson | H04W 4/80 340/5.61 |
| 2016/0222699 A1 | 8/2016 | Grant et al. | |
| 2016/0319571 A1 | 11/2016 | Johnson | |
| 2016/0335859 A1 | 11/2016 | Sankey | |
| 2017/0193724 A1 * | 7/2017 | Johnson | G07C 9/00309 |
| 2018/0073274 A1 | 3/2018 | Johnson et al. | |
| 2018/0075679 A1 * | 3/2018 | Niroomand | G07C 9/00944 |
| 2018/0094455 A1 * | 4/2018 | Johnston | E05B 15/0205 |
| 2018/0135336 A1 | 5/2018 | Johnson et al. | |
| 2018/0135337 A1 | 5/2018 | Johnson et al. | |
| 2018/0179786 A1 | 6/2018 | Johnson | |
| 2018/0365948 A1 | 12/2018 | Grant et al. | |
| 2019/0057566 A1 | 2/2019 | Mlynarczyk et al. | |
| 2019/0145130 A1 | 5/2019 | Affan et al. | |
| 2019/0169874 A1 | 6/2019 | Gengler et al. | |
| 2019/0218825 A1 | 7/2019 | Shiner et al. | |
| 2020/0239207 A1 | 7/2020 | Bontempo et al. | |
| 2020/0242868 A1 | 7/2020 | Gengler et al. | |
| 2021/0005036 A1 | 1/2021 | Johnson et al. | |
| 2021/0034882 A1 | 2/2021 | Johnson et al. | |

FOREIGN PATENT DOCUMENTS

| | | | |
|---|---|---|---|
| EP | 1506667 | B1 | 12/2014 |
| EP | 2985987 | A1 | 2/2016 |
| WO | 2001091428 | A2 | 11/2001 |
| WO | 2005041158 | A1 | 5/2005 |
| WO | 2019221772 | A1 | 11/2019 |
| WO | 2020227513 | A1 | 5/2020 |

OTHER PUBLICATIONS

"Wi-Fi Gateway Remotely Control Bluetooth Smart Door Lock", Product Information, 9 pages, Nyboer, retrieved Mar. 1, 2021 (available at www.amazon.com).
U.S. Appl. No. 17/668,931, filed Feb. 10, 2022.
U.S. Appl. No. 17/825,802, filed May 26, 2022.
U.S. Appl. No. 17/825,821, filed May 26, 2022.

* cited by examiner

MERCHANDISE DISPLAY SECURITY SYSTEMS AND METHODS

CROSS REFERENCE TO RELATED APPLICATIONS

This application claims the benefit of priority to U.S. Provisional Application No. 63/194,329, filed on May 28, 2021, the entire contents of which are hereby incorporated by reference.

FIELD OF THE INVENTION

Embodiments of the present invention relate generally to security systems, locks, devices, computer program products, and methods for protecting items from theft and/or the exchange of various types of information in a wireless network.

BACKGROUND OF THE INVENTION

It is common practice for retailers to display relatively small, relatively expensive items of merchandise on a security device, such as a display hook or a display fixture, within security packaging commonly referred to as a "safer", or otherwise on a display surface. The security device or safer displays an item of merchandise so that a potential purchaser may examine the item when deciding whether to purchase the item. The small size and relative expense of the item, however, makes the item an attractive target for shoplifters. A shoplifter may attempt to detach the item from the security device, or alternatively, may attempt to remove the security device from the display area along with the merchandise. Items of merchandise may also be secured using a display stand to allow users to sample the item for potential purchase. In some instances, the security device is secured to a display support using a lock operated by a key, for example, a mechanical lock. In other instances, the security device is secured to the display support using a lock operated by an electronic key to arm and disarm the security device.

BRIEF SUMMARY

Embodiments of the present application are directed towards security systems and methods for protecting items from theft. In one embodiment a security system for a fixture is provided and includes at least one lock configured to protect one or more items from theft from the fixture. The lock comprises a plunger pin configured to be moved between a latched position and an unlatched position, and the fixture is configured to be accessed in the unlatched position. The lock comprises a cam configured to be moved between a locked state and an unlocked state for allowing the plunger pin to be moved between the latched position and the unlatched position when in the unlocked state. The cam is configured to be moved in response to receiving a wireless authorization signal to transition the lock between the locked state and the unlocked state. In another embodiment, the system includes a portable computing device configured to provide the wireless authorization signal.

In another embodiment, a method for securing items from theft from a fixture is provided and includes mounting at least one lock to a fixture configured to protect one or more items from theft, wherein the lock comprises a cam configured to be moved between a locked state and an unlocked state and a plunger pin. The method further includes causing a wireless authorization signal to be transmitted to the lock to move the cam and thereby transition the lock from the locked state to the unlocked state. The method also includes moving the plunger pin from a latched position to an unlatched position while the lock is in the unlocked state, the fixture configured to be accessed in the unlatched position.

DETAILED DESCRIPTION OF EMBODIMENTS OF THE INVENTION

The following disclosure includes various embodiments of systems, devices, methods, and computer program products. It should be understood that any combination of embodiments disclosed herein have been envisioned. Thus, discussion of one particular embodiment is not intended to be made at the exclusion of any other embodiments.

Referring now to the associated figures, one or more embodiments of a security system are shown. In the embodiments shown and described herein, the system includes an electronic key and a merchandise security device. Examples of merchandise security devices suitable for use with the electronic keys include, but are not limited to, a security display (e.g. alarming stand or device), security fixture (e.g. locking hook, shelf, cabinet, etc.), cabinet locks, door locks, cable wraps, cable locks, or security packaging (e.g. merchandise keeper) for an item of merchandise. However, an electronic key (also referred to herein as a programmable key or generally as a key) may be useable with any security device or locking device that utilizes power transferred from the key to operate a mechanical and/or electronic lock mechanism and/or utilizes data transferred from the key to authorize the operation of a lock mechanism and/or arming or disarming an alarm circuit. In other words, an electronic key is useable with any security device or locking device that requires power transferred from the key to the device and/or data transferred from the key to the device. Further examples of security devices and locking devices include, but are not limited to, a door lock, a drawer lock or a shelf lock, as well as any device that prevents an unauthorized person from accessing, removing or detaching an item from a secure location or position. Although the following discussion relates to a system for use in a retail store, it is understood that the system is also suitable for other industries, such as hospital, restaurants, etc. In some embodiments, the merchandise security systems, merchandise security devices, and electronic keys are similar to those disclosed in U.S. application Ser. No. 17/668,931, entitled Merchandise Display Security Systems and Methods, PCT Publication WO 2020/227513 (and related U.S. application Ser. No. 17/261,757), entitled Merchandise Display Security Systems and Methods, U.S. Publication No. 2012/0047972, entitled Electronic Key for Merchandise Security Device, U.S. Pat. No. 10,258,172, entitled Systems and Methods for Acquiring Data from Articles of Merchandise on Display, U.S. Pat. No. 10,210,681, entitled Merchandise Display Security Systems and Methods, U.S. Publ. No. 2018/0365948, entitled Tethered Security System with Wireless Communication, and U.S. Publication No. 2016/0335859, entitled Systems and Methods for Remotely Controlling Security Devices, the entire disclosures of which are incorporated herein by reference in their entirety.

Figure 1:
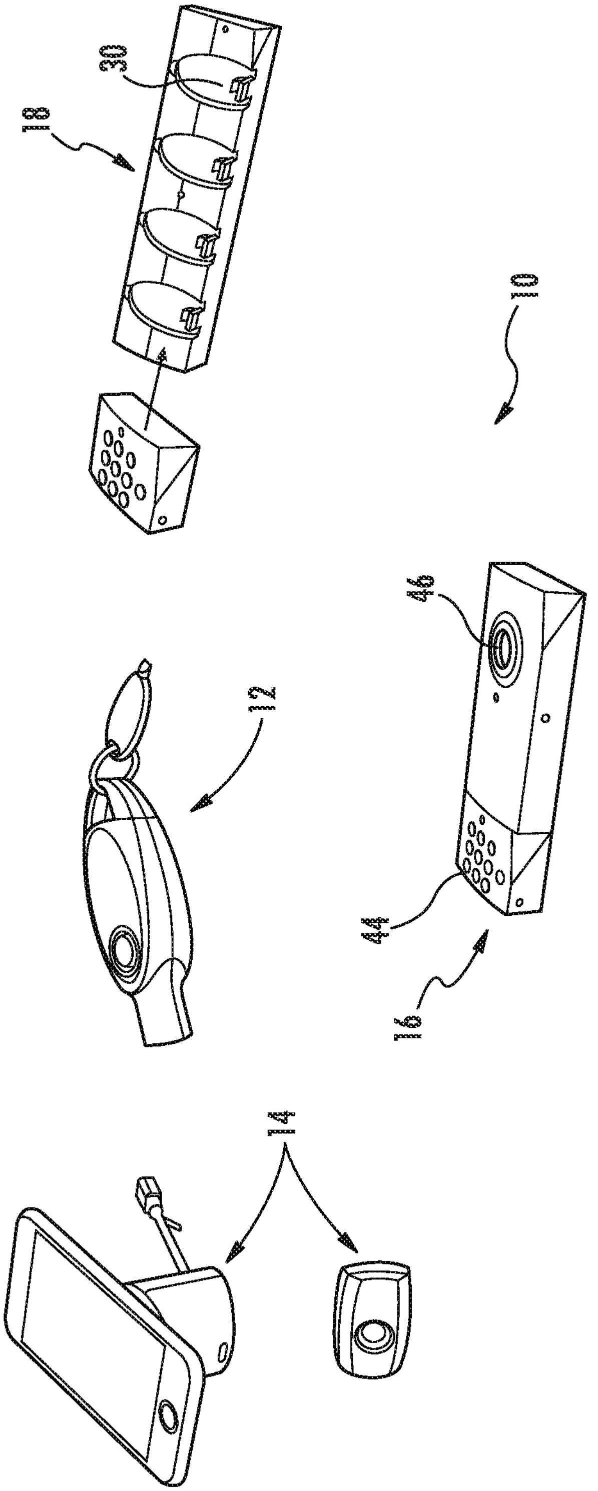
FIG. 1 illustrates a merchandise security system according to one embodiment of the present invention.
Figure 2:
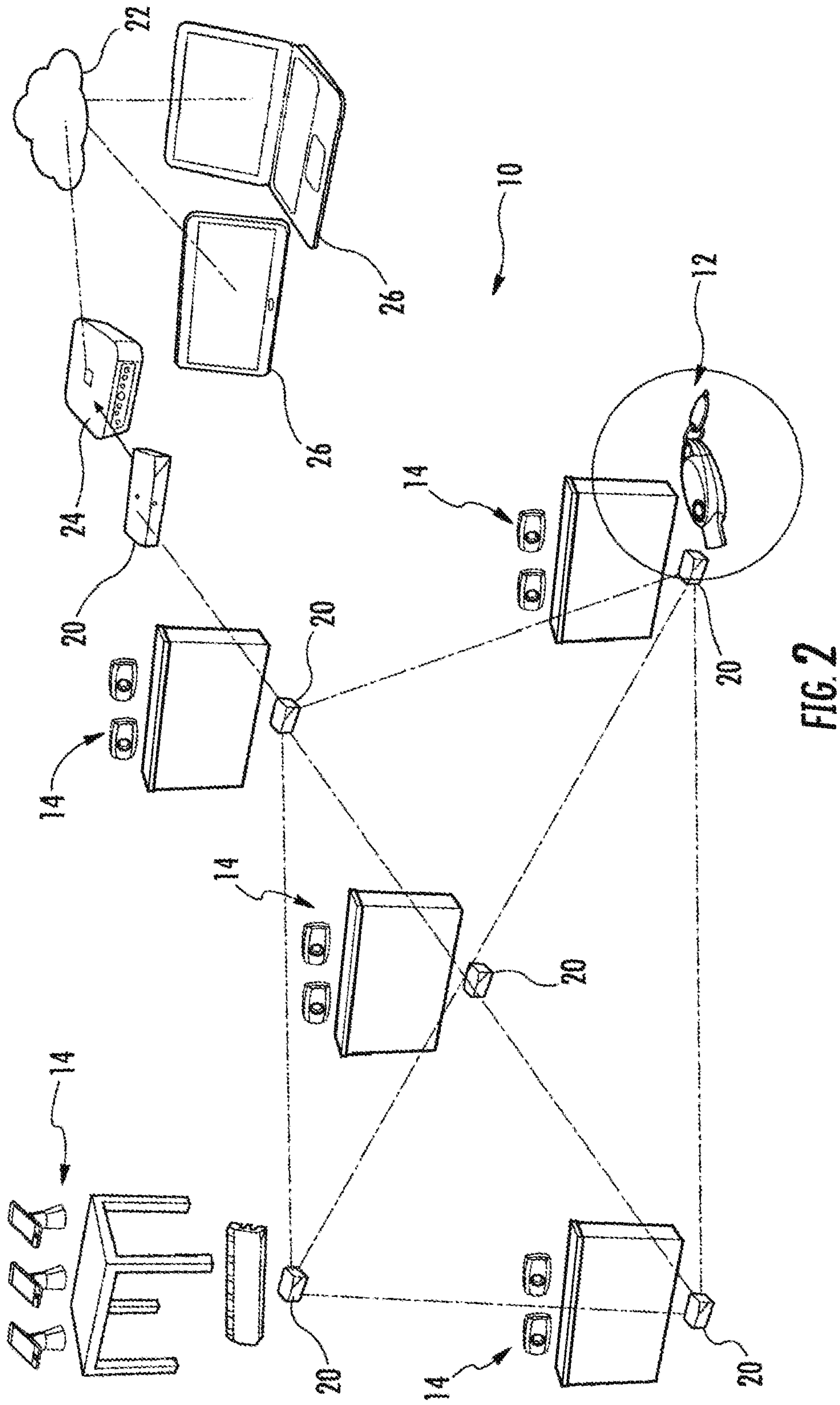
FIG. 2 illustrates a merchandise security system according to another embodiment of the present invention.

FIG. 1 illustrates one embodiment of a system 10. In this embodiment, the system generally includes an electronic key 12, one or more merchandise security devices 14, a programming or authorization station 16, and a charging station 18. FIG. 2 shows an embodiment of a system 10 that is part of a network of merchandise security devices. According to some embodiments, the network enables communication between a plurality of electronic keys and merchandise security devices. The network may be cloud-based and include a cloud 22 for receiving data from, and/or providing data to, the electronic keys and/or merchandise security devices. The cloud 22 may facilitate communication with one or more computing devices 26 (e.g., a mobile device, tablet, or computer). For example, the cloud 22 may be used to transfer data to one or more remote locations or computing devices 26 where the data may be reviewed and analyzed. The computing devices 26 may be located at any desired location, such as in the same retail store as the security devices 14 and/or electronic keys 12. In some cases, the computing device 26 may belong to a retail store associate (e.g., a mobile device) or be a backend computer used by a retailer or corporation. The network may be a wireless network including a plurality of nodes 20 that are configured to communicate with one another, one or more electronic keys 12, and/or one or more merchandise security devices 14. The network may be any suitable network for facilitating wireless communication such as, for example, a mesh, star, multiple star, repeaters, IoT, etc. networks. The nodes 20 and/or security devices 14 may be located within one or more zones. In some cases, the nodes and the security devices may be integrated with one another such that the security device operates as a node. A gateway 24 or hub or "host" may be employed to allow for communication between the one or more nodes 20 and the cloud 22. In some embodiments, all communication within the network is wireless, such as via radio-frequency signals (e.g., Sub GHz ISM band or 2.4 GHz), Bluetooth, LoRa, and Wi-Fi, although other types of wireless communication may be possible.

Figure 3:
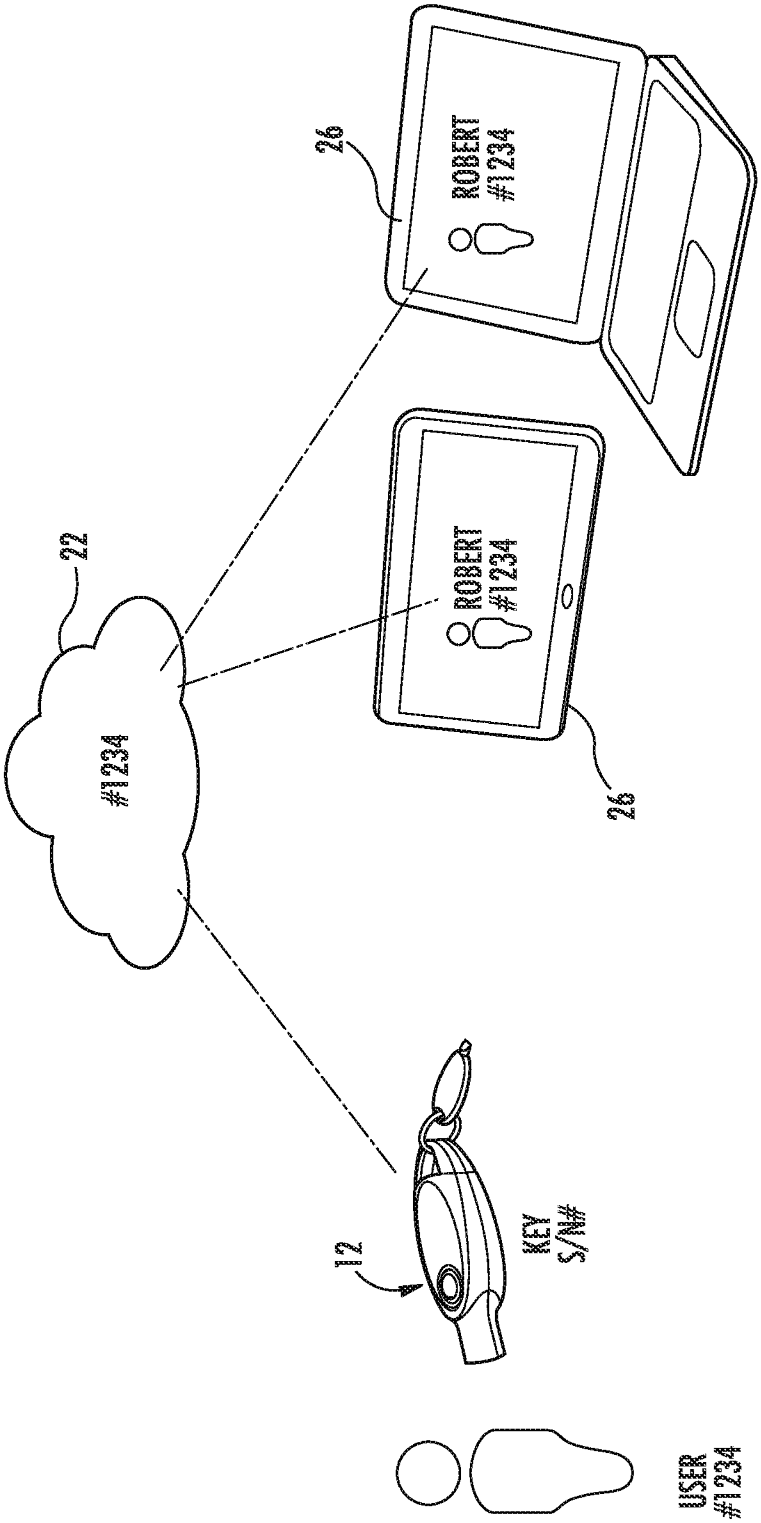
FIG. 3 illustrates a key in communication with a remote device via a cloud according to one embodiment.

In some embodiments, each merchandise security device 14 and/or electronic key 12 is configured to store various types of data. For example, each merchandise security device 14 and/or key 12 may store a serial number of one or more merchandise security devices 14, a serial number of one or more items of merchandise, the data and time of activation of the key, a user of the key, a serial number of the key, a location of the security device, a location of the item of merchandise, a department number within a retail store, number of key activations, a type of activation (e.g., "naked" activation, activation transferring only data, activation transferring power, activation transferring data and power), and/or various events (e.g., a merchandise security device has been locked, unlocked, armed, or disarmed). For instance, FIG. 3 shows that the identity of a user of an electronic key 12 may be communicated to a remote location or device 26. This information may be transmitted to the remote location or device 26 upon each activation of the key 12 or at any other desired period of time, such as upon communication with a programming or authorization station 16. Thus, the data transfer from the electronic key 12 and/or security device 14 may occur in real time or automatically in some embodiments. In some cases, the electronic key 12, security device 14, and/or programming station 16 may be configured to store the data and transfer the data to a remote location or device 26. Authorized personnel may use this data to take various actions using the computing device 26, such as to audit and monitor associate activity, authorize or deauthorize particular keys 12, determine the battery life of a key 12, audit merchandise security devices 14 (e.g., ensure the security devices are locked or armed), arm or disarm the security device, lock or unlock the security device, lock or unlock a sensor 25 attached to an item of merchandise to a base or stand 35 removably supporting the sensor, etc. (see, e.g., FIG. 30). Moreover, such information may be requested and obtained on demand using the computing device 26, such as from the electronic keys 12, security devices 14, and/or the programming station 16.

In some cases, the data may include battery analytics of an electronic key 12. For example, the battery analytics may include monitoring the battery voltage of an electronic key 12 when the key is placed on a charging station 18 and the time taken to reach full charge. These values may be used to determine depth of discharge. The battery analytics may be indicative of a battery that is nearing its end of life. A retailer or other authorized personnel may take various actions using this information, such as replacing the key or disabling the key to prevent battery swelling and housing failure.

In one embodiment, the electronic key 12 is configured to obtain data from a merchandise security device 14 (e.g., a security fixture). For example, the merchandise security device 14 may store various data regarding past communication with a previous electronic key 12 (e.g., key identification, time of communication, etc.), and when a subsequent electronic key communicates with the same merchandise security device, the data is transferred to the electronic key. Thus, the merchandise security device 14 may include a memory for storing such data. In some cases, the merchandise security device 14 includes a power source for receiving and storing the data, while in other cases, the power provided by the electronic key 12 is used for allowing the merchandise security device to store the data. The electronic key 12 may then communicate the data for collection and review, such as at a remote location or device 26. In some instances, communication between the electronic key 12 and the programming or authorization station 16 may allow data to be pulled from the electronic key and communicated, such as to a remote location or device 26. In other cases, the electronic key 12 may be configured to obtain data from merchandise security devices 14 (e.g., a security display), such as an identification of the merchandise security device, the type of item of merchandise on display, an identification of the item of merchandise, and/or the system health of the security device and/or the item of merchandise. The electronic key 12 may store the data and provide the data to a remote location or device 26 directly or upon communication with the programming or authorization station 16. As such, the electronic keys 12 may be a useful resource for obtaining various types of data from the merchandise security devices 14 without the need for wired connections or complex wireless networks or systems.

In one embodiment, the security device 14 may communicate its identifier using various techniques. For example, in some cases the security device 14 may have a memory configured to store a serial number and is able to communicate that serial number to the electronic key 12 using bi-directional communication. In instances where the security device 14 may not have a memory, power source, and/or the ability for bi-directional communication (e.g., a cable wrap or locking hook), the security device may have an RFID tag, an NFC tag, or the like that stores an identifier for the security device (e.g., a serial number). Such security devices may be similar to that disclosed in U.S. Pat. No. 9,133,649, entitled Merchandise Security Devices for Use with an Electronic Key, the entire disclosure of which is incorporated herein by reference in their entirety. In some examples, the tag may be attachable (e.g., via adhesive) to existing security devices 14 such that it is readily adaptable to current devices, or the tag may be integrated within the security device. The electronic key 12 may be configured to deliver power to the tag to read the identifier of the tag, such as for a passive tag, although the tags may be passive or active. The electronic key 12 may store a number of authorized identifiers in memory (e.g., via a look-up table) and may then determine if the read identifier is in its memory. Alternately, the electronic key 12 may be configured to wirelessly connect to a network device 26 with a look-up table. Either the electronic key 12 itself or the network device 26 can then determine if the particular key or user of that key is authorized to unlock the security device 14 with the read identifier. The identifier may be unique to the security device 14 or may be a more generic identifier, such as for example, a "6-sided box" or a department such as "healthcare" or all of the above. Once authorization has been obtained, only then will the electronic key be capable of delivering power to the security device 14 to successfully operate the lock and unlock it. If there is no authorization, the electronic key 12 does not continue this cycle, and the lock never unlocks. Thus, embodiments of the present invention may be configured to communicate with any type of security device 14 for performing various auditing, zone control, and planogram analysis based on identification of the security device.

In one embodiment, the electronic key 12 and security device 14 may communicate with one another via NFC to transmit data when the key and security device are positioned near one another or in direct contact with one another. An NFC tag may include various components, such as an antenna or a coil and one or more chips that define an electrical circuit. The antenna may be used for effectuating communication with an electronic key 12, which may be activated via a magnetic field. For example, a magnetic field may be generated by the electronic key 12 to communicate with an NFC tag.

In some embodiments where the electronic key 12 is configured to transfer power inductively, as explained in further detail below, and is equipped to communicate using NFC or RFID, the inductive coil of the key may be configured to use the same coil for both data transfer and power transfer. In some cases, the electronic key 12 is configured to switch the coil between an energy transfer mode and an NFC or RFID receiver circuit. In other examples, a plurality of security devices 14 may be "nested" with one another such that authorization to one of the nested security devices results in all security devices being disarmed or unlocked. For instance, a plurality of locks could be paired to one another such that successful communication between any one of the locks and the electronic key 12 results in all of the locks being unlocked.

In some embodiments, the merchandise security devices 14 include wireless functionality for communicating within the network. For example, the merchandise security devices may communicate wirelessly with each other, items of merchandise, electronic keys 12, computing devices 26, and/or nodes, including but not limited to communicating the various types of data discussed herein. Thus, in some cases, the computing devices 26 may communicate directly with the security devices 14 and/or electronic keys 12

One embodiment of such a wireless system includes various types of wireless networks capable of being used in conjunction with embodiments disclosed herein. In some cases, the wireless system includes fully integrated hardware, software, and data analytics which effectively eliminates or makes negligible the added hardware costs of a data integrated solution—all other features remaining constant. In some embodiments, the wireless system is configured to adapt to a changing market where an increasing number of smartphones leverage Qi based inductive charging and exposed data ports no longer exist. For instance, in an embodiment where the security device 14 includes a sensor 25 and a base or stand 35 (see, e.g., FIG. 30), the sensor may utilize Qi technology, such as a Qi coil that is configured to communicate with a corresponding coil in the item of merchandise. In addition, embodiments of the wireless system may be configured to provide a common wireless interface and IP gateway for future networked products leveraging the various wireless networks discussed herein. Various modes of operation can be implemented according to wireless system embodiments. In one example, a non-IP connected mode could be employed whereby a customer choosing not to subscribe to a SaaS service is able to leverage the wireless system's display merchandising and security features independent of a connection to an IP enabled network. Another mode may include an IP-connected mode, which may provide information, e.g., regarding security armed and power status and alarm alerts alarm activity on a local store basis. Additionally, this mode may provide access to other web applications such as product documentation, product videos, product selector guides and support contact information. An additional mode is also an IP-connected network that includes a SaaS subscription service that allows access to the full capabilities of the wireless system, such as the data communication among various devices described herein.

In some embodiments, wireless communication may occur using a proprietary wireless network, for example, each security device 14 may be configured to communicate with a central hub in a star network configuration. Each security device 14 may include a transceiver (e.g., a sub-GHz transceiver) configured to communicate data to and from a common central hub or "host" 24, such as the various types of information and data discussed herein, as well as information about power status and security breaches to the host without the need for a separate data connection to a smart hub or controller. It is understood that any number of nodes 20 could be employed to facilitate communication between the security devices 14 and the host, such one or more local nodes. In one embodiment, each security device 14 is configured to communicate its power and security status, security breaches (alarm notifications), as well as various other identification data for the security device and/or the item of merchandise, to the host 24. In some embodiments, an entire retail store may be serviced by a single host 24 without the need for repeaters and is not practically limited by the number of security devices in the network. In one embodiment, the host 24 may be configured to generate a security signal, such as an audible and/or a visible alarm signal. In some cases, the volume of the security signal is adjustable. When any security device 14 detects a security event, the security device is configured to send a signal to the host 24. The retailer has the option of choosing the level of notification for the security event, for example, a loud audible alarm, a lower volume, audible notification, or no audible alarm notification. Among other features, the system may include the ability to program alarm notifications. For instance, a retailer may choose silent alerts, optical alerts, and adjustable volume and tone audible alerts or combinations of these alerts. Additionally, the host 24 could be configured to indicate a security breach by changing colors (e.g., from gold to red and or by flashing intermittently). The audible and visual alert signals can be used independently or together.

As discussed herein, electronic keys 12 may be incorporated with the various system embodiments. Electronic keys 12 may be configured to disable any alarming security device 14 following a security event. However, the host 24 may be configured to continue to transmit a security signal, such as until the security device 14 is re-armed. Moreover, disabling a security signal on the host 24 may not affect the armed status of the remaining security devices 14 in the store, i.e., the security devices may operate one-to-one in every regard except for generation of security signals. Of course, a variety of types of electronic keys 12 as disclosed herein, including leveraging a secure application available on a smartphone, tablet or PC.

In some embodiments, a pre-emptive disarm for purposes of remerchandising items of merchandise or nightly removal of the item from an associated security device 14 may be employed. For example, a computing device 26 of the retailer (e.g., a mobile device) 26 may be configured to automatically disarm one or more security devices 14 at a predetermined period of time. In some cases, a secure software application may permit a temporary suspension of alerts for a specific position of a security device 14 for a programmable period to permit re-merchandising. One disarmed, the security device's transceiver will cease communicating until it is re-armed. For those customers operating in a "Non-IP Connected" mode can elect to silence the audible alarm of the security device 14 when remerchandising such that no audible alarm will sound, but the host may continue to generate a signal (e.g., light signal) until all security devices are re-armed.

As described herein, embodiments of the present invention may utilize a variety of wireless network configurations. In some cases, a common architecture would require two distinct network topologies. The first network may be a private wireless network for the exclusive use of the security devices 14 deployed instore. This network is separate from any private or public network operated by the retailer. The second network may be an IP Gateway between the private network and the Internet. This second network may be a connection on retailer's managed network or could be via a cellular modem. The gateway could be integrated into the host or be a separate device that connects to the host.

In some embodiments, the private network may be commonly used by all security devices 14 for internal data transfer and minimize frequency congestion for retailer managed networks. Moreover, in one example, the private network practically takes the form as a "star network"—with multiple individual nodes 20 performing individual functions and collecting and providing data. This data is wirelessly sent to and aggregated within a common "host". The host allows nodes 20 providing data wirelessly via the private network to deliver functionality and value to the customer independent of an Internet connection to a cloud-based application, such as alerting and reporting functionality. In one implementation, the host rather than the security device 14 would be configured to provide notification (e.g., in response to a security event) via audio, visual, and/or haptic response.

Various considerations may be taken into account regarding the private network. For instance, in selecting the appropriate, common network architecture for the private network, considerations of the size of the data packets and data rate required, the needed wireless range, potential for interference, power consumption, size, and/or cost of the network may be taken into account. In some applications, intermittent transmission of small data packets, with no need for higher data rates, may be used, which may benefit from a network with low power needs and long data range. Examples of private networks include various RF networks, such as Wi-Fi (2.4 GHz), Bluetooth (2.4 GHz) and Sub GHz (less than 1.0 GHz) ISM band networks. Some network stacks (controlling software) such as Zigbee and LoRa can run on both sub GHz and 2.4 GHz networks.

Figure 32:
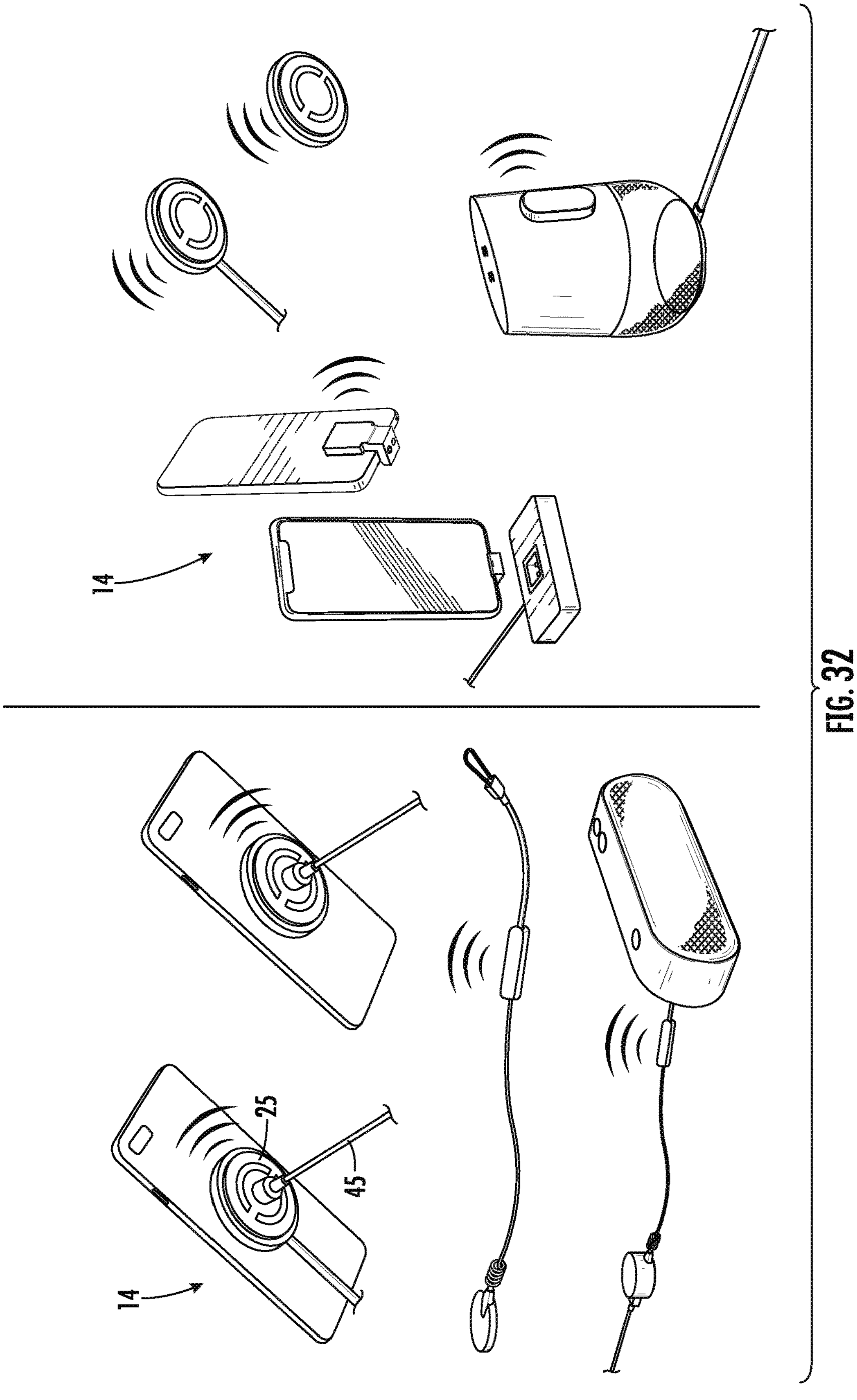
FIG. 32 shows various security devices configured for use in a wireless network according to additional embodiments.
Figure 33:
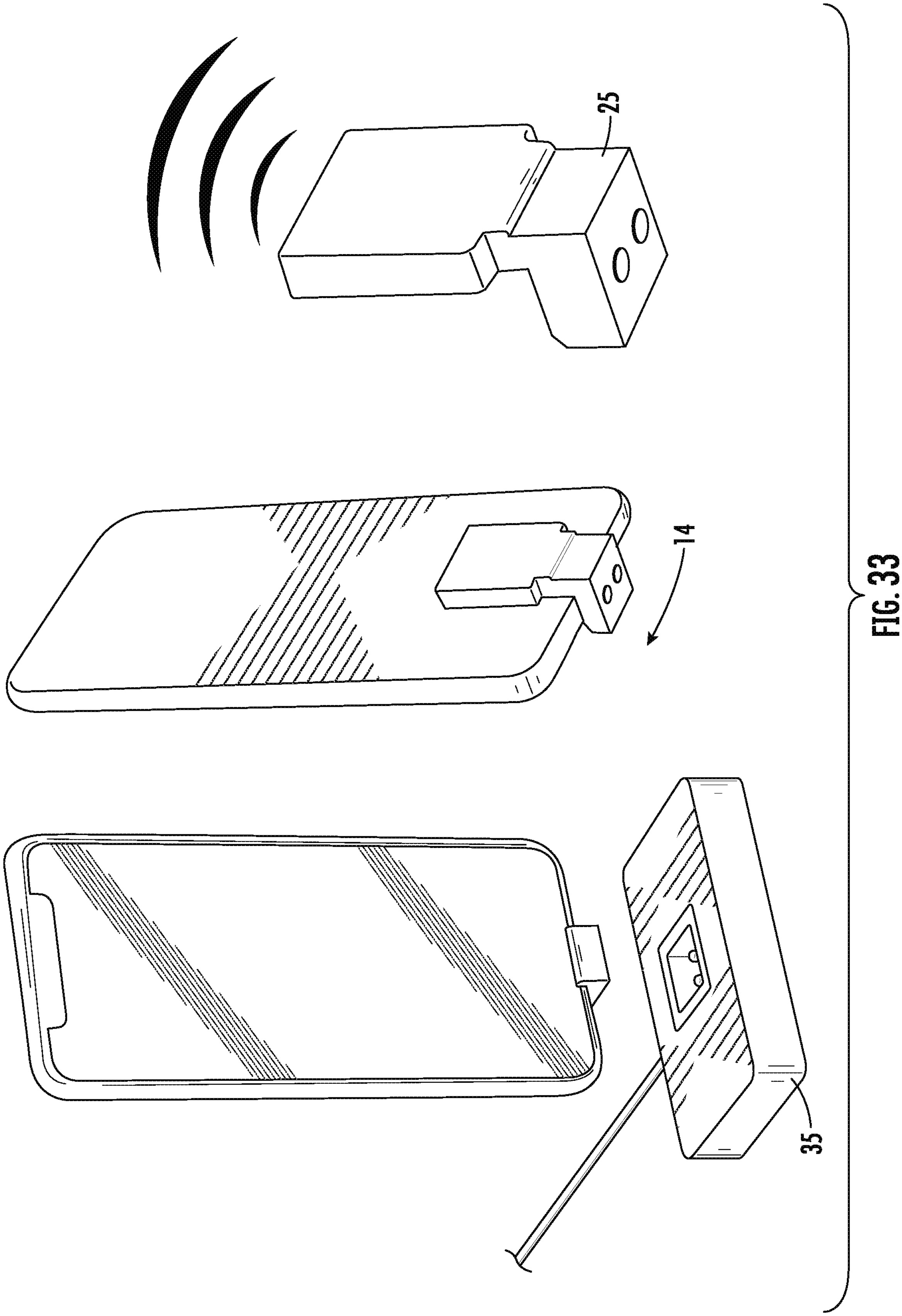
FIG. 33 shows a security device configured for use in a wireless network according to one embodiment.
Figure 34:
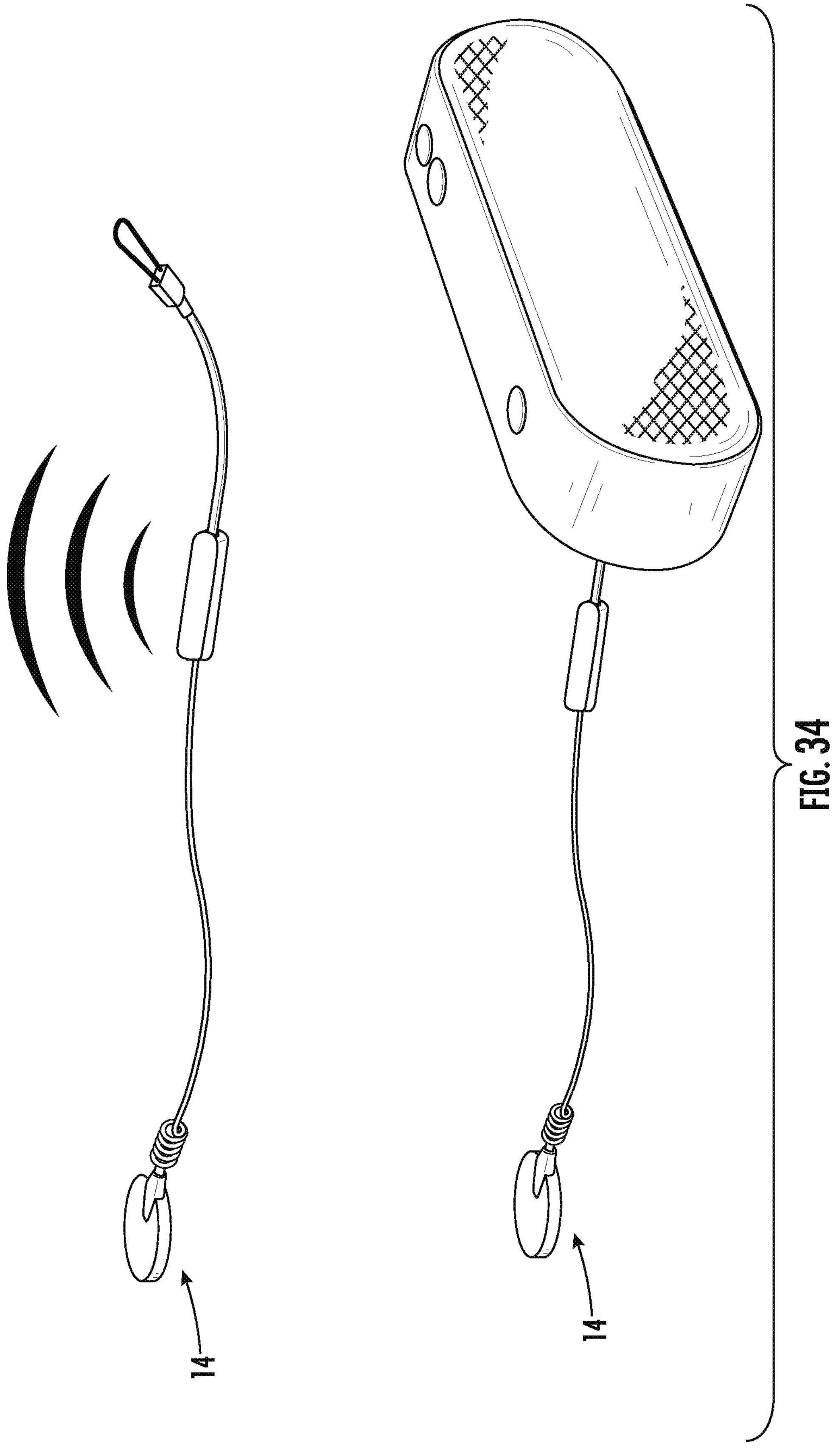
FIG. 34 shows a security device configured for use in a wireless network according to one embodiment.
Figure 35:
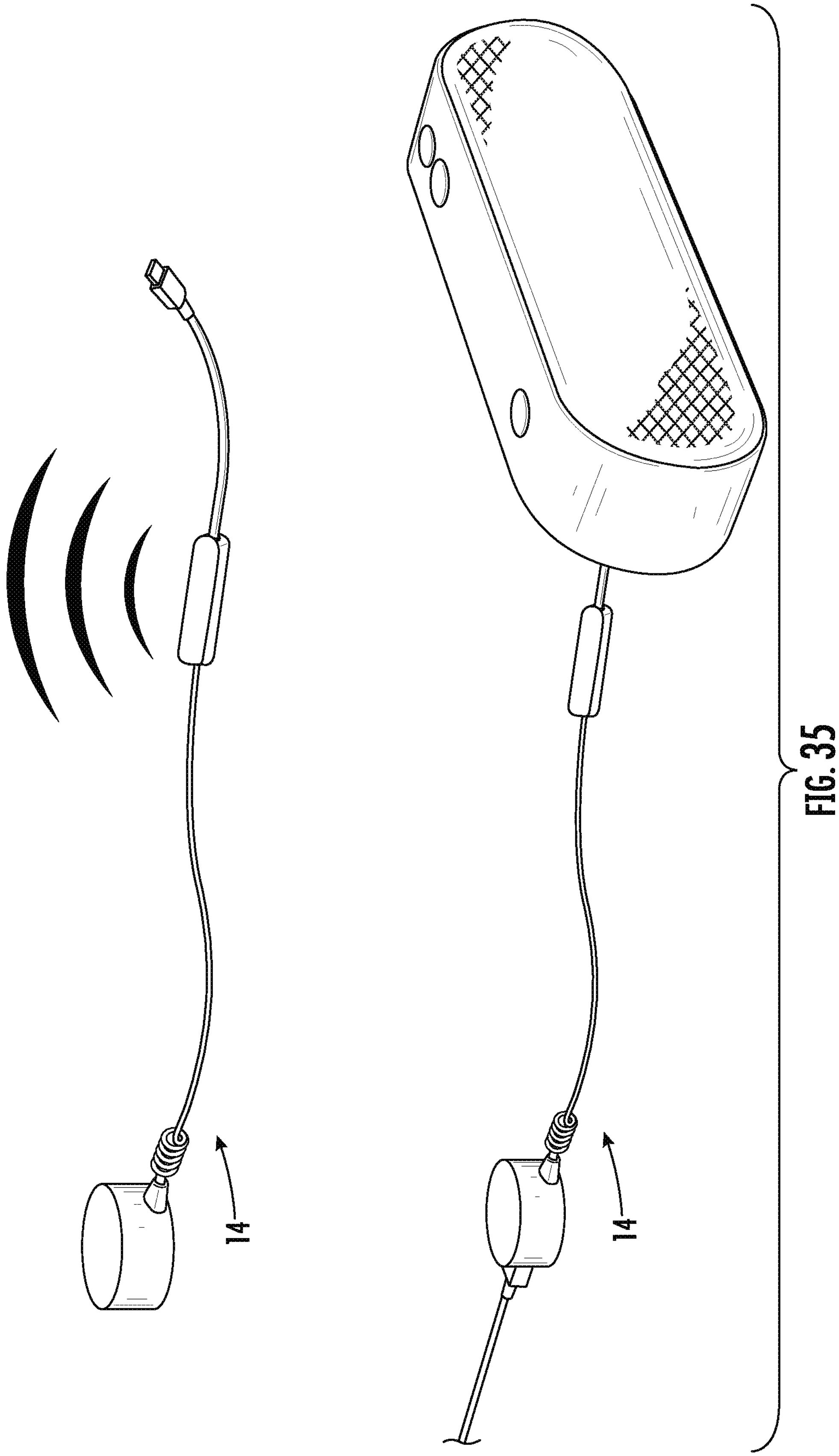
FIG. 35 shows a security device configured for use in a wireless network according to one embodiment.
Figure 36:
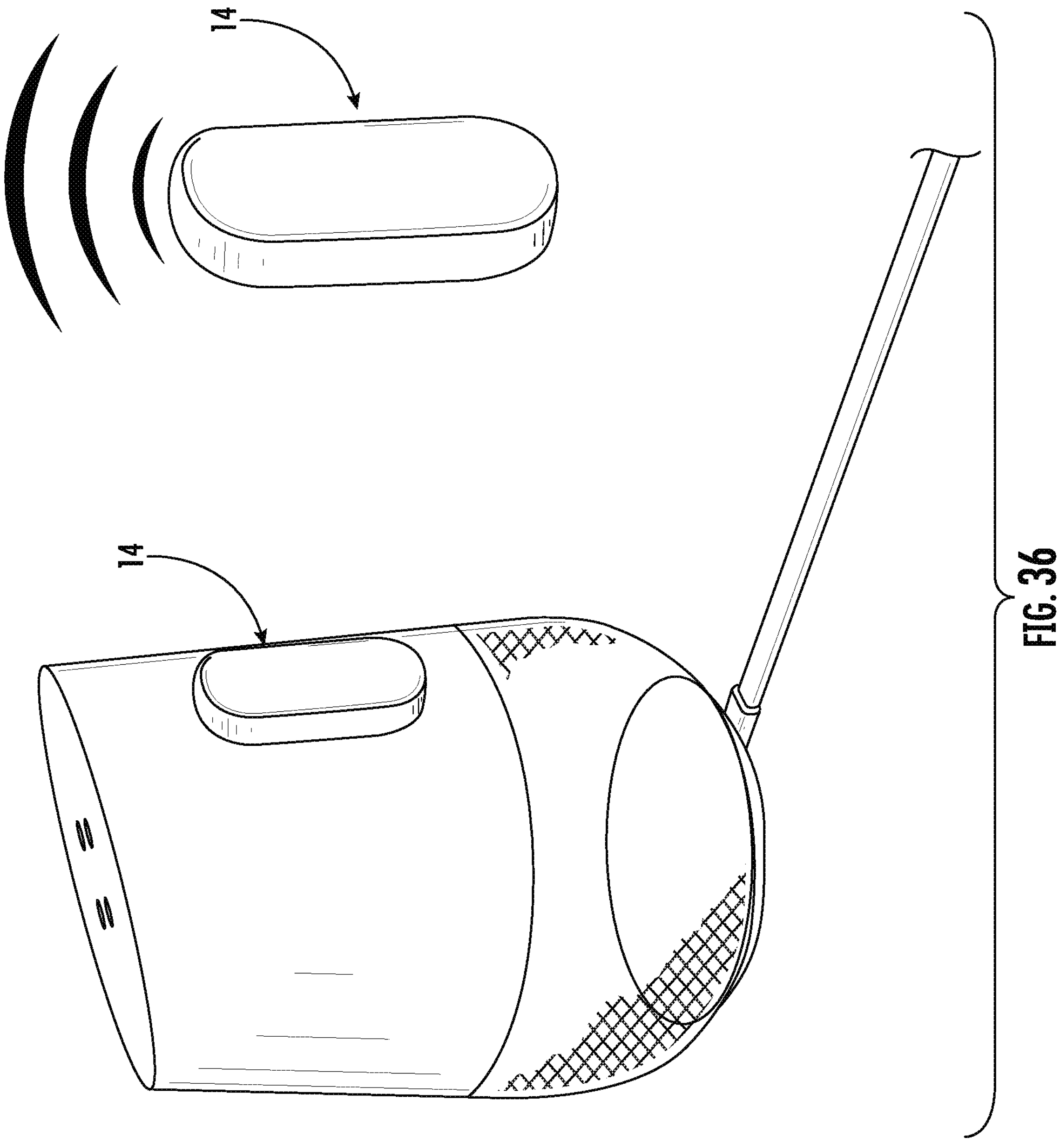
FIG. 36 shows a security device configured for use in a wireless network according to one embodiment.
Figure 37:
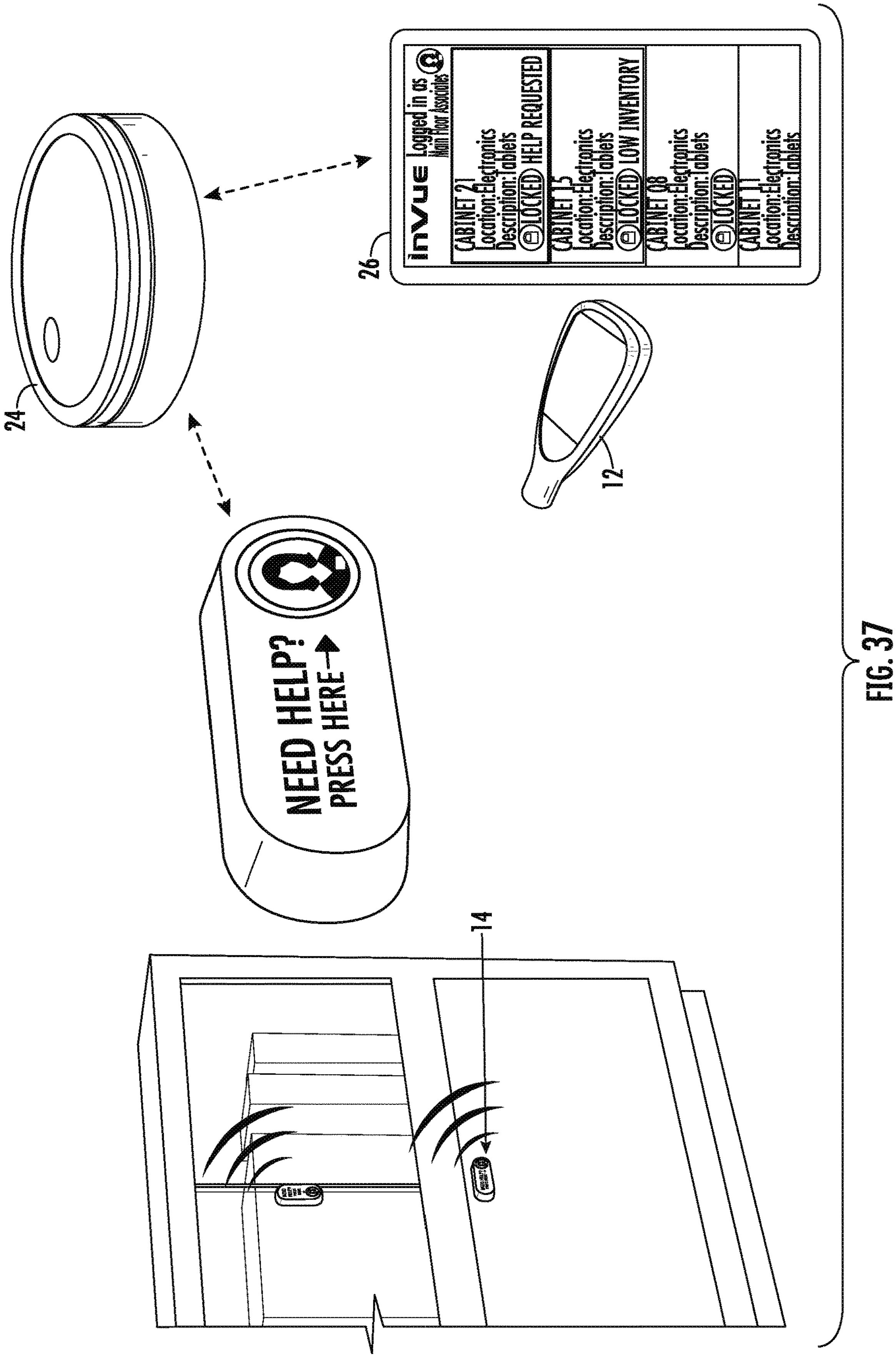
FIG. 37 is a perspective view of a system in a wireless network according to one embodiment.
Figure 38:
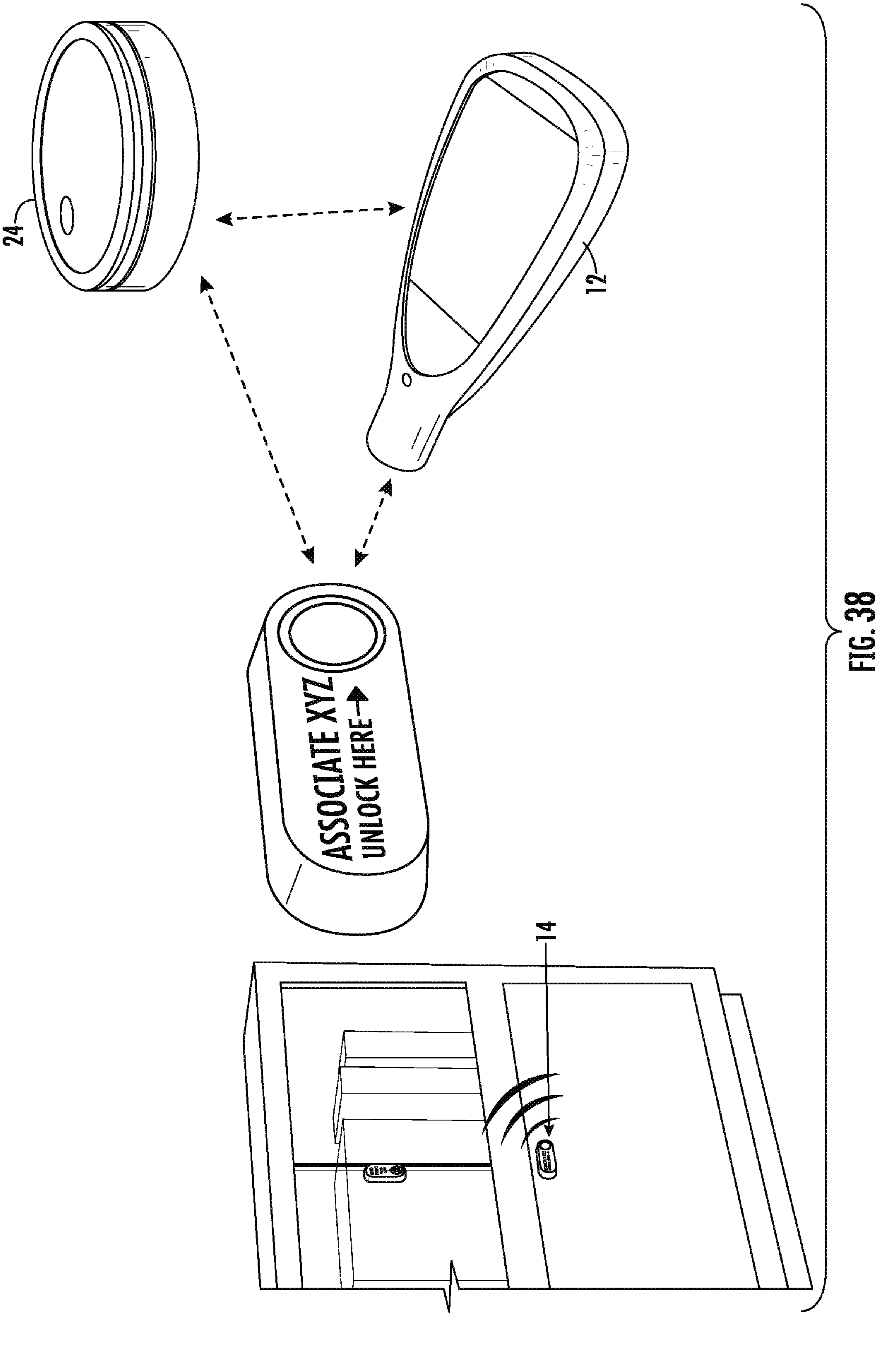
FIG. 38 is a perspective view of a system in a wireless network according to one embodiment.
Figure 39:
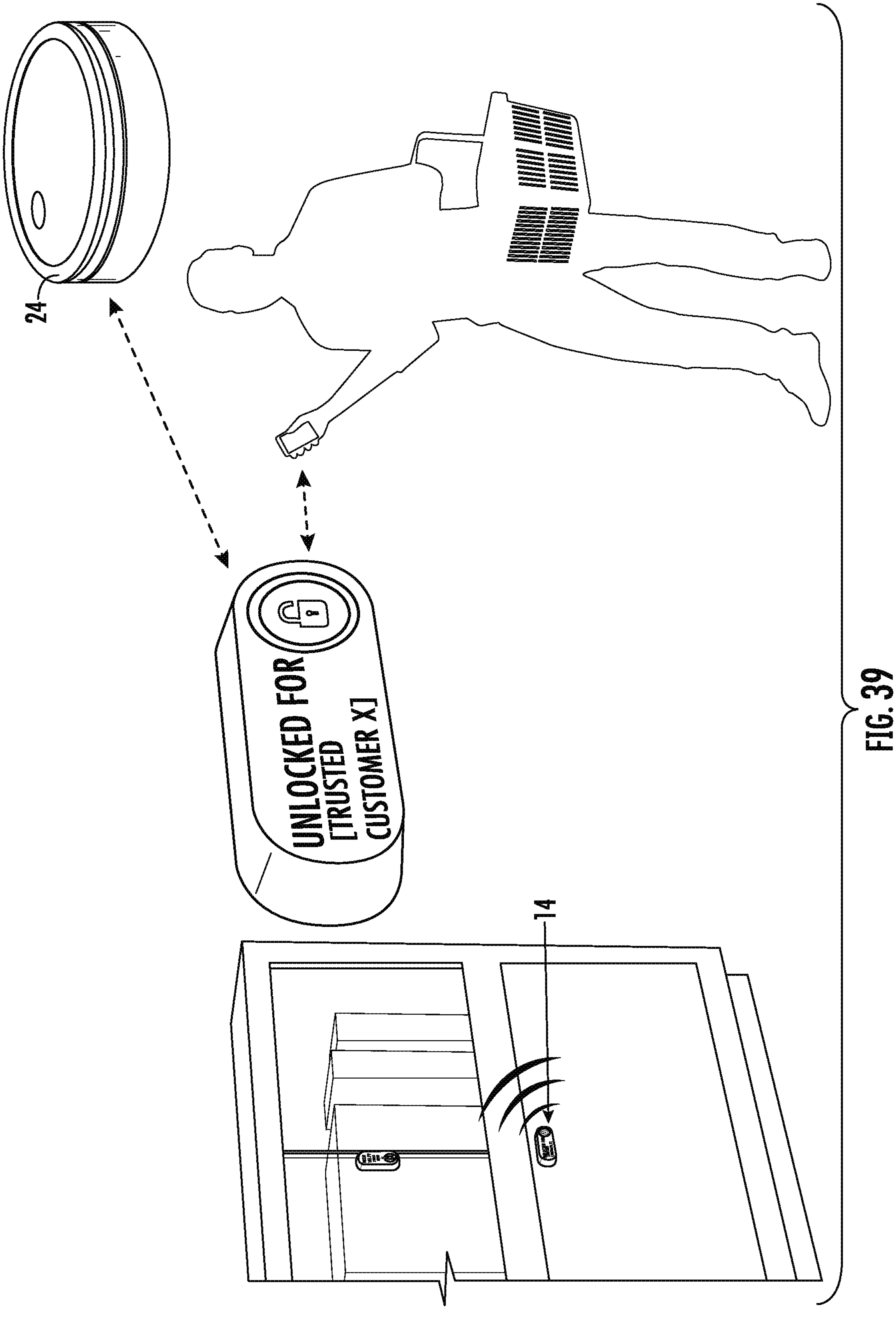
FIG. 39 is a perspective view of a system in a wireless network according to one embodiment.
Figure 40:
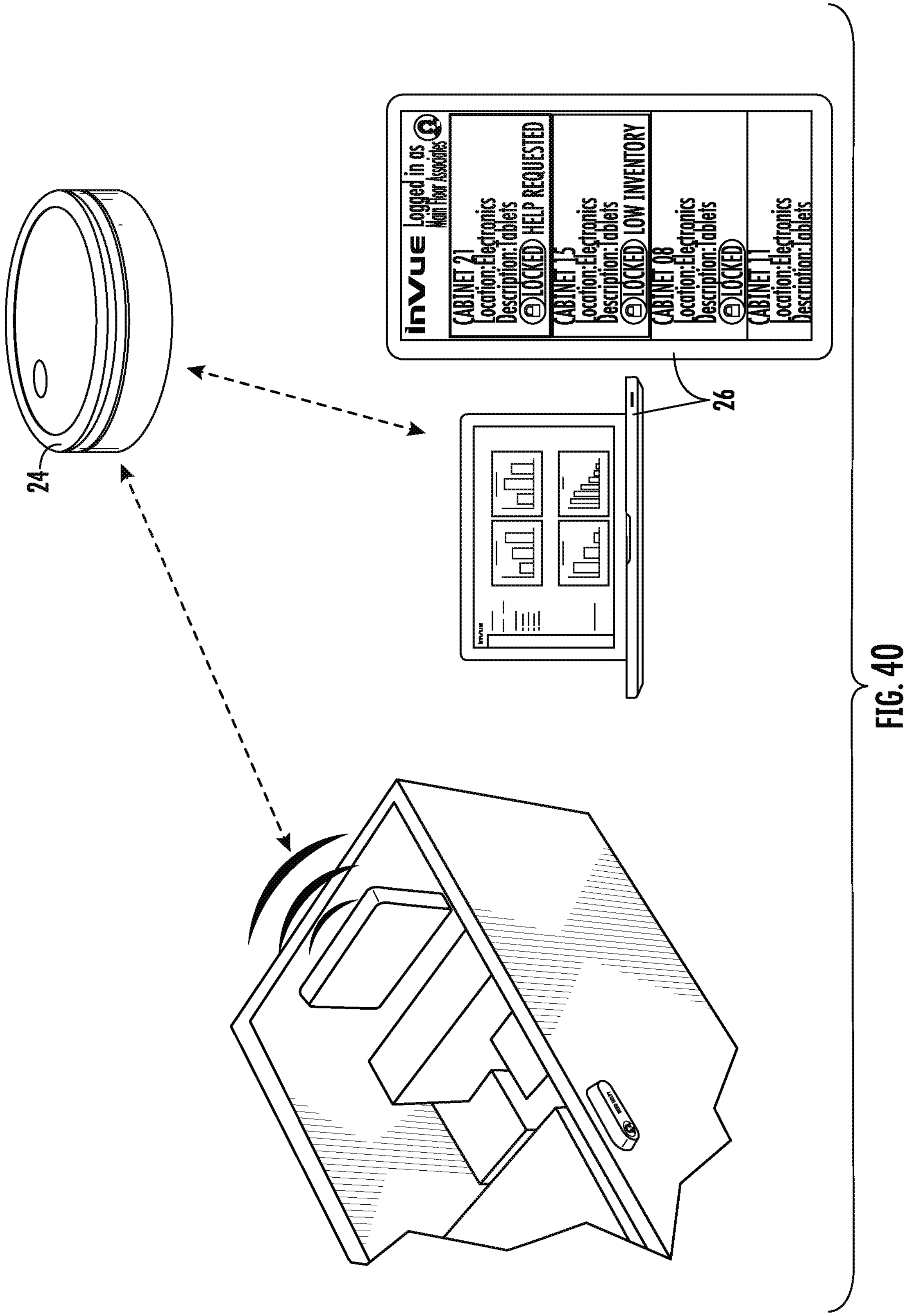
FIG. 40 is a perspective view of a system in a wireless network according to one embodiment.
Figure 41:
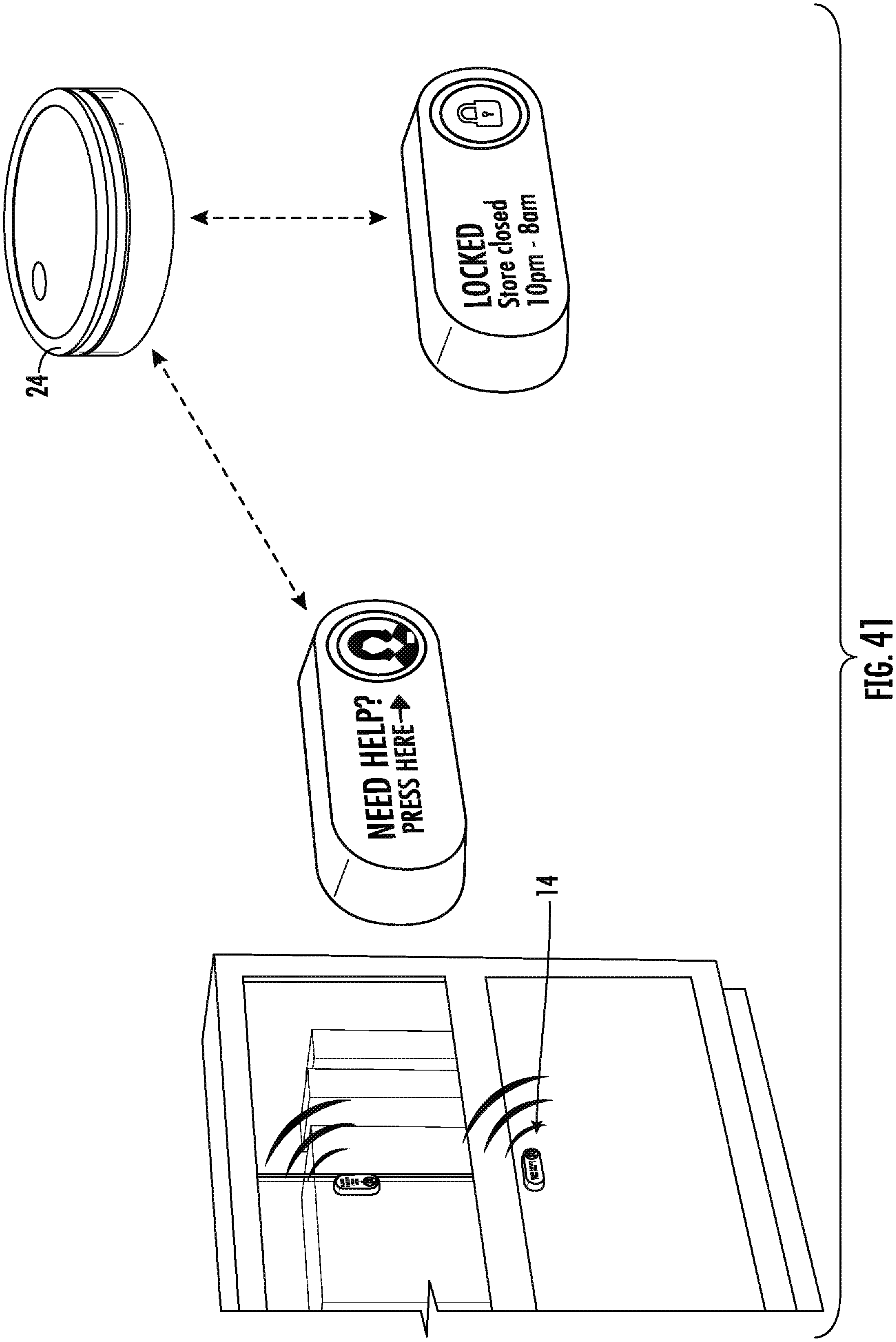
FIG. 41 is a perspective view of a system in a wireless network according to one embodiment.
Figure 42:
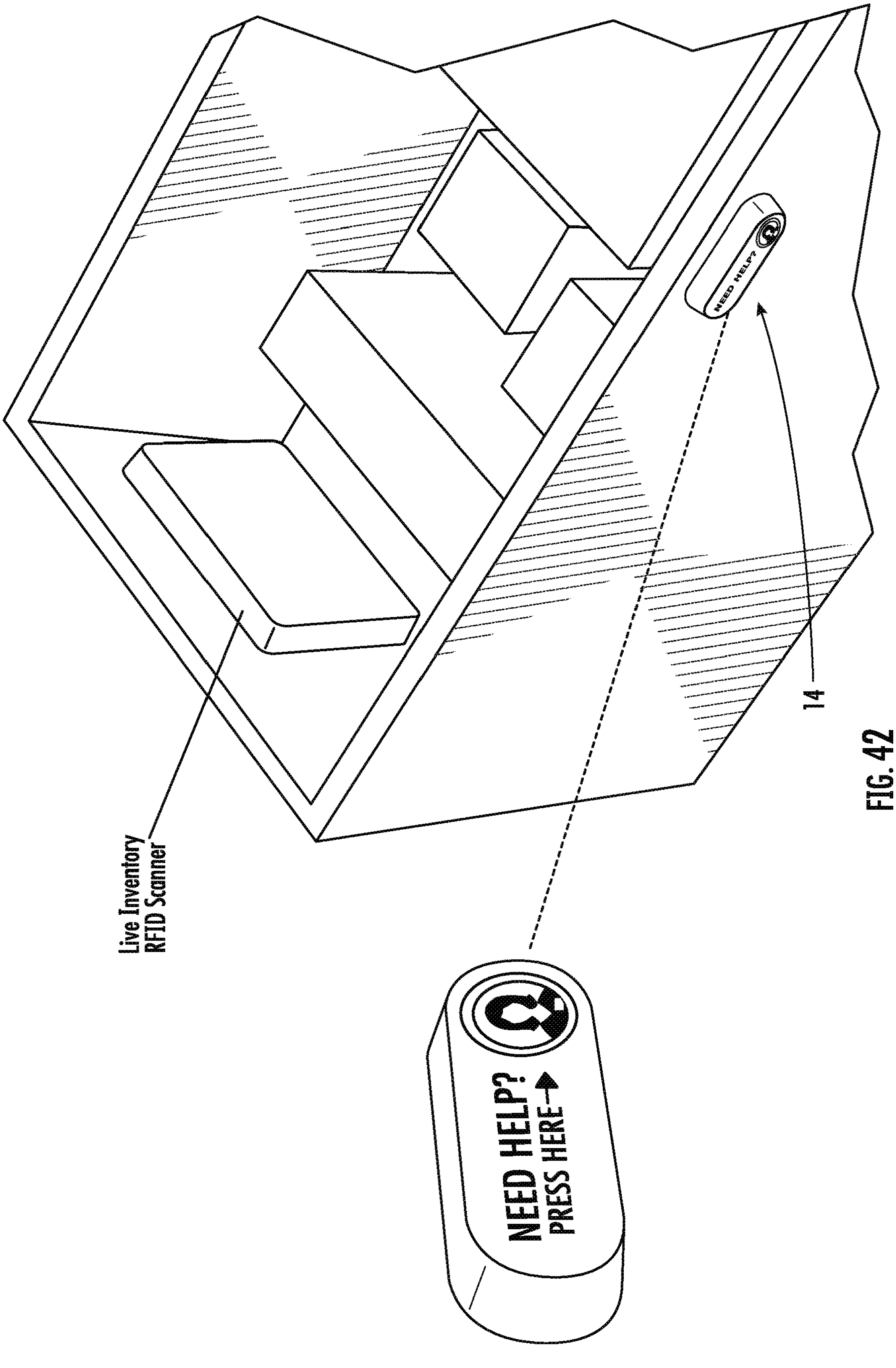
FIG. 42 is a perspective view of a system in a wireless network according to one embodiment.

Another example embodiment of a wireless network system includes various types of security devices 14 and electronic keys 12 that may cooperate with one or more nodes 20, hubs 24, and/or computing devices 26 in a wireless network (see, e.g., FIGS. 26-42). Various types of security devices 14 may be employed in the system, such as those disclosed herein. For example, security devices 14 that include a sensor that is configured to be attached to an item (e.g., via adhesive and/or brackets). In some implementations, the sensor may be connected to a base or stand 35 with a tether 45 (see, e.g., FIGS. 30-32), or no tether may be used in some cases (see, e.g., FIGS. 32-33). Sensors 25 may take many different forms, such as, for example, standalone sensors (see, e.g., FIG. 36), "chairback" sensors (see, e.g., FIG. 33), sensors that provide power and security for the item of merchandise (e.g., via USB-C, micro-USB, etc. connectors) (see, e.g., FIG. 35), and/or sensors that only provide security (e.g., a sensor including a plunger switch) (see, e.g., FIG. 34). Similarly, the base 35 used to removably support a sensor 25 may also take different forms (see, e.g., FIG. 33 where a chairback sensor is used with electrical contacts for transferring power between the sensor and the base). Of course, the security devices 14 may be used in various industries such as retail stores and for a variety of items, such as merchandise or commercial items (e.g., tablet computers).

Figure 27:
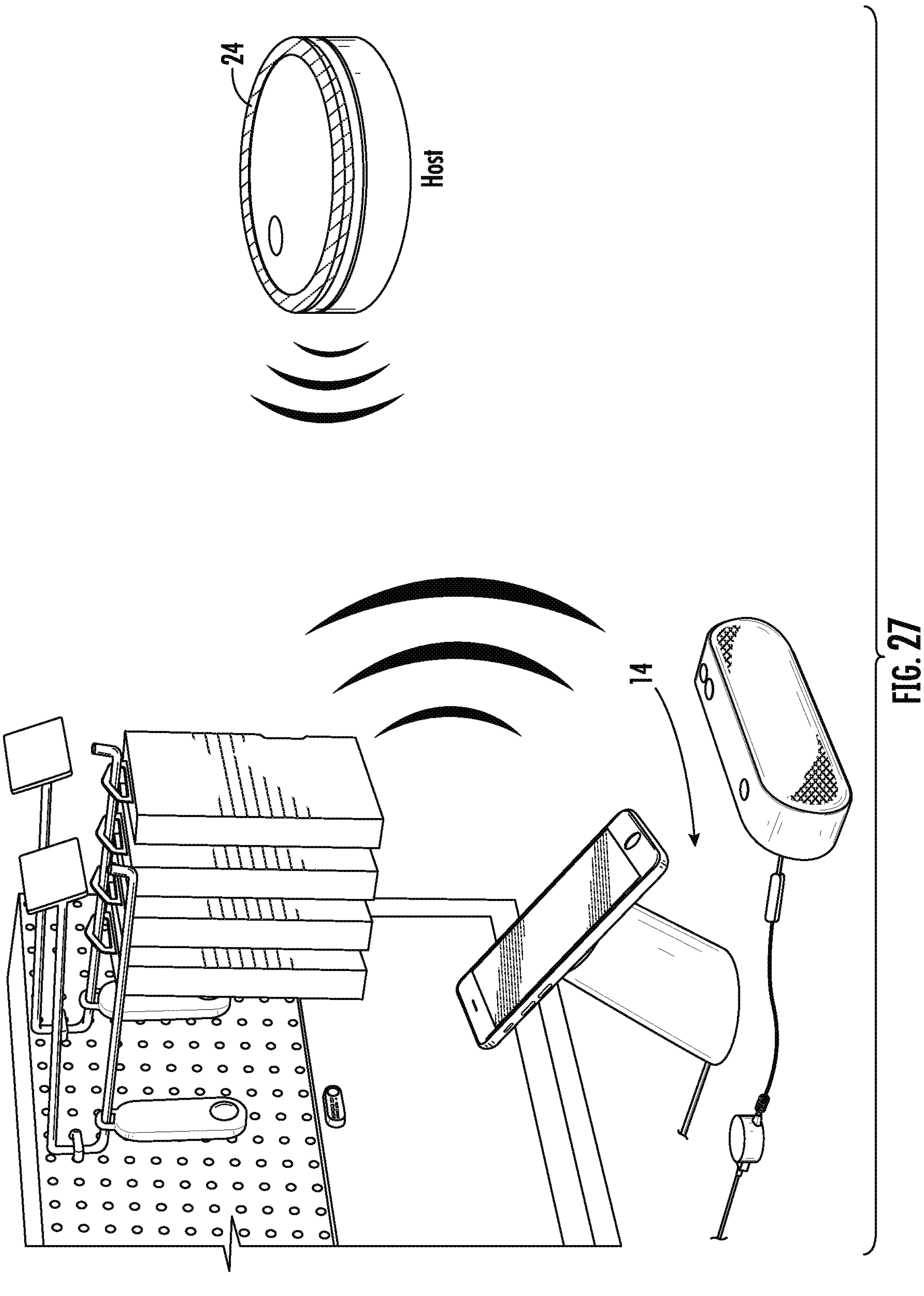
FIG. 27 is a perspective view of a system in a wireless network according to one embodiment.
Figure 28:
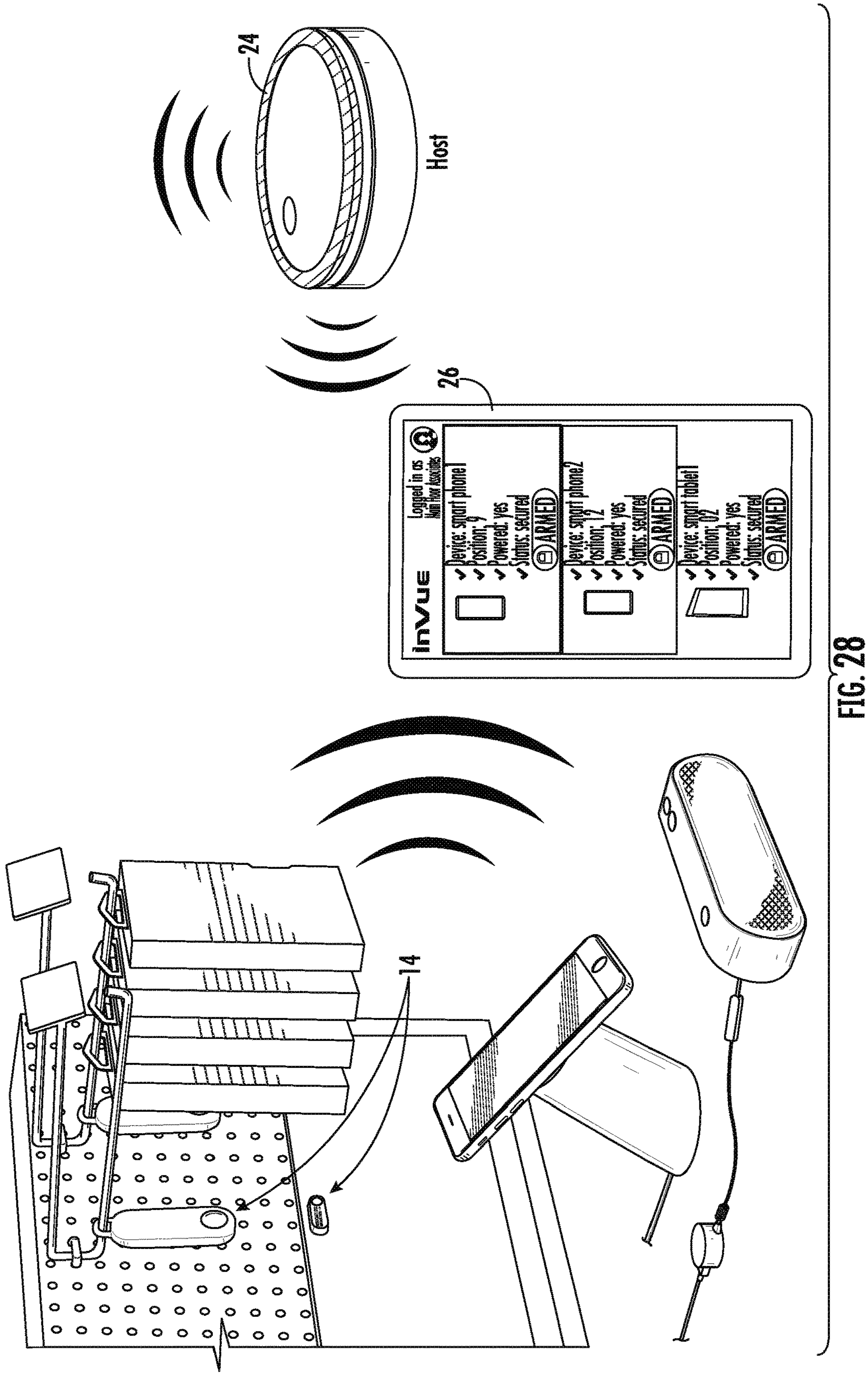
FIG. 28 is a perspective view of a system in a wireless network according to one embodiment.
Figure 29:
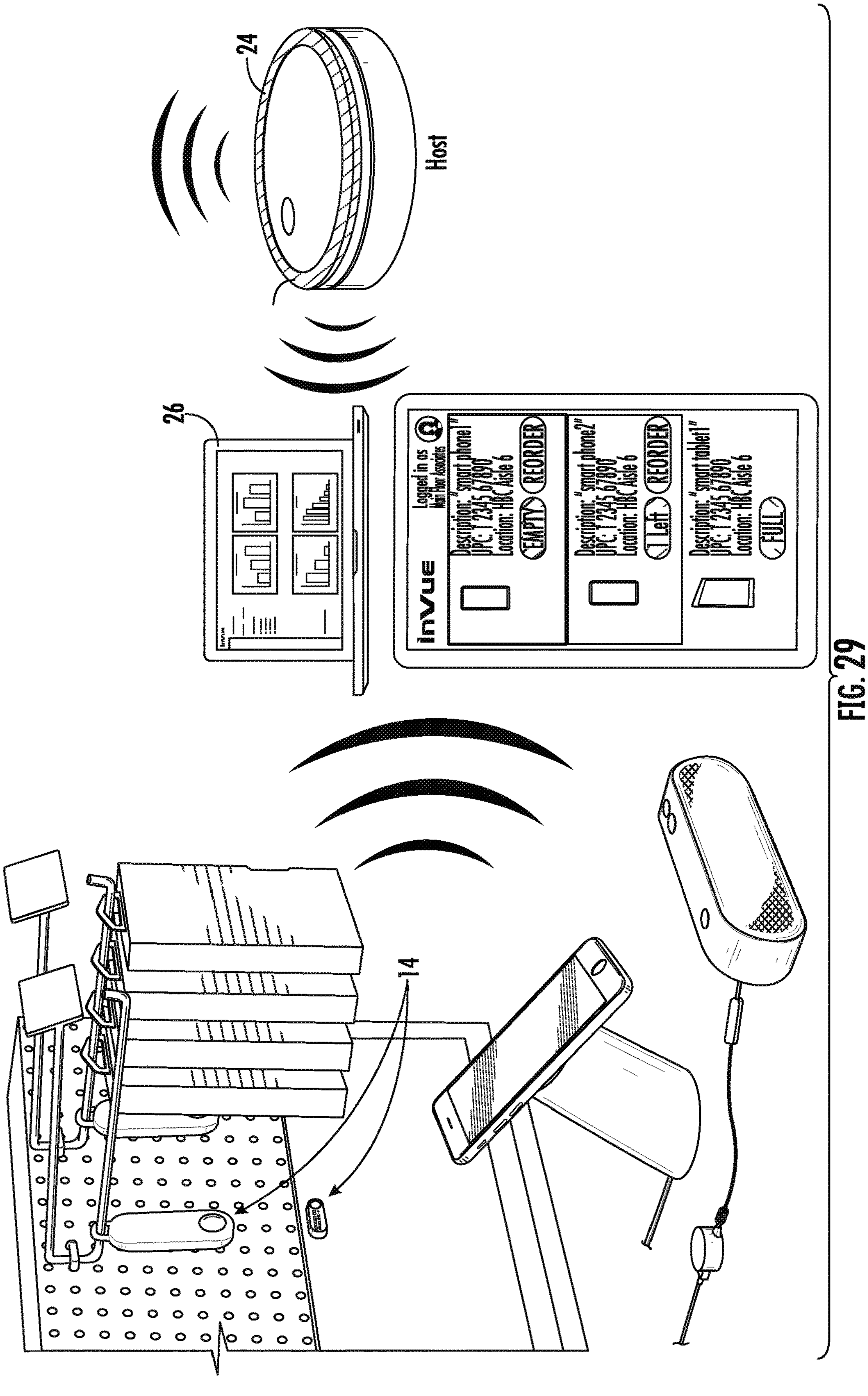
FIG. 29 is a perspective view of a system in a wireless network according to one embodiment.
Figure 30:
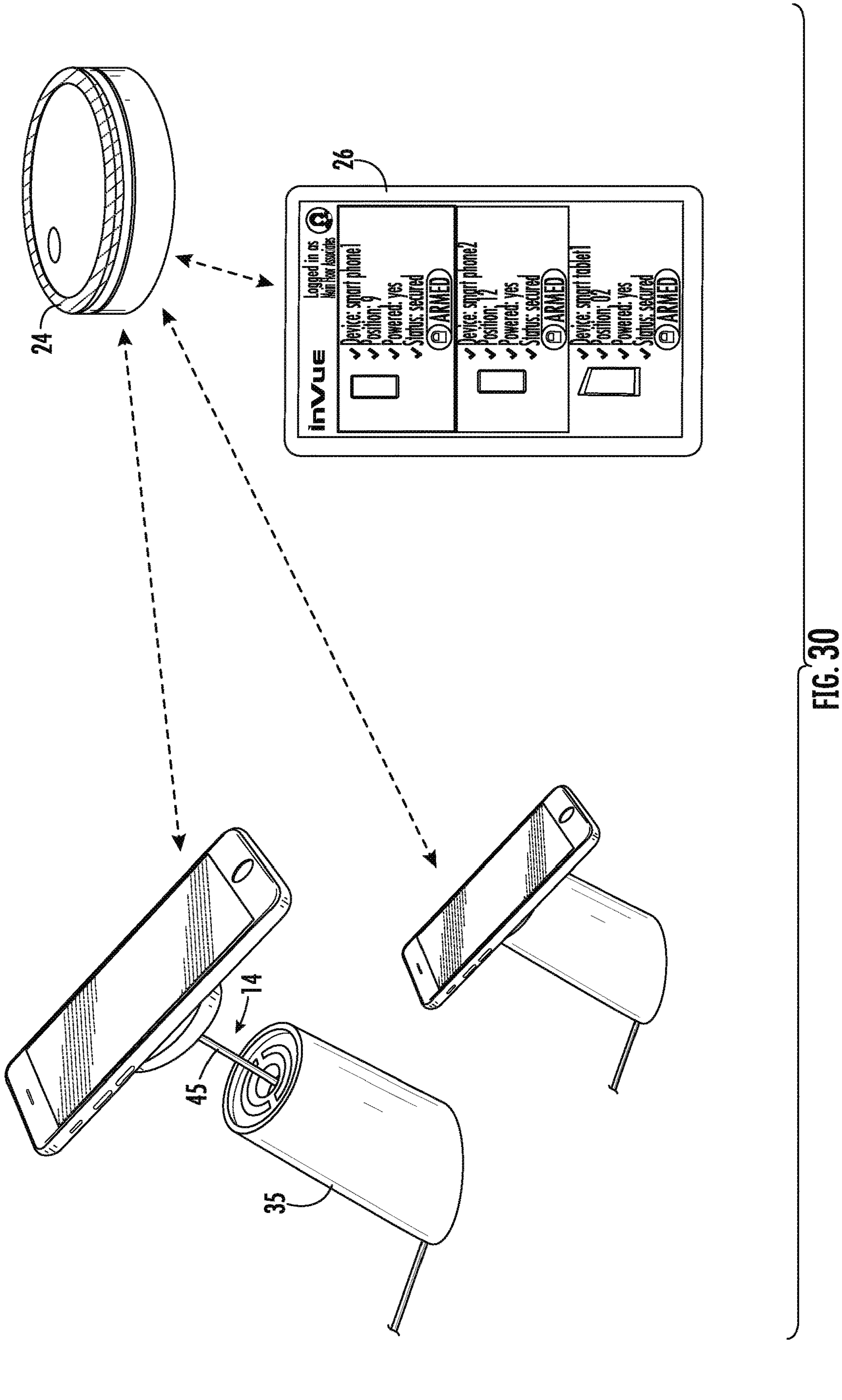
FIG. 30 is a perspective view of a system in a wireless network according to one embodiment.
Figure 31:
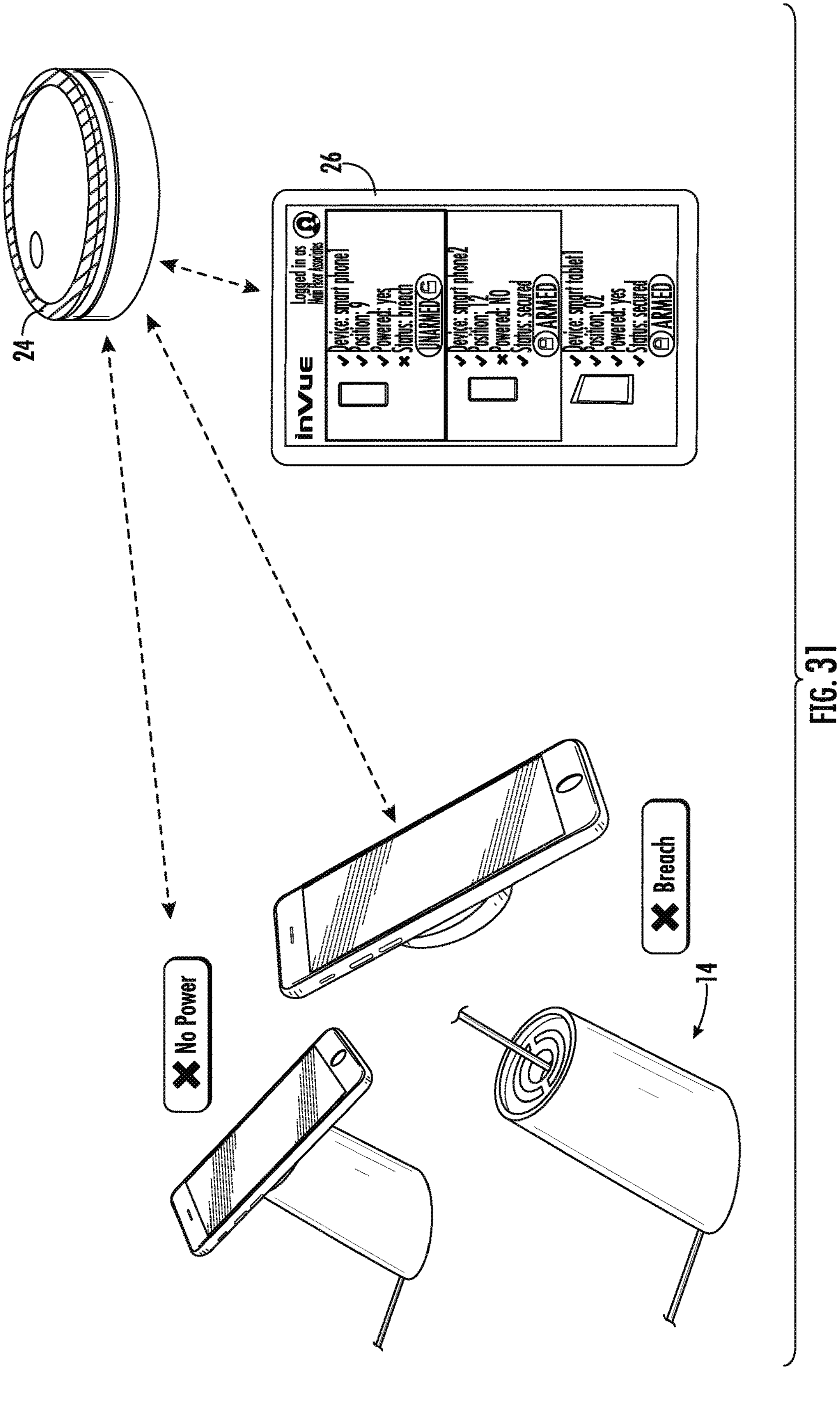
FIG. 31 is a perspective view of a system in a wireless network according to one embodiment.

As shown in FIGS. 27-29, various numbers and types of security devices 14 may be configured to communicate with one another in a network, such as a private wireless network as discussed above. A host or hub 24 may be configured to communicate with each of the plurality of security devices 14 in the network and provide various security signals, such as disclosed herein. An interface may be provided on the hub 24 for facilitating communication with an electronic key 12. FIG. 27 shows an example where the plurality of security devices 14 and hub 24 are configured to communicate in an IP network which may allow for various information and alerts to be provided to one or more computing devices 26 (e.g., system health, power status, alarm status, and/or inventory information). Moreover, FIG. 28 illustrates an example similar to FIG. 27 but where the system includes additional features via a SaaS subscription to enterprise software, such as for example, displaying planogram ("POG") compliance information, consumer activity, programmable KPI's, inventory re-stock thresholds, and/or inventory POG compliance. FIGS. 30-31 show various depictions of a plurality of security devices 14 in the form of a sensor and base which are configured to communicate with a hub 24 and a computing device 26 configured to receive notifications from the hub (e.g., no power at the security device or a breach has occurred). Furthermore, FIGS. 37-42 illustrate embodiments of security devices 14 in the form of locks that are configured to communicate in the wireless network with the hub 24. In these examples, a customer may be able to request assistance (e.g., via a call button on the security device 14) that enables a sales associate to be notified and to thereafter engage the customer or control the security device 14 with an electronic key 12 or computing device 26. The retail associate could use an electronic key 12 to unlock the security device 14 for the customer (see, e.g., FIG. 38), or use a computing device 26 to unlock the security device. In some cases, the customer's mobile telephone may perform some of the functions disclosed herein ("Trusted Customer"), such as unlocking a security device 14 in response to receiving a wireless authorization signal (see, e.g., FIG. 39). For example, a Trusted Customer may be a customer who has purchased an item and is picking the item up in the store or one who has an account with the retailer and is purchasing the item using the customer's mobile device. In addition, various data may be collected regarding the security device 14, such as for example, the type of product that was removed from a cabinet or drawer protected by a lock, and allows for alerts to be provided to one or more computing devices 26 (see, e.g., FIG. 40). The security devices 14 may be configured to automatically relock after an authorized opening and accessing the item of merchandise (see, e.g., FIG. 41), and various techniques may be employed to track items of merchandise added or removed from a cabinet or drawer, such as an RFID scanner that is configured to scan the product as the item is added or removed from the cabinet or drawer (see, e.g., FIG. 42).

In other embodiments, inventory information may be obtained regarding merchandise on a security device 14 such as a locking hook, information may be obtained regarding items of merchandise removed from a security device (e.g., a cabinet), and computing devices 26 may be used to obtain various types of information and provide various types of commands for controlling the security device and/or item of merchandise. Embodiments of wireless systems disclosed herein may provide for real time reporting of Who/What/When/Where/Why/How for interactions with security devices 14 and items of merchandise, be responsive/interactive, migrate from security focus to omni-channel experience enablement within the retail store, facilitate Trusted Customer engagement with security assets, allow to readily customize and expand the system, enable alternative business models such as SaaS models, connect local network of connected assets with central hub for local computing, and/or connect hub to cloud platform for providing alerts, reporting, system administration, daily operation. Embodiments may also provide a platform infrastructure having a centralized hub per retail store and several fit for purpose connected end security device assets such as stands, sensors, table managers, locks, cabinet sensors, inventory sensors, customer dwell sensors, etc. that all communicate with the hub. Due to the flexibility of wireless systems in some embodiments, customers do not need to pre-select which security devices 14 to purchase since the platform infrastructure is common. Furthermore, computing devices 26 and mobile devices used by retailers may allow retailers and store associates to dynamically interact with security devices 14 to make real-time decisions, such as responding to security events, restocking out of stock inventory, or responding to customer requests for assistance with secured items of merchandise.

Figure 4:
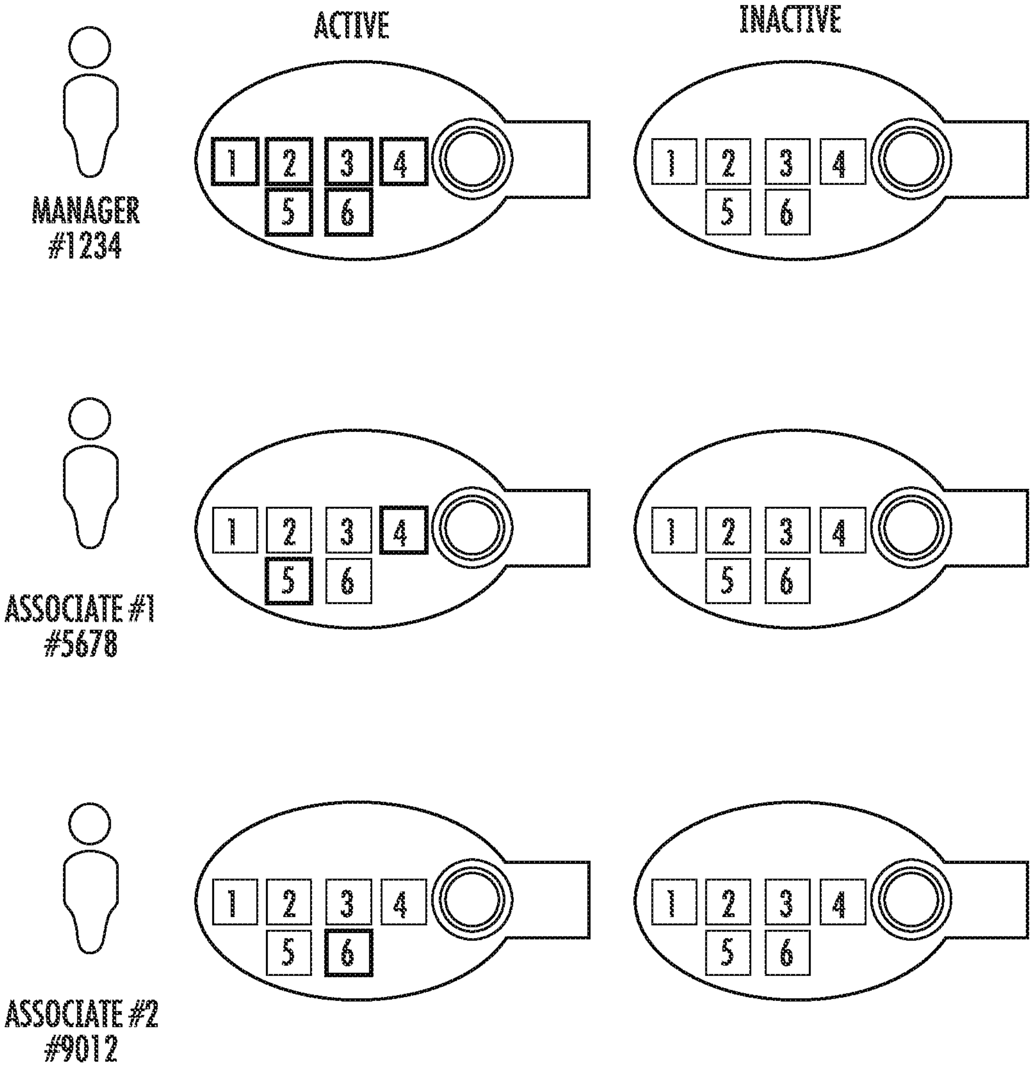
FIG. 4 illustrates a plurality of keys with different authorization levels according to one embodiment.

In some cases, each electronic key 12 may be authorized for specific locations, departments, or merchandise security devices. For instance, FIG. 4 shows that a manager may have authorization for all zones, locations, departments, or merchandise security devices (indicated as numbers 1-6), while a first associate may only have authorization for two zones, locations, departments, or merchandise security devices (indicated as numbers 4 and 5), and a second associate may only have authorization for one zone, location, department, or merchandise security device (indicated as number 6). As such, a retail store or other establishment may limit the scope of authorization for different associates within the same retail store. In order to accommodate different authorizations levels, each key 12 may be configured to store a code that is associated with each zone, location, department, or merchandise security device. For example, each zone may include a plurality of merchandise security devices 14, and a retail store may have multiple zones (e.g., a zone for electronics, a zone for jewelry, etc.).

Various techniques may be used to initially program the electronic key 12. For example, the electronic key 12 may be initially presented to each authorized merchandise security device 14. Upon communication with the security device 14 or the cloud 22, the electronic key 12 will be paired with each security device. A programming station 16 may provide a code to the electronic key 12, and the key or cloud 22 may then communicate the code to each of its authorized security devices 14. Each key 12 may only need to be programmed once. In some embodiments, a programming station 16 may be located within each zone, and a key 12 may receive a code from each programming station that it is authorized. Thereafter, each key 12 may need to be "refreshed" at the programming station 16 or a charging station 18 following a predetermined period of time or in response to being disabled as described in various examples herein. In other embodiments, the electronic key 12 may be programmed directly via the cloud 22.

Figure 19:
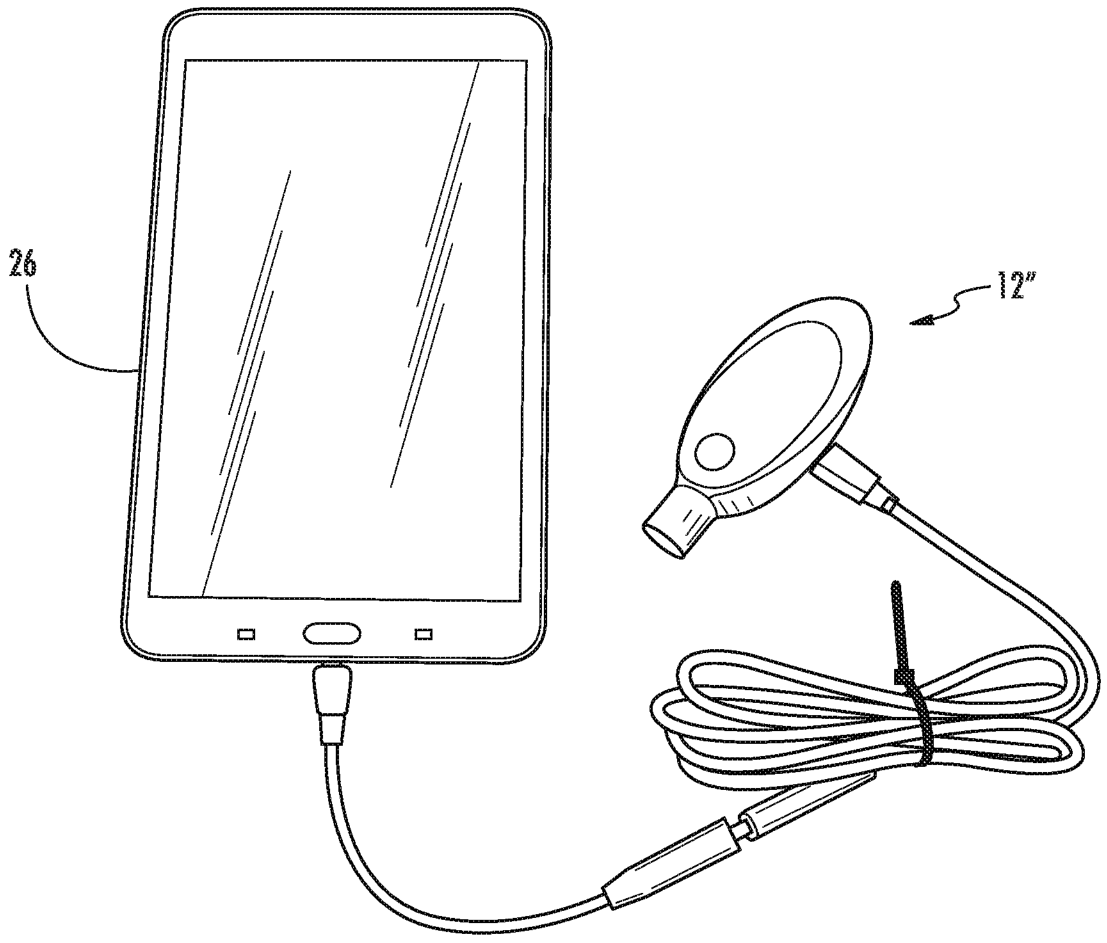
FIG. 19 illustrates an electronic key in communication with a computing device according to one embodiment.

In another embodiment, each electronic key 12 may include a security code and a serial number for one or more merchandise security devices 14. For example, a key 12 may only be able to arm, disarm, lock, or unlock a merchandise security device 14 where the security codes and the serial numbers match one another. In one example, each serial number is unique to a merchandise security device 14 and could be programmed at the time of manufacture or by the retailer. This technique allows for greater flexibility in programming keys 12 and assigning keys to particular merchandise security devices 14 and/or zones. In one embodiment, a setup electronic key 12" may be used to initially map particular merchandise security devices 14 and serial numbers. In this regard, the setup key 12" may be used to communicate with each key 12 and obtain the serial number of each merchandise security device 14. The setup key 12" may also obtain a location of the security devices 14, or a user of the setup key may provide a description for each merchandise security device (e.g., SN #123=merchandise security device #1). The setup key 12" may communicate with a tablet or other computing device 26 for accumulating all of the information (see, e.g., FIGS. 3 and 19), which may occur via wired or wireless communication. Thus, the tablet or computing device 26 may map each of the serial numbers with the merchandise security devices 14 and in some cases, may also include serial numbers and corresponding electronic keys 12. Individual electronic keys 12 may then be assigned particular serial numbers for authorized merchandise security devices 14 (e.g., user 1 includes serial numbers 1, 2, 3; user 2 includes serial numbers 1, 4, 5). Each of the electronic keys 12 may be programmed with the same security code using a programming station 16. In some embodiments, the setup process may be used in conjunction with a planogram of the merchandise security devices 14. The planogram may represent a layout of the merchandise security devices 14 within a retail store or other establishment. For example, a setup key 12" may be used to map serial numbers to specific merchandise security devices 14 on a planogram as the setup key communicates with each merchandise security device. The setup key 12" may communicate with a tablet or other computing device 26 for populating the planogram with serial numbers, such as via a wired connection (see, e.g., FIG. 19). This planogram may be uploaded to a remote location or device for managing the planogram and ensuring planogram compliance based on information exchanged between the security devices 14 and the computing device 26. As before, particular serial numbers may be assigned to authorized users.

In order to arm, disarm, lock, or unlock a merchandise security device 14, the electronic key 12 may communicate with a particular merchandise security device and determine whether the security codes and the serial numbers match. If the codes match, the electronic key 12 then arms, disarms, locks, or unlocks the merchandise security device 14. Upon refreshing an electronic key 12 and/or when a user requests an electronic key via programming or authorization station 16, any available electronic key may be used since the key may be programmed in real time with the appropriate level of authorization for that user (e.g., specific zones, departments, and/or merchandise security devices).

In one embodiment, the merchandise display security system 10 comprises an electronic key 12 and a merchandise security device 14 that is configured to be operated by the key. The system may further comprise an optional programming station 16 that is operable for programming the key 12 with a security code, which may also be referred to herein as a Security Disarm Code (SDC). In addition to programming station 16, the system may further comprise an optional charging station 18 that is operable for initially charging and/or subsequently recharging a power source disposed within the key 12. For example, the key 12 and merchandise security device 14 may each be programmed with the same SDC into a respective permanent memory. The key 12 may be provisioned with a single-use (i.e., non-rechargeable) power source, such as a conventional or extended-life battery, or alternatively, the key may be provisioned with a multiple-use (i.e. rechargeable) power source, such as a conventional capacitor or rechargeable battery. In either instance, the power source may be permanent, semi-permanent (i.e., replaceable), or rechargeable, as desired. In the latter instance, charging station 18 is provided to initially charge and/or to subsequently recharge the power source provided within the key 12. Furthermore, key 12 and/or merchandise security device 14 may be provided with only a transient memory, such that the SDC must be programmed (or reprogrammed) at predetermined time intervals. In this instance, programming station 16 is provided to initially program and/or to subsequently reprogram the SDC into the key 12. As will be described, key 12 may be operable to initially program and/or to subsequently reprogram the merchandise security device 14 with the SDC. Key 12 is then further operable to operate the merchandise security device 14 by transferring power and/or data to the device, as will be described.

In the exemplary embodiment of the system illustrated in FIGS. 1-2, electronic key 12 is configured to be programmed with a unique SDC by the programming station 16. In some embodiments, the key 12 is presented to the programming station 16 and communication therebetween is initiated, for example, by pressing or otherwise actuating a control button 28 provided on the exterior of the key. Communication between the programming station 16 and the key 12 may be accomplished directly, for example by one or more electrical contacts, or indirectly, for example by wireless communication. Any form of wireless communication capable of transferring data between the programming station 16 and key 12 is also possible, including without limitation optical transmission, acoustic transmission or magnetic induction. In some embodiments shown and described herein, communication between programming station 16 and key 12 is accomplished by wireless optical transmission, and more particularly, by cooperating infrared (IR) transceivers provided in the programming station and the key. In some embodiments, the programming station 16 may function similarly to that disclosed in U.S. Pat. No. 7,737,844 entitled PROGRAMMING STATION FOR A SECURITY SYSTEM FOR PROTECTING MERCHANDISE, the disclosure of which is incorporated herein by reference in its entirety. For the purpose of describing some embodiments of the present invention, it is sufficient that the programming station comprises at least a logic control circuit for generating or being provided with a SDC, a memory for storing the SDC, and a communications system suitable for interacting with the electronic key 12 in the manner described herein to program the key with the SDC.

An available feature of a merchandise security system 10 according to one embodiment is that the electronic key 12 may include a time-out function. More particularly, the ability of the key 12 to transfer data and/or power to the merchandise security device 14 may be deactivated after a predetermined time period. By way of example, the electronic key 12 may be deactivated after about six to about twenty-four hours from the time the key was programmed or last refreshed. In this manner, an authorized sales associate typically must program or refresh the key 12 assigned to him at the beginning of each work shift. Furthermore, the charging station 18 may be configured to deactivate the electronic key 12 when the key is positioned within or otherwise engaged with a charging port 30 (see, e.g., FIG. 1). In this manner, the charging station 18 can be made available to an authorized sales associate. In one embodiment, the electronic key 12 may be authorized upon the sales associate inputting an authorized code to release the key for use. For instance, the sales associate may input a code on a keypad in communication with the charging station 18. Upon inputting the correct code, the charging station 18 may indicate which key 12 is authorized for use by the sales associate (e.g., via an audible and/or a visible indicator). In some cases, the time-out period may be predetermined or customized by a user. For example, a manager of a retail store may input a particular time period for one or more of the electronic keys 12. Those electronic keys 12 that are "active" may be monitored via communication within the cloud-based network. In other embodiments, the electronic key 12 may be timed out or otherwise disabled in response to an event. For instance, the electronic key 12 may be disabled in response to the key being misplaced or stolen, or keys being brought into a retail store that are not authorized for use. Such disabling may alternatively occur via a command from a device 26 sent to the electronic key 12 via the cloud 22. In other cases, the electronic key 12 may be disabled in response to failure to communicate with the network (e.g., at a particular time or time interval), a lost connection to the network, and/or an inability to reconnect to the network. In another example, the electronic key 12 may be disabled in response to its memory being full, e.g., with audit data.

In one embodiment, commands may be provided remotely for taking various actions. For example, where a theft has occurred, a command may be provided from a remote location or device 26 (e.g., a tablet or computer) to lock and/or arm all or a portion of the merchandise security devices 14. Similarly, a command may be provided from a remote location or device 26 to deactivate all or a portion of the electronic keys 12 and/or security devices 14. As such, the system 10 provides techniques for centralized security and control of the electronic keys 12, merchandise security devices 14, and other components within the system. As discussed above, the electronic keys 12 may also be controlled remotely. Furthermore, in some embodiments, such requests or commands may be made by the computing device 26 for individual security devices 14 or a plurality of security devices (e.g., sending a command to lock all security devices in response to a security event). Moreover, one or more of the security devices 14 may be configured to lock or alarm in response to a security event (e.g., automatically locking a sensor attached to an item of merchandise to a base removably supporting the sensor).

Figure 5:
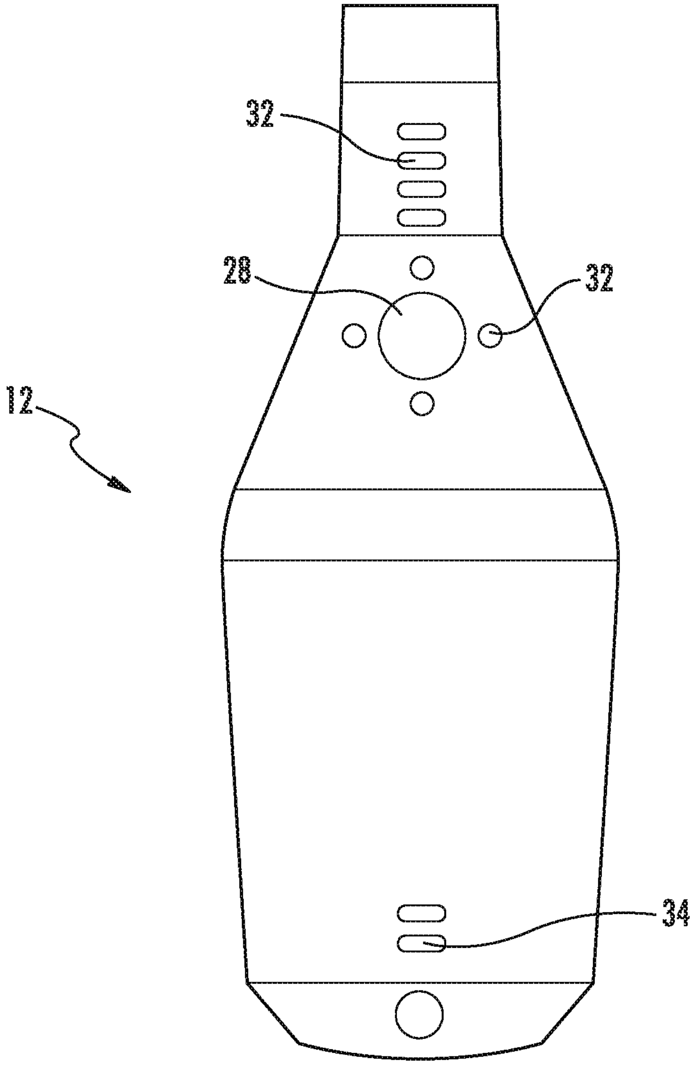
FIG. 5 is a plan view of an electronic key according to one embodiment.
Figure 6:
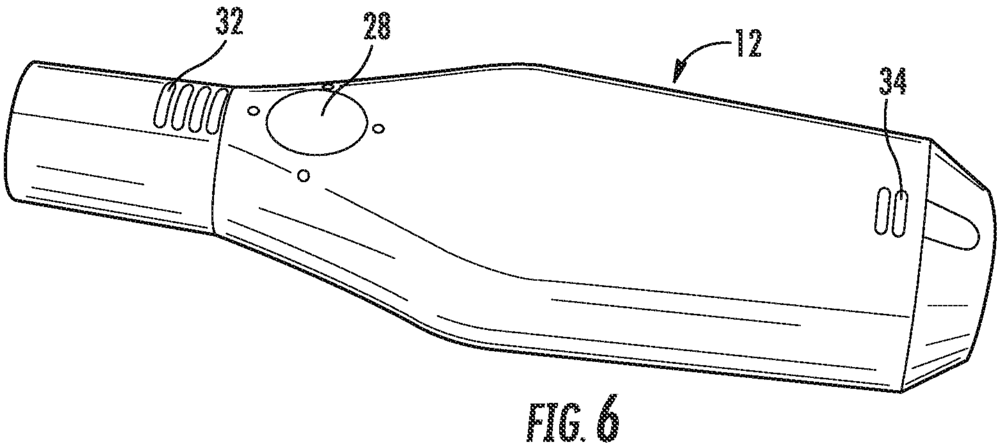
FIG. 6 is a perspective view of the electronic key shown in FIG. 5.

FIGS. 5-6 illustrate one embodiment of an electronic key 12. The electronic key 12 may include a control button 28 for activating the key, such as for initiating communication with a merchandise security device. Moreover, the electronic key 12 may also include one or more visual indicators. In this regard, the key 12 may include one or more status indicators 32 that illustrate a status of the communication of the key with a merchandise security device 14. The status indicators 32 may guide the user to know when communication between the key 12 and the merchandise security device 14 is taking place and has been completed. The status indicators 32 may be different depending on whether the communication was authorized (e.g., unlocked or disarmed), unauthorized (e.g., wrong zone or department), or unsuccessful. The status indicators 32 may also indicate an amount of time of authorized use remaining on the key 12, such as where the key includes a time-out feature as discussed above. The electronic key 12 may also include one or more other indicators 34 that provide a visual indication of the power remaining on the key. These other indicators 34 may also be used for any other desired purpose, such as to indicate a programming state of the key 12. For example, the indicators 34 may be activated while the electronic key 12 is being initially programmed. It is understood that the illustrated status indicators 32, 34 are for illustration only, as various types and configurations of indicators may be employed in alternative embodiments.

Figure 7:
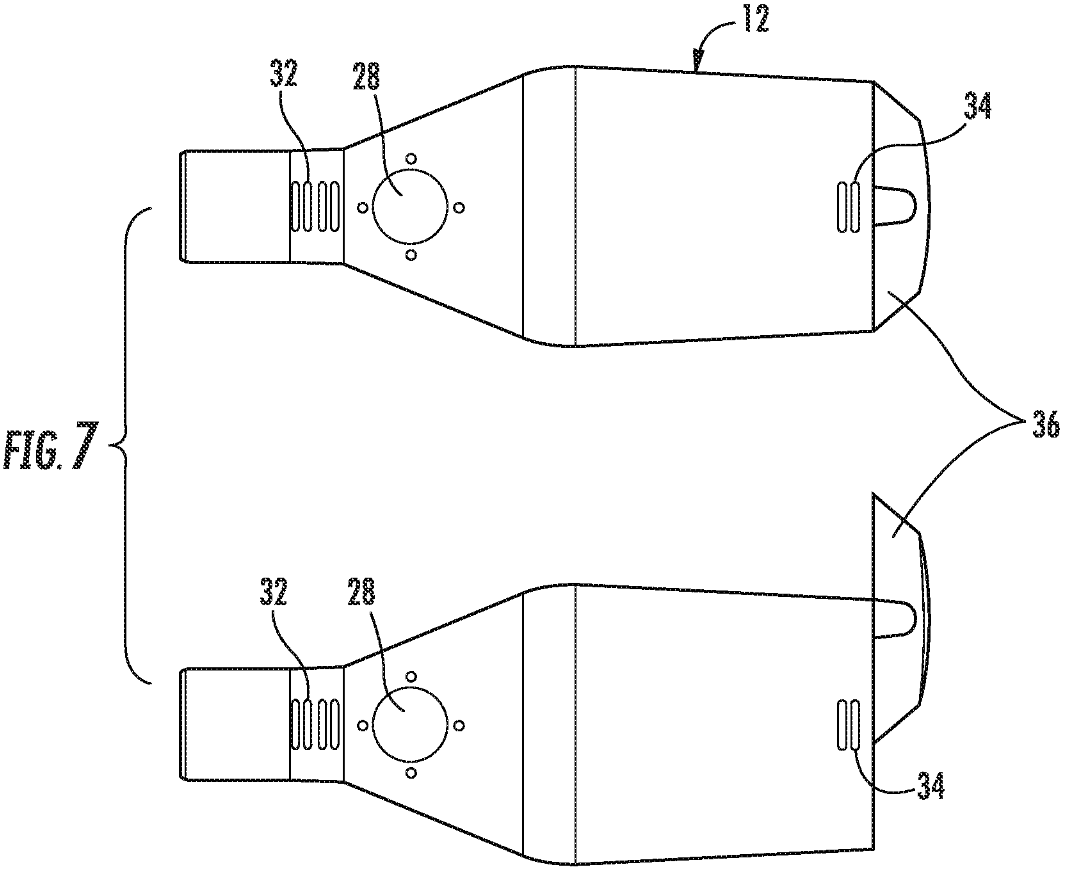
FIG. 7 is a plan view of an electronic key according to another embodiment.
Figure 8:
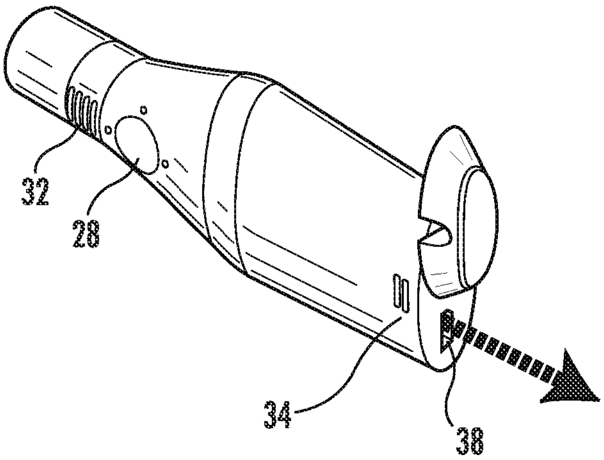
FIG. 8 is a perspective view of the electronic key shown in FIG. 7.
Figure 9:
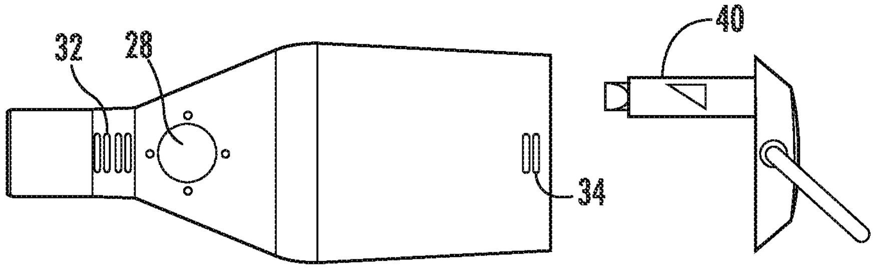
FIG. 9 is a plan view of an electronic key according to another embodiment.
Figure 10:
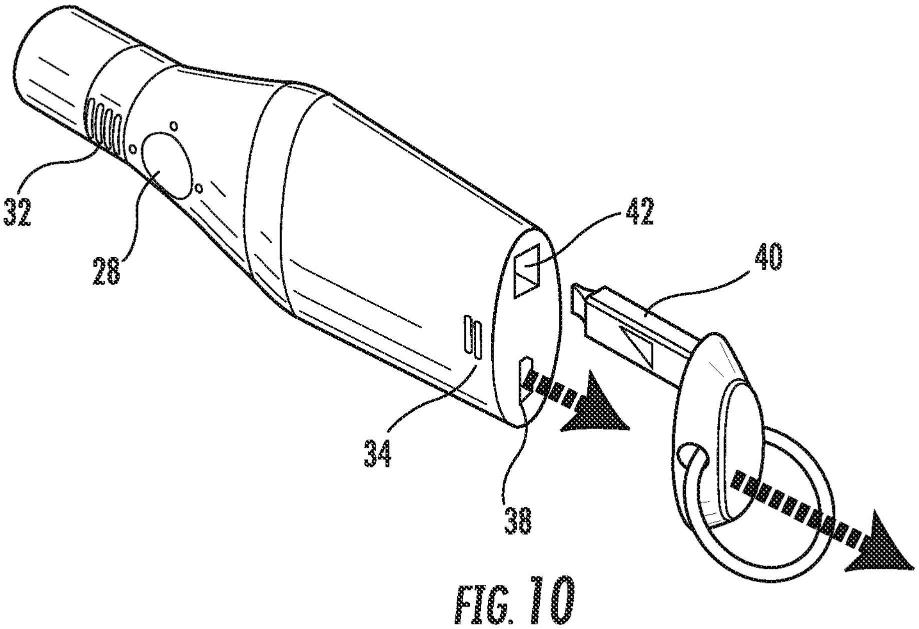
FIG. 10 is a perspective view of the electronic key shown in FIG. 9.

FIGS. 7-10 illustrate additional embodiments of electronic keys 12. In these examples, the electronic key 12 includes a removable portion 36. In FIGS. 7-8, the removable portion 36 allows access to an input power port 38, such as for recharging the electronic key 12. The removable portion 36 may be configured to slide relative to the electronic key 12 to expose the input power port 38. The input port 38 may be configured to receive and electrically connect to a corresponding connector, such as a connector associated with the charging station 18. For instance, the electronic key 12 may be configured to be docked within the charging station 18 for charging thereof (see, e.g., FIG. 1). As shown in FIGS. 9-10, the removable portion 36 may also be configured to be removed entirely from the electronic key 12 and may be multi-purpose in that it may be include a tool portion 40. For example, the tool portion 40 may be used for facilitating the disconnection of various connectors, as a screwdriver, etc. The electronic key 12 may include an opening 42 defined to receive the removable portion 36 therein in a non-use position.

Figure 20:
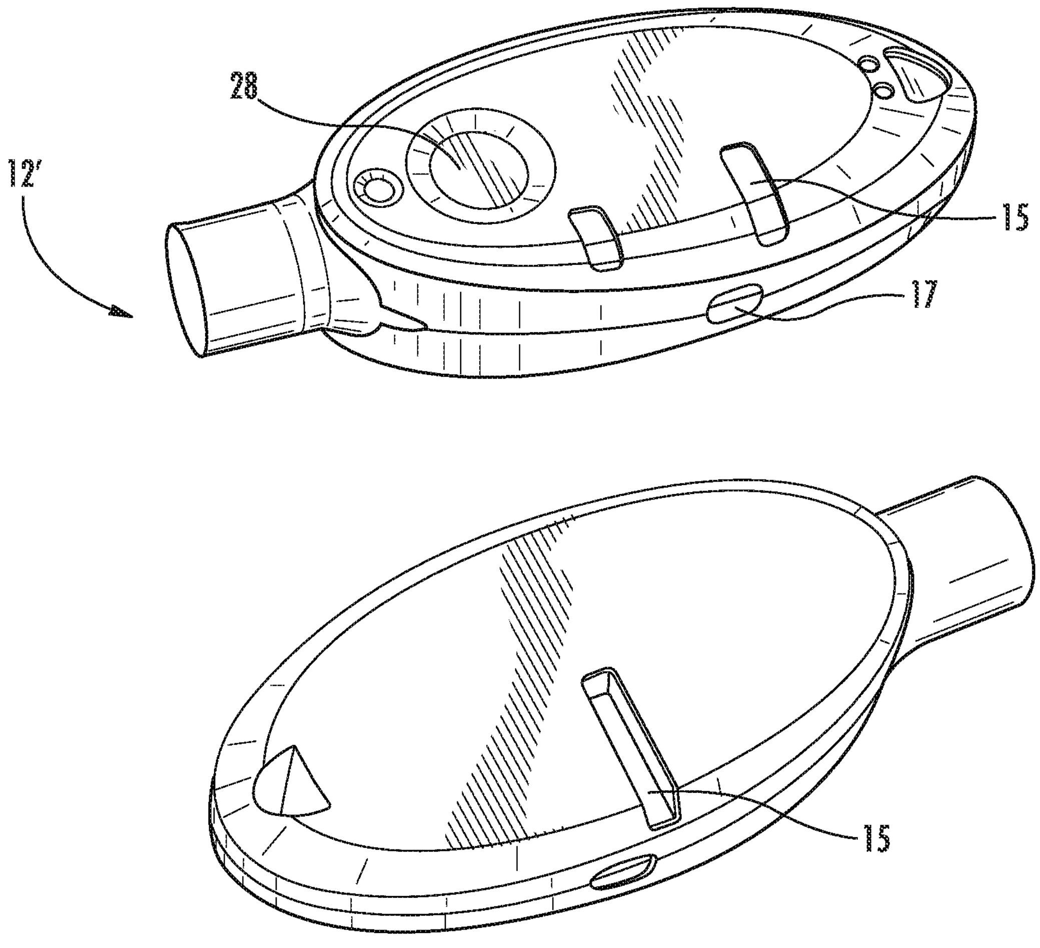
FIG. 20 illustrates top and bottom perspective views of an electronic key according to another embodiment.
Figure 21:
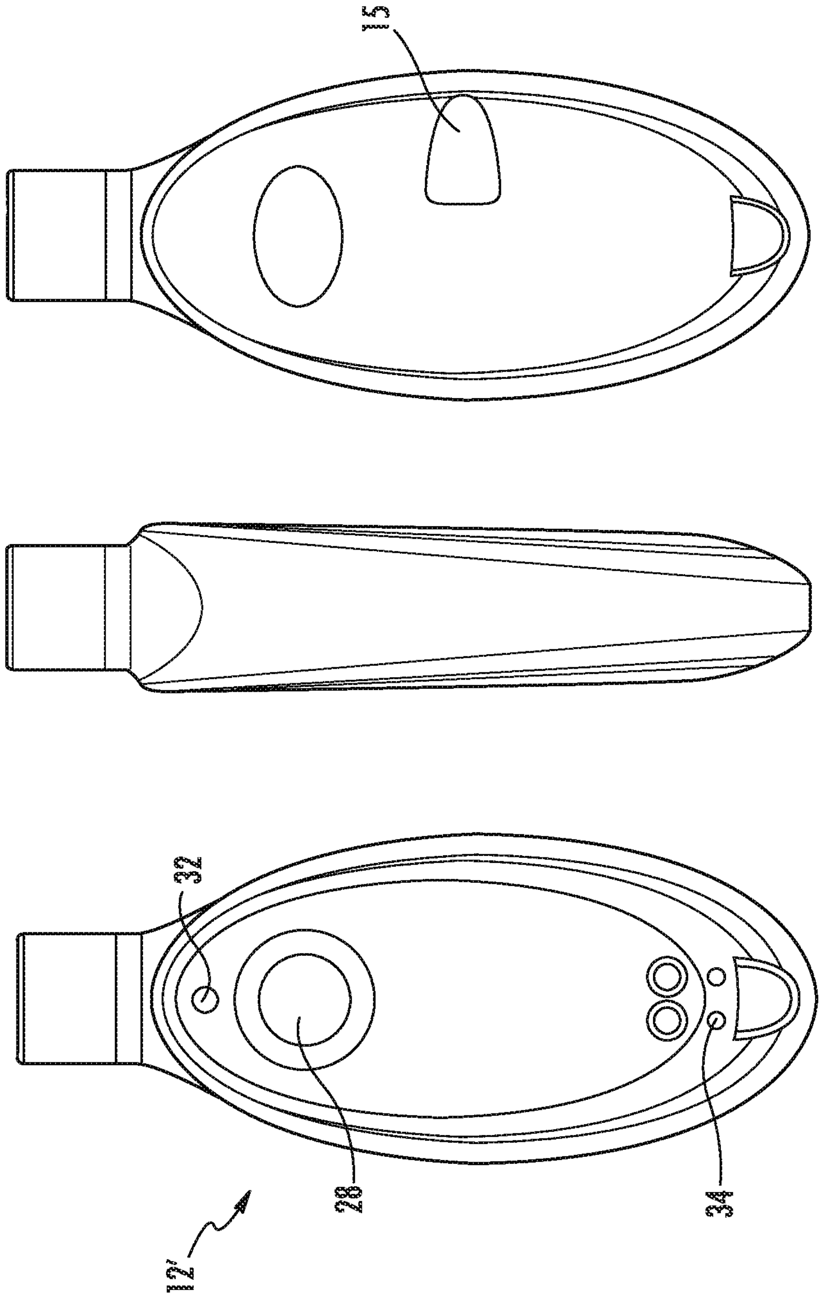
FIG. 21 illustrates plan and side views of the electronic key shown in FIG. 20.

FIGS. 20-21 show additional embodiments of an electronic key 12'. In this embodiment, the electronic key 12' includes one or more alignment features 15 for facilitating alignment with a programming or authorization station 16' and/or a charging station 18' as discussed in further detail below. In addition, the electronic key 12' includes an input port 17 (e.g., a micro-USB port) which may be configured to releasably engage a corresponding port on the programming or authorization station 16' and/or the charging station 18' for data and/or power transfer. Notably in the example shown in FIG. 20, the input port 17 on the electronic key 12' is on a side surface, while a pair of alignment features 15 are provided on opposite surfaces of the electronic key. In the embodiment shown in FIG. 21, a single alignment feature 15 is provided. The input port 17 may be located on a side surface between a transfer port at one end and a key chain ring opening at an opposite end. Positioning of the input port 17 on a side surface of the electronic key 12' may provide for a more secure and stable attachment to the programming or authorization station 16' and/or the charging station 18'. A series of status indicators 32, 34, as discussed above, for example light-emitting diodes (LEDs) may be provided on the exterior of the electronic key 12' for indicating the operating status thereof.

As shown in FIG. 1, the programming station 16 comprises a housing configured to contain the logic control circuit that generates the SDC, the memory that stores the SDC, and a communications system for communicating the SDC to the key (e.g., wirelessly). In use, the logic control circuit generates the SDC, which may be a predetermined (i.e. "factory preset") security code, a manually input security code, or a security code that is randomly generated by the logic control circuit. In the latter instance, the logic control circuit further comprises a random number generator for producing the unique SDC. A series of visual indicators, for example light-emitting diodes (LEDs) may be provided on the exterior of the housing for indicating the operating status of the programming station 16. Programming station 16 may further be provided with an access mechanism for preventing use of the programming station by an unauthorized person. For example, the programming station may include a keypad 44. An authorized user may input a code in the key pad 44 that allows the programming station 16 to generate a SDC for communicating to the key 12.

In a particular embodiment, the logic control circuit of the programming station 16 performs an electronic exchange of data with a logic control circuit of the key, commonly referred to as a "handshake communication protocol." The handshake communication protocol determines whether the key 12 is an authorized key that has not been programmed previously (e.g., a "new" key), or is an authorized key that is being presented to the programming station 16 a subsequent time to refresh the SDC. In the event that the handshake communication protocol fails, the programming station 16 will not provide the SDC to the unauthorized device attempting to obtain the SDC. When the handshake communication protocol succeeds, programming station 16 permits the SDC to be transmitted by the key 12. As will be readily apparent to those skilled in the art, the SDC may be transmitted from the programming station 16 to the key 12 by any suitable means, including without limitation, wireless, electrical contacts or electromechanical, electromagnetic or magnetic conductors, as desired. Moreover, in other cases the programming station 16 may simply provide the SDC to the electronic key 12 without first initiating any handshake communication protocol.

In some embodiments, the merchandise security device 14 is a "passive" device. As used herein, the term passive is intended to mean that the security device 14 does not have an internal power source sufficient to lock and/or unlock a mechanical lock mechanism. Significant cost savings are obtained by a retailer when the merchandise security device 14 is passive since the expense of an internal power source is confined to the key 12, and one such key is able to operate multiple security devices. If desired, the merchandise security device 14 may also be provided with a temporary power source (e.g., capacitor or limited-life battery) having sufficient power to activate an alarm, for example a piezoelectric audible alarm, that is actuated by a sensor, for example a contact, proximity or limit switch, in response to a security breach. The temporary power source may also be sufficient to communicate data, for example a SDC, from the merchandise security device 14 to the key 12 to authenticate the security device and thereby authorize the key to provide power to the security device. In other cases, the security device may be an electronic device, such as a sensor attached to the item of merchandise and a base that removably supports the sensor thereon. The sensor may be attached to the base with a tether or may be wireless (e.g., using ranging techniques as described in more detail below).

In some embodiments, the merchandise security device 14 further comprises a logic control circuit, similar to the logic control circuit disposed within the key 12, adapted to perform a handshake communication protocol with the logic control circuit of the key in essentially the same manner as that between the programming station 16 and the key. In essence, the logic control circuit of the key 12 and the logic control circuit of the merchandise security device 14 communicate with each other to determine whether the merchandise security device is an authorized device that does not have a security code, or is a device having a matching SDC. In the event the handshake communication protocol fails (e.g., the device is not authorized or the device has a non-matching SDC), the key 12 will not program the device with the SDC, and consequently, the merchandise security device will not operate. If the merchandise security device 14 was previously programmed with a different SDC, the device will no longer communicate with the key 12. In the event the handshake communication protocol is successful, the key 12 permits the SDC stored in the key to be transmitted to the merchandise security device 14 to program the device with the SDC. As will be readily apparent to those skilled in the art, the SDC may be transmitted from the key 12 to the merchandise security device 14 by any suitable means, including without limitation, via radiofrequency, one or more electrical contacts, electromechanical, electromagnetic or magnetic conductors, as desired. Furthermore, the SDC may be transmitted by inductive transfer of data from the electronic key 12 to the merchandise security device 14. Moreover, in other cases the electronic key 12 may simply provide the SDC to the merchandise security device 14 without first initiating any handshake communication protocol.

In one embodiment, when the handshake communication protocol is successful and the merchandise security device 14 is an authorized device having the matching SDC, the merchandise security device may be armed or disarmed, such as where the security device includes an alarm circuit. In other embodiments, the merchandise security device 14 may be armed or disarmed when the SDC codes match. In some embodiments, when the handshake communication protocol is successful and the SDC codes match, the logic control circuit of the key 12 causes an internal power source of the key to transfer electrical power to the device 14 to operate a mechanical lock mechanism. In other embodiments, the merchandise security device 14 may be locked or unlocked when the SDC codes match and power is transferred to the merchandise security device. It is understood that various information and codes may be exchanged in order to perform the desired function, such as arming, disarming, locking, or unlocking the merchandise security device 14. For example, the data exchanged may include a serial number of the merchandise security device alone and/or an SDC.

Figure 11:
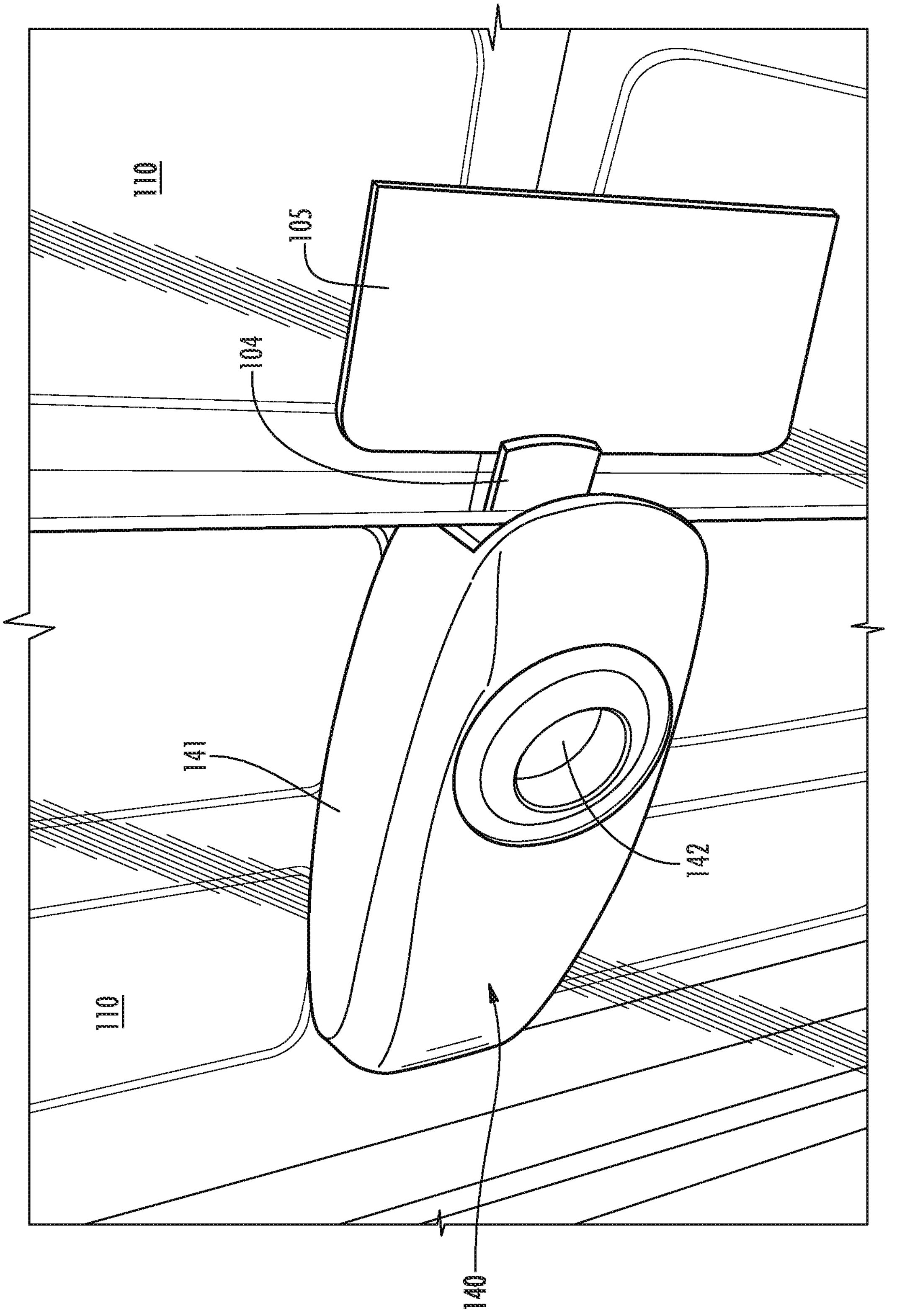
FIG. 11 is a perspective view of a merchandise security device according to one embodiment.

FIG. 11 shows one embodiment of a merchandise security device 140 in greater detail. As previously mentioned, the merchandise security device 14 can be any type of security device that utilizes an alarm circuit and/or a lock mechanism that locks and/or unlocks a lock. In some cases, the merchandise security device 140 may be a passive device in the sense that it does not have an internal power source sufficient to operate a lock mechanism. As a result, the merchandise security device 140 may be configured to receive power, or alternatively, both power and data, from an external source, such as the electronic key 12 shown and described herein. The embodiment of the merchandise security device depicted in FIG. 11 is a cabinet lock configured to be securely affixed to the locking arm 104 of a conventional cabinet lock bracket 105. As previously described, the cabinet lock 140 may include a logic control circuit for performing a handshake communication protocol with the logic control circuit of the key 12 and for receiving the SDC from the key. In other embodiments, the cabinet lock 140 may be configured to transmit the SDC to the key 12 to authenticate the security device and thereby authorize the key to transfer power to the security device.

Figure 12:
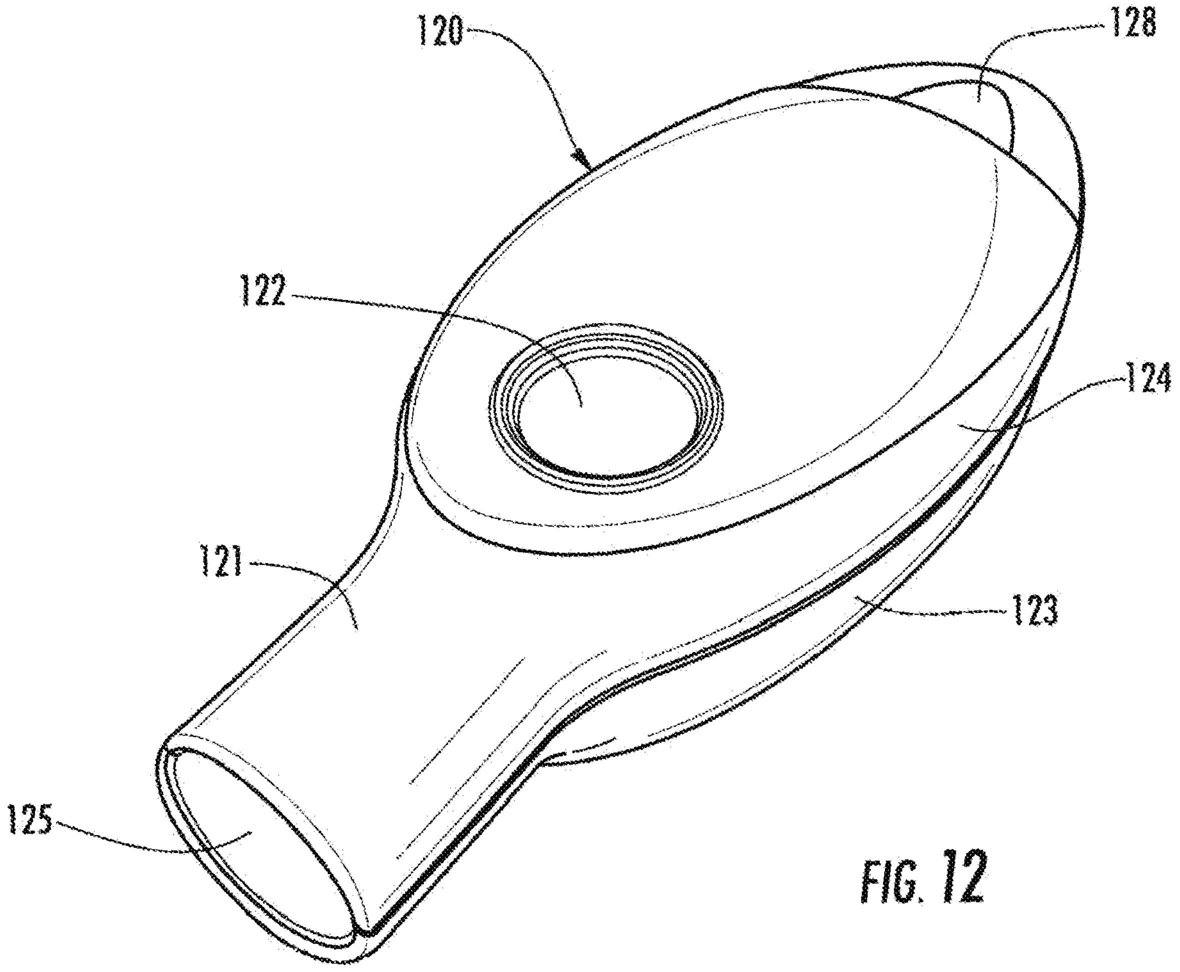
FIG. 12 is a perspective view of an electronic key according to one embodiment.

FIG. 12 shows an embodiment of an electronic key 120 with inductive transfer in greater detail. As previously mentioned, the key 120 may be configured to transfer both data and power to a merchandise security device 140. Accordingly, the programmable electronic key 120 may be an active device in the sense that it has an internal power source sufficient to operate a mechanical lock mechanism of the merchandise security device 140. As a result, the programmable electronic key 120 may be configured to transfer both data and power from an internal source, such as a logic control circuit (e.g., data) and a battery (e.g., power) disposed within the key. The embodiment of the programmable electronic key 120 depicted herein is a key with inductive transfer capability configured to be received within a transfer port 142 of the cabinet lock 140 shown in FIG. 11, as well as a programming port 46 of the programming station and the charging port 30 of the charging station. Thus, the electronic key 120 may be placed proximate to or within the transfer port 142 for communicating therewith. In some embodiments, a tag (e.g., RFID or NFC tag) as discussed above, may be positioned within the transfer port, or otherwise on the security device 140, so that the electronic key 120 is configured to read or otherwise obtain identification data from the tag.

In some embodiments, the electronic key 120 comprises a housing 121 having an internal cavity or compartment that contains the internal components of the key, including without limitation the logic control circuit, memory, communication system and battery, as will be described. As shown, the housing 121 is formed by a lower portion 123 and an upper portion 124 that are joined together after assembly, for example by ultrasonic welding. The electronic key 120 further defines an opening 128 at one end for coupling the key to a key chain ring, lanyard or the like. The electronic key 120 may further comprise a transfer probe 125 located at an end of the housing 121 opposite the opening 128 for transferring data and/or power to the merchandise security device 140. The transfer probe 125 is also operable to transmit and receive a handshake communication protocol and the SDC from the programming station 16, as previously described, and to receive power from a charging station.

Figure 13:
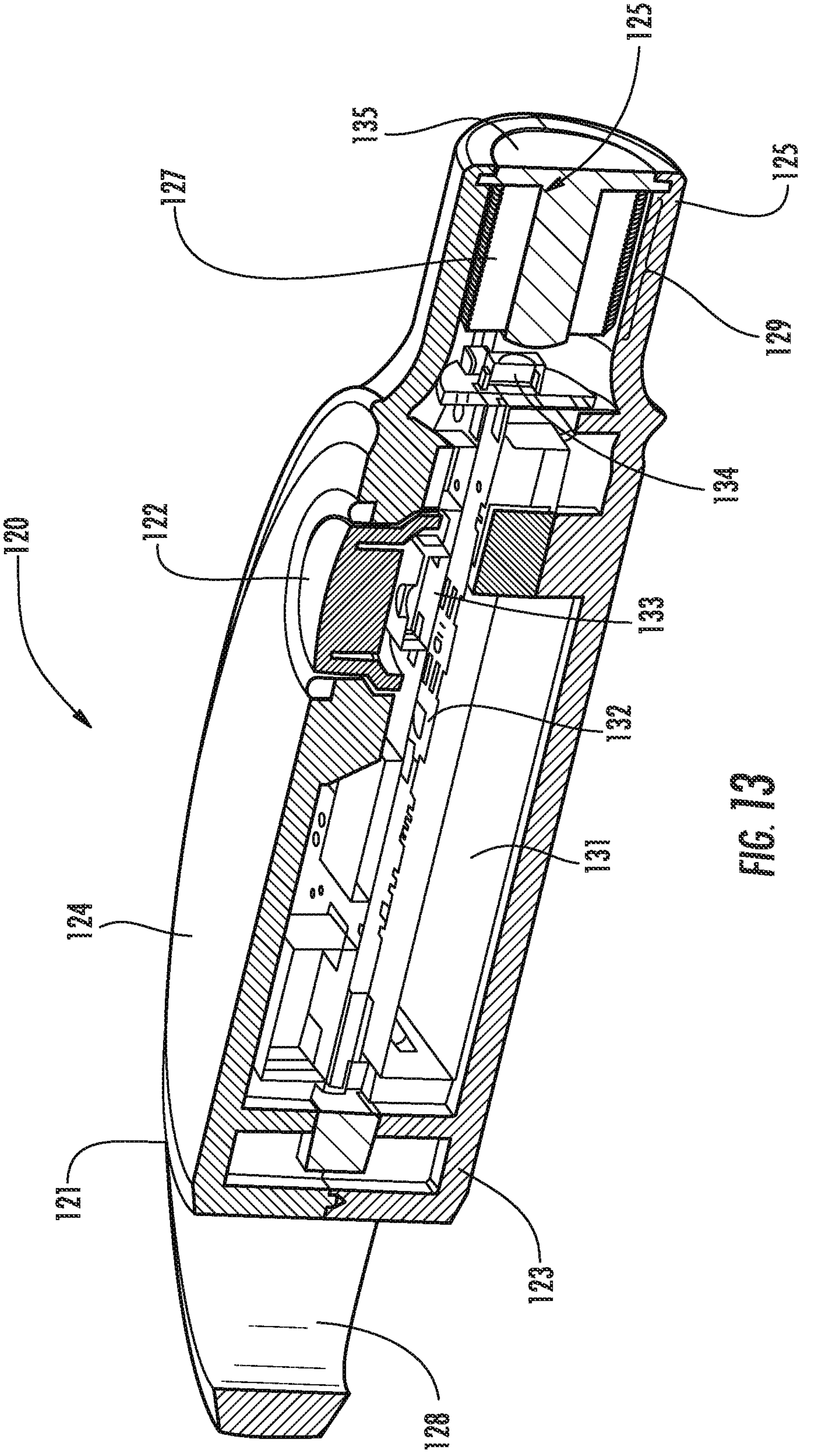
FIG. 13 is a cross-sectional view of the electronic key shown in FIG. 12.

As best shown in FIG. 13, an internal battery 131 and a logic control circuit, or printed circuit board (PCB) 132 are disposed within the housing 121 of the electronic key 120. Battery 131 may be a conventional extended-life replaceable battery or a rechargeable battery suitable for use with the charging station 18. The logic control circuit 132 is operatively coupled and electrically connected to a switch 133 that is actuated by the control button 122 provided on the exterior of the key 120 through the housing 121. Control button 122 in conjunction with switch 133 controls certain operations of the logic control circuit 132, and in particular, transmission of the data and/or power. In that regard, the logic control circuit 132 is further operatively coupled and electrically connected to a communication system 134 for transferring data and/or power. In one embodiment, the communication system 134 is a wireless infrared (IR) transceiver for optical transmission of data between the electronic key 120 and the programming station, and between the key and the merchandise security device 140. As a result, the transfer probe 125 of the key 120 may be provided with an optically transparent or translucent filter window 135 for emitting and collecting optical transmissions between the key 120 and the programming station 16, or between the key and the merchandise security device 140, as required. Transfer probe 125 may further comprise an inductive core 127 and inductive core windings 129 for transferring electrical power to the merchandise security device 140 and/or receiving electrical power from the charging station 18 to charge the internal battery 131, as required. Alternatively, the optical transceiver 134 may be eliminated and data transferred between the programmable electronic key 120 and the merchandise security device 140 via magnetic induction through the inductive coil 126.

In some embodiments, an important aspect of an electronic key 120, especially when used for use in conjunction with a merchandise security device 140 as described herein, is that the key does not require a physical force to be exerted by a user on the key to operate the mechanical lock mechanism of the merchandise security device. By extension, no physical force is exerted by the key 120 on the mechanical lock mechanism. As a result, the key 120 cannot be unintentionally broken off in the lock, as often occurs with conventional mechanical key and lock mechanisms. Furthermore, neither the key 120 nor and the mechanical lock mechanism suffer from excessive wear as likewise often occurs with conventional mechanical key and lock mechanisms. In addition, in some cases there is no required orientation of the transfer probe 125 of the electronic key 120 relative to the ports on any one of the programming station, charging station, and/or the merchandise security device 140. Accordingly, any wear of the electrical contacts on the transfer probe 125 and ports may be minimized. As a further advantage in some embodiments, an authorized person is not required to position the transfer probe 125 of the electronic key 120 in a particular orientation relative to the transfer port 142 of the merchandise security device 140 and thereafter exert a compressive and/or torsional force on the key to operate the mechanical lock mechanism of the device.

Figure 22:
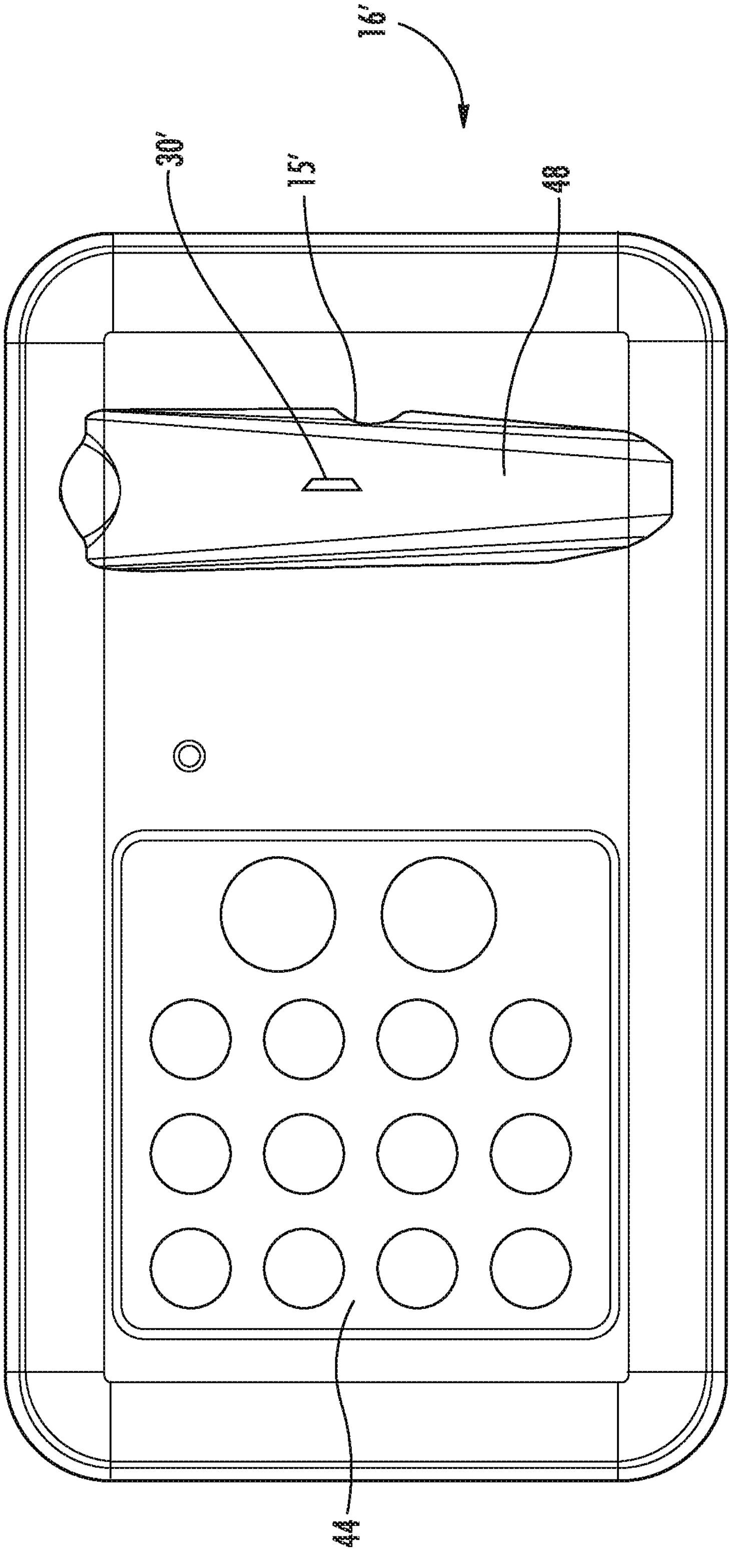
FIG. 22 is a plan view of a programming or authorization station according to one embodiment.
Figure 23:
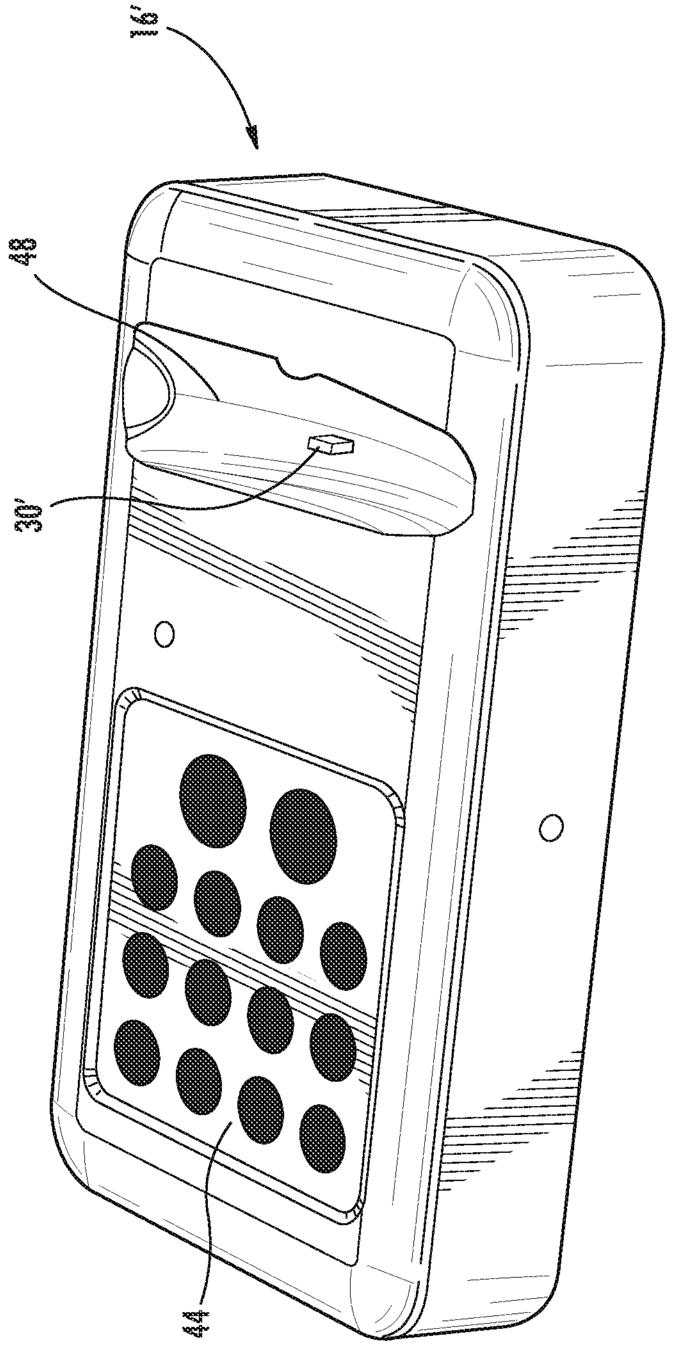
FIG. 23 is a perspective view of the programming or authorization station shown in FIG. 22.
Figure 24:
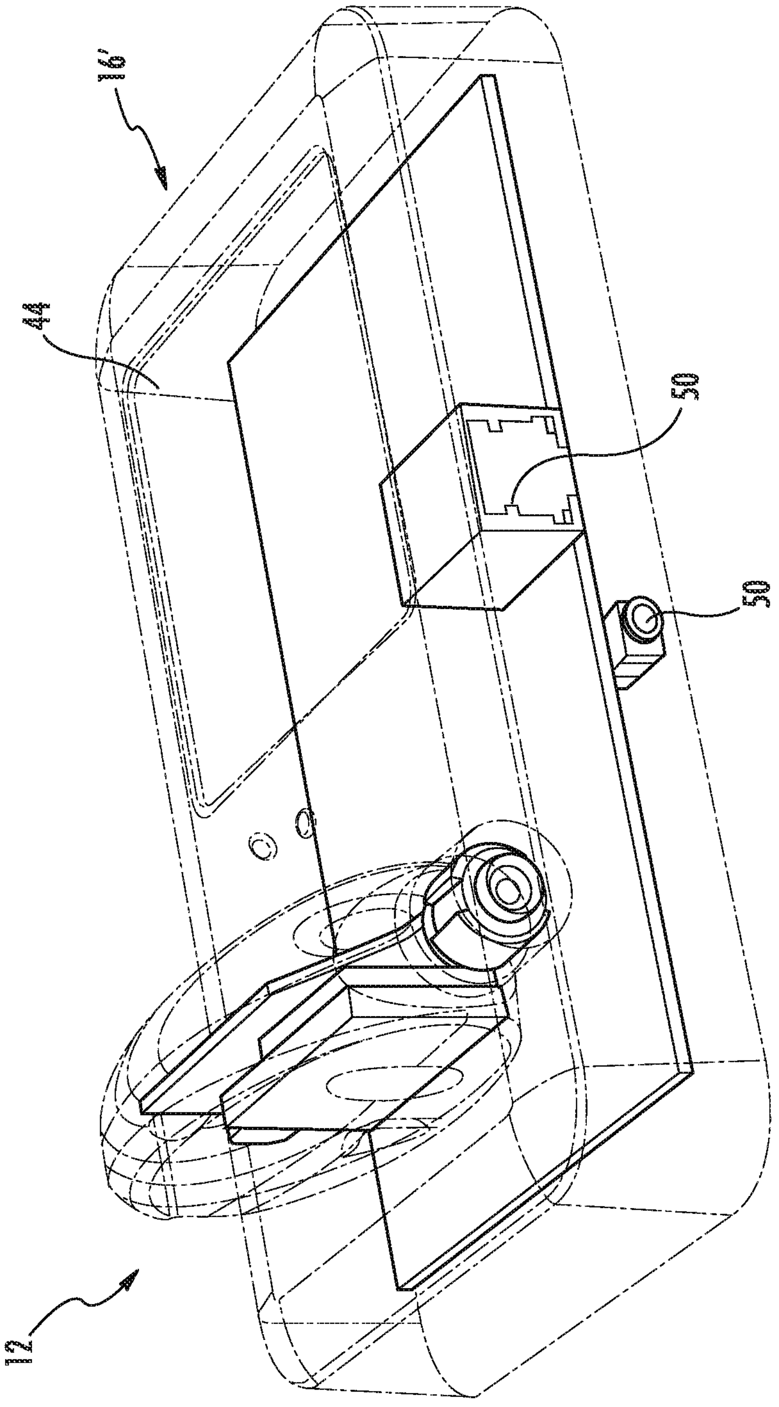
FIG. 24 is another perspective view of the programming or authorization station shown in FIG. 22.

FIGS. 22-24 illustrate an embodiment of a programming or authorization station 16'. As illustrated, the programming or authorization station 16' includes a geometry for receiving the electronic key 12' as discussed above (see, e.g., FIG. 21). In this regard, the programming or authorization station 16' may include one or more alignment features 15' configured to align with and engage alignment feature 15 of the electronic key 12'. Moreover, the programming or authorization station 16' may further define a recess 48 for at least partially receiving a side surface of the electronic key 12'. The recess 48 may be curved or any other shape for corresponding to the shape of the electronic key 12'. Within the recess 48, the programming or authorization station 16' may include a port 30' for releasably engaging the input port 17 of the electronic key 12'. The alignment features 15, 15' are configured to align with one another to ensure that the input port 17 and port 30' align with and engage one another. Such engagement may allow for data communication between the electronic key 12' and the programming or authorization station 16', which may occur in some cases, upon entry of an authorized code using keypad 44. In addition, the programming or authorization station 16' may include one or more input ports 50 for receiving power and data communication (e.g., an Ethernet port).

FIG. 1 shows a charging station 18 in greater detail. As previously mentioned, the charging station 18 recharges the internal battery 131 of the key 12. In certain instances, the charging station 18 also deactivates the data transfer and/or power transfer capability of the key 12 until the key has been reprogrammed with the SDC by the programming station 16 or the user provides an authorized code to the charging station. Regardless, the charging station 18 comprises a housing for containing the internal components of the charging station. The exterior of the housing has at least one, and preferably, a plurality of charging ports 30 formed therein that are sized and shaped to receive the electronic key 12 (see, e.g., FIG. 1). Mechanical or magnetic means may be provided for properly positioning and securely retaining the key 12 within the charging port 18 for ensuring proper power transfer.

Figure 16:
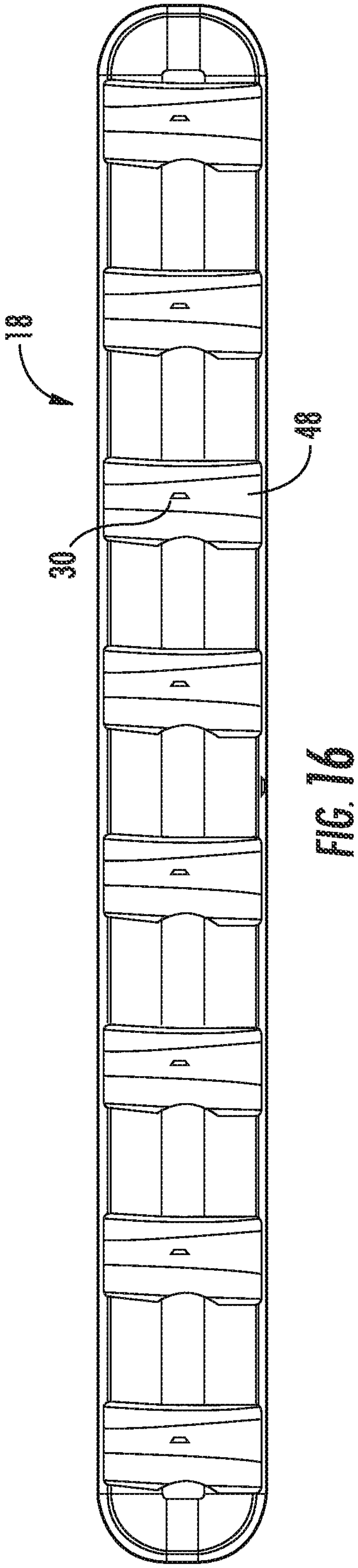
FIG. 16 is a plan view of a charging station according to one embodiment.
Figure 17:
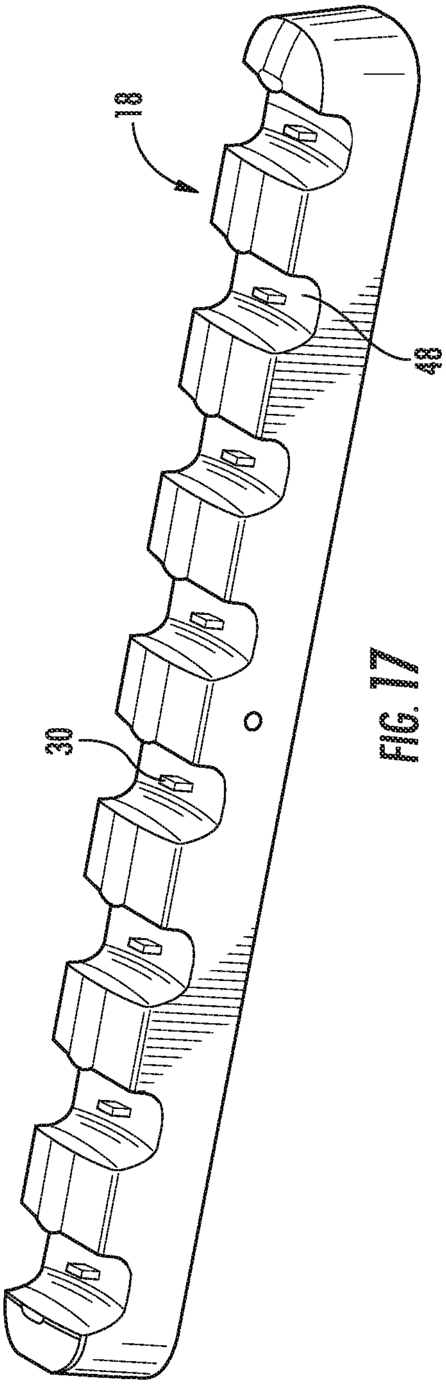
FIG. 17 is a perspective view of the charging station shown in FIG. 16.
Figure 18:
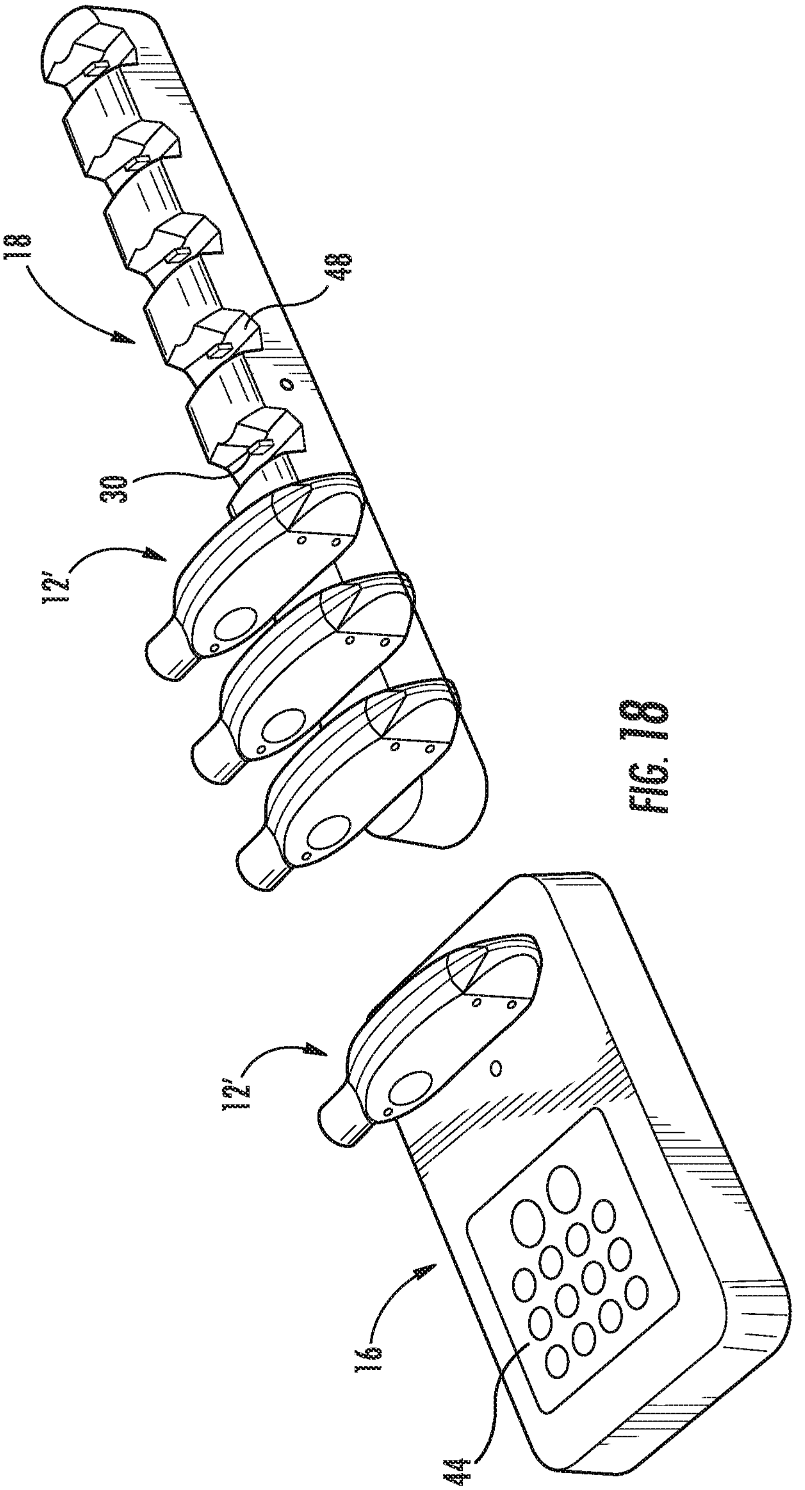
FIG. 18 illustrates a merchandise security system according to one embodiment.

FIGS. 16-18 show an embodiment of a charging station 18 wherein a plurality of ports 30 are provided for engagement with a plurality of corresponding electronic keys 12'. The electronic key 12' shown in FIG. 21 may be compatible with the charging station 18 shown in FIGS. 16-18 whereby the electronic key 12' includes an input port 17 on its side for engagement with the port 30, similar to that described in conjunction with programming or authorization station 16'. Likewise, each port 30 may be located within a respective recess 48 for receiving at least a side surface of the electronic key 12'. This arrangement may allow for a greater number of electronic keys 12' to be engaged with the charging station 18 at any one time.

Figure 14:
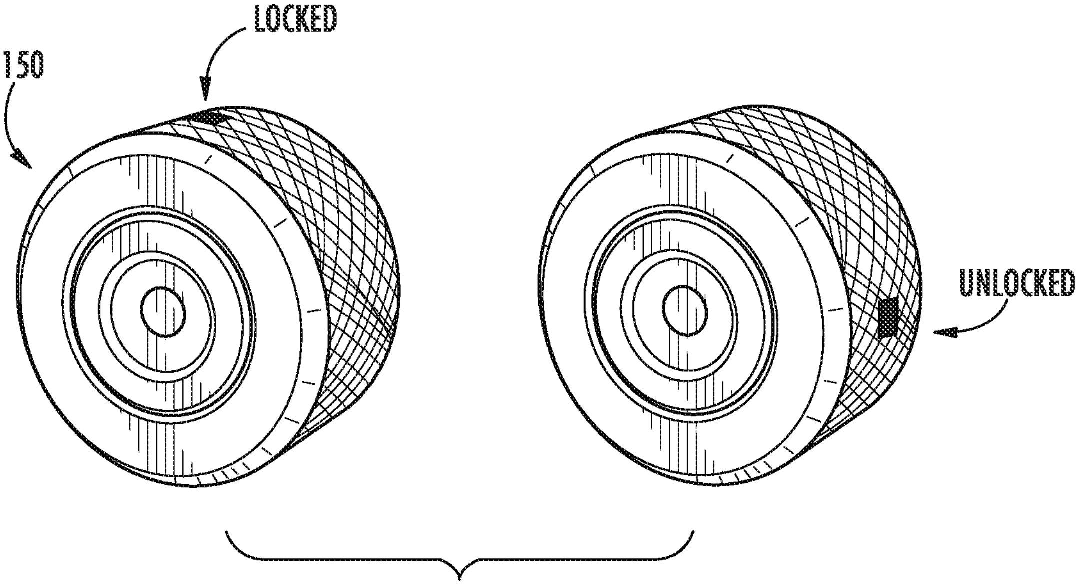
FIG. 14 is a perspective view of a merchandise security device in a locked and unlocked position according to one embodiment.
Figure 15:
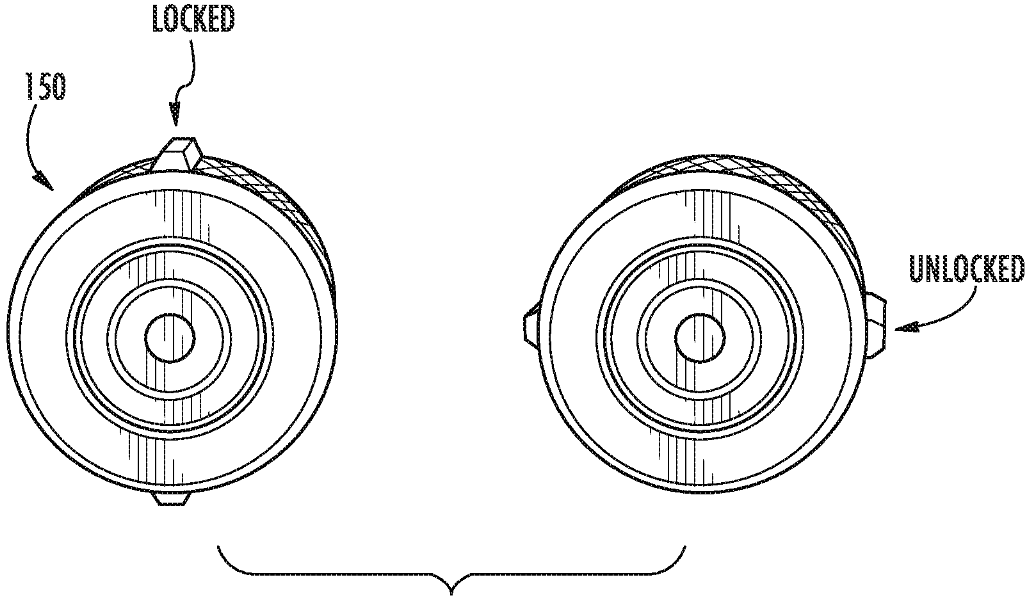
FIG. 15 is a perspective view of a merchandise security device in a locked and unlocked position according to another embodiment.

FIGS. 14-15 show additional embodiments of a merchandise security device 150. In this embodiment, the merchandise security device 150 comprises a lock mechanism that utilizes "energy harvesting". Thus, the merchandise security device 150 may be a passive device as described above. However, in this embodiment, the merchandise security device 150 includes means for generating power to be stored. For example, the merchandise security device 150 may be configured to rotate between locked and unlocked positions and include a generator configured to generate energy to be stored (e.g., via a capacitor). In some cases, the merchandise security device 150 may include a bezel and each turn of the bezel may generate an electrical charge to be stored. In one embodiment, the electronic key 12 may be used initially to disengage a mechanical lock, and then the merchandise security device 150 may be rotated to an unlocked position. The merchandise security device 150 may then be rotated back to the locked position. Since the merchandise security device 150 has no power source, the security device is capable of performing various security functions using the stored power. For instance, the merchandise security device 150 may be configured to use the stored power to push data to one or more nodes 20 or to generate audible and/or visible signals. In one example, the merchandise security device 150 may include an internal radio for transmitting wireless signals using the stored power, such as for generating a distress signal when the security device is tampered with. In another example, the merchandise security device 150 may include a light-emitting device (LED) that is powered by the stored power.

Figure 25:
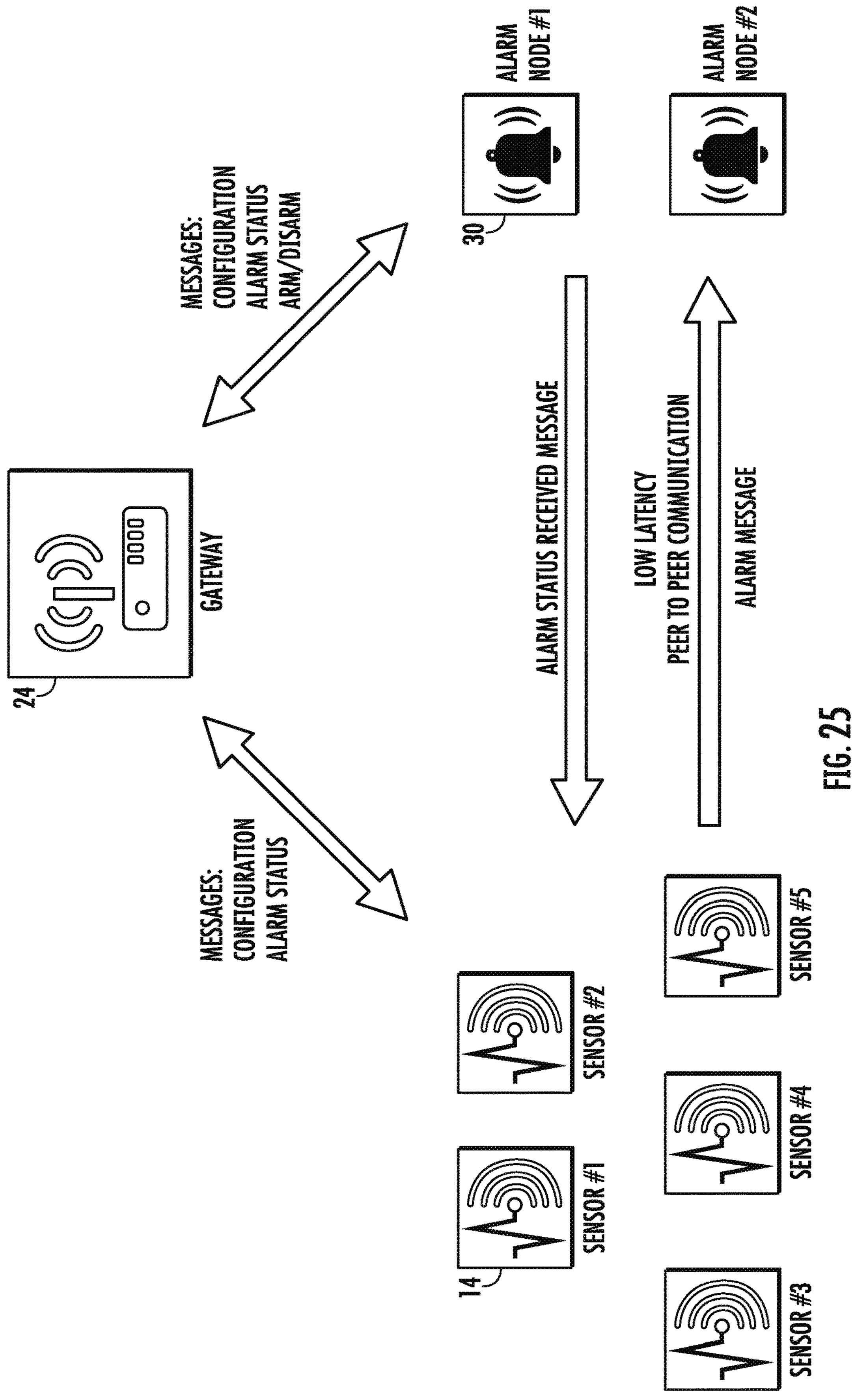
FIG. 25 is a schematic illustration of a plurality of sensors and alarm nodes communicating in a wireless network according to one embodiment.
Figure 26:
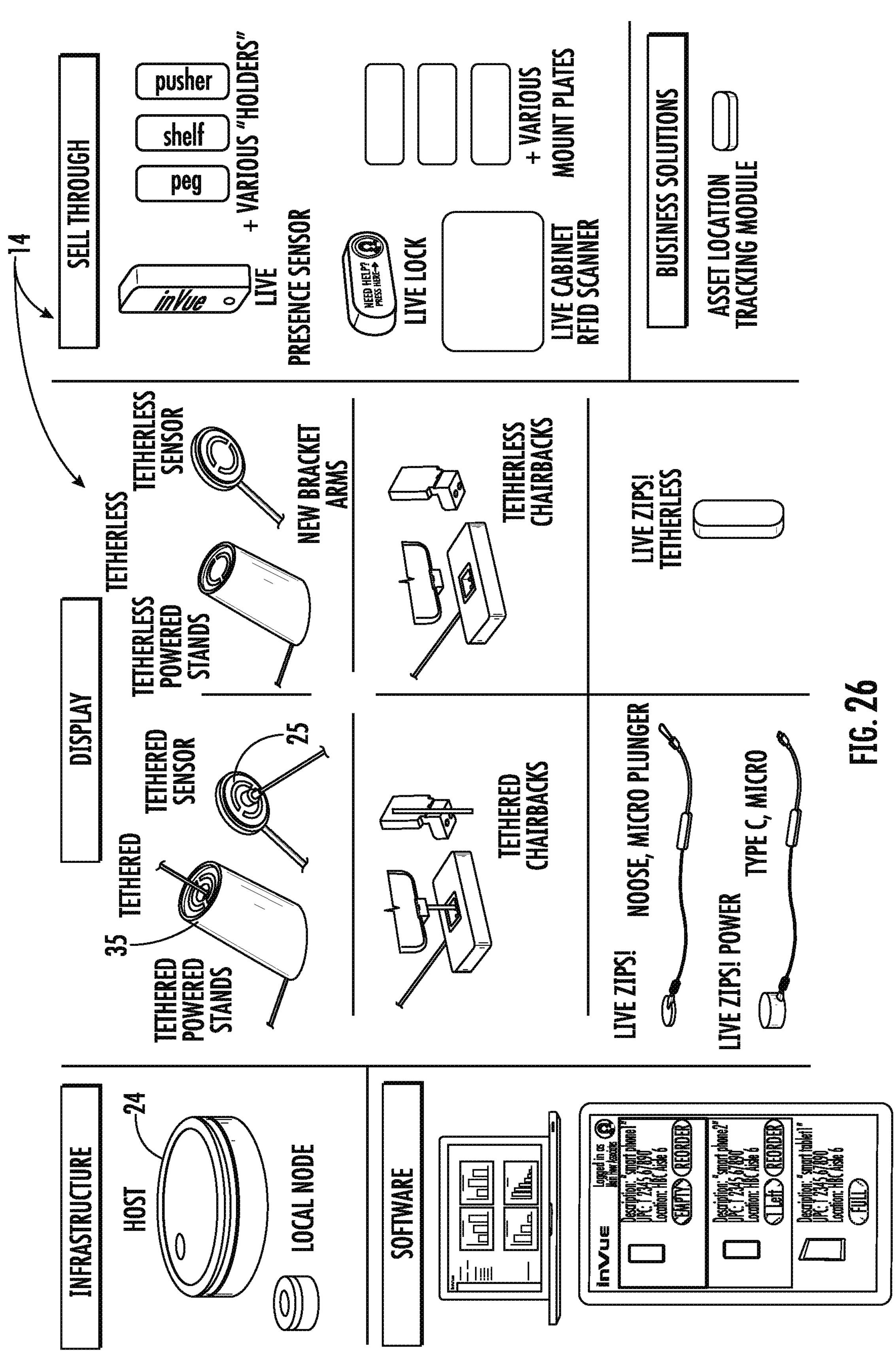
FIG. 26 is a schematic of infrastructure and security devices within a wireless network according to one embodiment of the present invention.

In another embodiment, a plurality of nodes are employed for peer-to-peer communication to facilitate the generation of an alarm signal, such as audible and/or visible signals. For example, FIG. 25 shows a plurality of merchandise security devices 14 (e.g., sensors) and alarm nodes 30 configured to wirelessly communicate various information to a gateway 24 via a network. For example, the sensors 14 and/or nodes 30 may be configured to send information to and receive information from the gateway 24 regarding their configuration, alarm status (e.g., alarming, armed, disarmed), and/or instructions (e.g., arm, alarm, or disarm). The merchandise security devices 14 and nodes 30 may also be configured to communicate directly with one another as described below, as well as to switch between communication with the gateway 24 and one another. Any number of nodes 30 could be located at various positions within a retail store, for example, such as on a display table or store entrance or exit. The nodes 30 may communicate wirelessly with merchandise security devices 14 and a gateway 24 within a network, such as described above using various wireless communication protocols. One disadvantage of using wireless communication to initiate the alarm at a location that is remote from the merchandise security device 14 is that the alarm signals often have to travel to a wireless hub where a server then deciphers the data and decides to send out an alarm signal to the appropriate alarm node. This kind of system may create latency in generating the alarm signal, particularly if the server is not local, and if any component of the wireless chain of communication is interrupted (e.g., the hub loses power), the alarm signal may never reach the alarm node and thus no alarm occurs. In one embodiment, multiple modes of communication may be used to reduce or eliminate these issues. For example, in addition to a first wireless communication protocol between the merchandise security devices 14 and gateway 24 and/or alarm nodes 30 and the gateway (e.g., WiFi, LoRa, etc.), a second wireless communication protocol may be used that is a direct node-to-node communication scheme between the merchandise security devices and the alarm nodes that does not have to also communicate with any hub or gateway. The communication protocols could be the same or different in some embodiments. In one example, the second wireless communication protocol could be performed using the same radio antennas that the other operational signals are communicated with the hub or gateway 24 (e.g., Wi-Fi, LoRa, etc.), which thereby adds no additional cost or size to either the merchandise security devices 14 and the alarm nodes 30 in order to accomplish the communication. However, a second radio is also an option. Additionally, the alarm signal could be broadcast on a different frequency than the other signals in order to address regional regulatory requirements and/or if it is detected or known that certain frequency bands are getting congested. This communication could be two-way, but one-way communication would be sufficient in most circumstances. The merchandise security device 14 may send out a "help me" signal in response to a security event. The alarm node 30 would then only have to "listen" for that signal and if it receives the signal, the alarm node may generate an alarm by whatever means it is programmed for (e.g., light, sound, vibration, etc.).

In some instances, a plurality of alarm nodes 30 may be used, and particular merchandise security device(s) 14 may be configured to activate specific alarm node(s). For example, in the instance where a retail store includes a plurality of display tables for a plurality of merchandise security devices 14, there may be an alarm node 30 associated with each table which would only be triggered by a "help me" signal from any one of the merchandise security devices associated with the same table. In this situation, an identifier (e.g., an ID code) could be added to the "help me" signal that corresponds to a code stored in the alarm node 30. Thus, the alarm node 30 may have to receive or identify its code in order to generate an alarm signal. This could be as simple as the code itself being the "help me" signal or some other instruction code could be added to or included with the identifier, for example, if more than one action (e.g., "alarm" or "stop alarming") needed to be communicated to the alarm node. The merchandise security device 14 may be configured to generate this "help me" signal immediately upon a breach and only after sending the signal to the alarm node 30, would the merchandise security device then communication via the wireless communication to a hub and gateway that a breach has occurred. Thus, the latency delay should be minimized in such a breach scenario.

Figure 43:
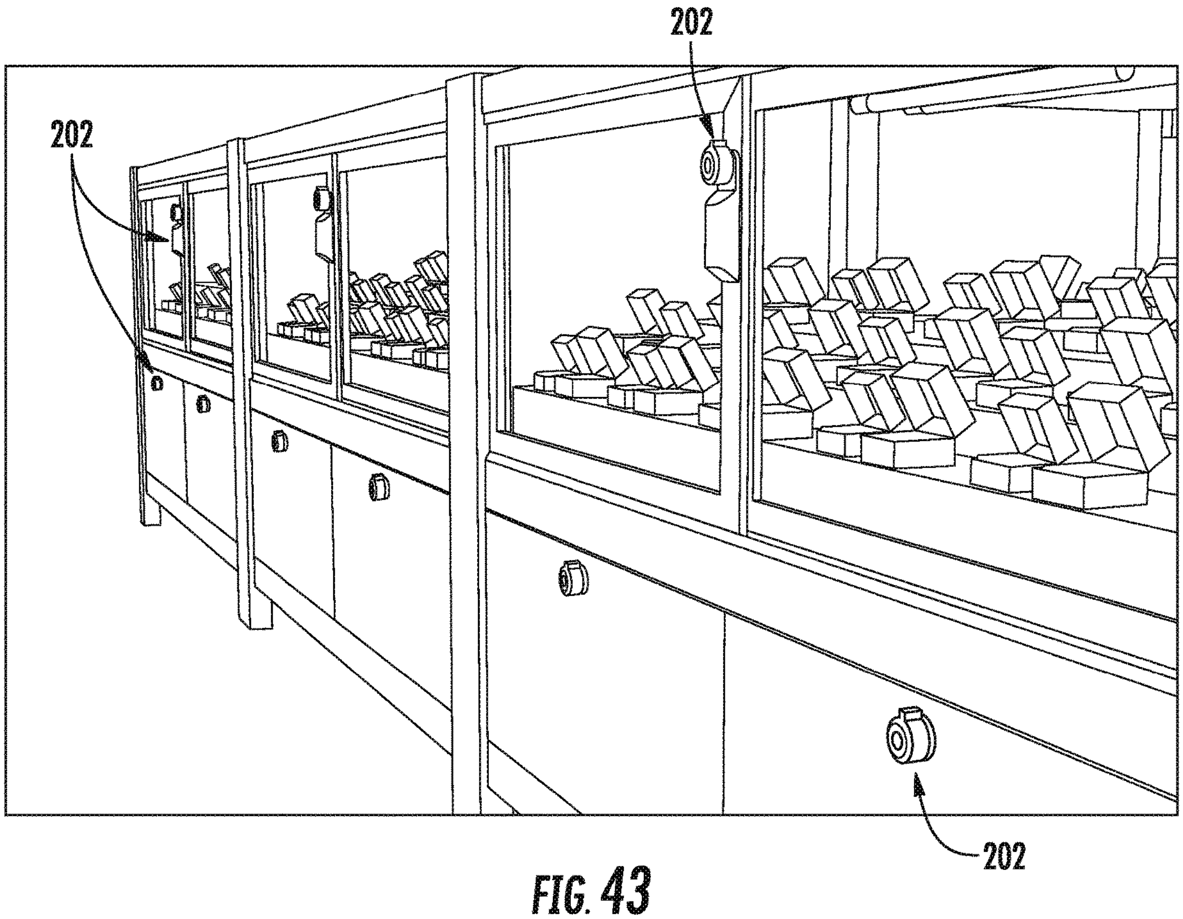
FIG. 43 is a perspective view of a merchandise display security system according to one embodiment.
Figure 44:
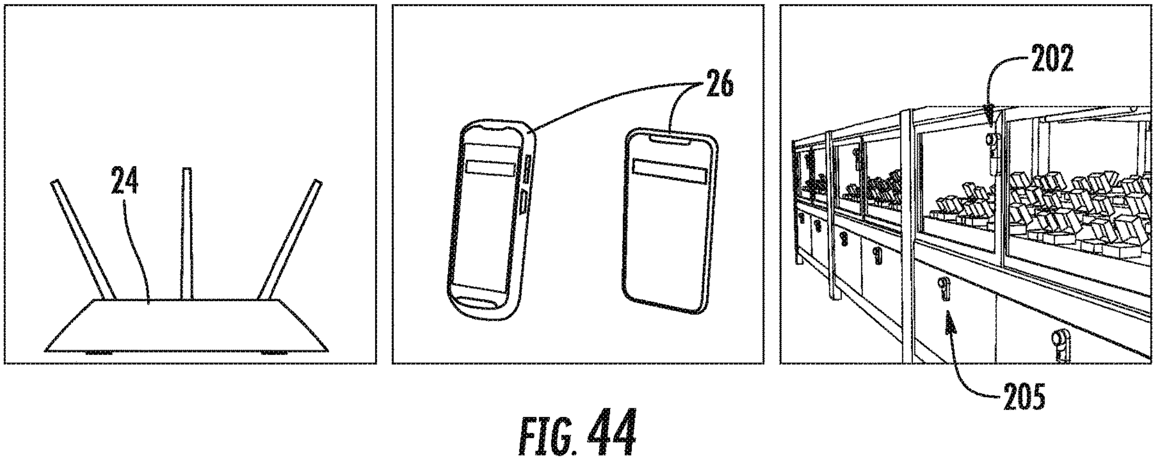
FIG. 44 illustrates various components of a merchandise display security system according to one embodiment.
Figure 47:
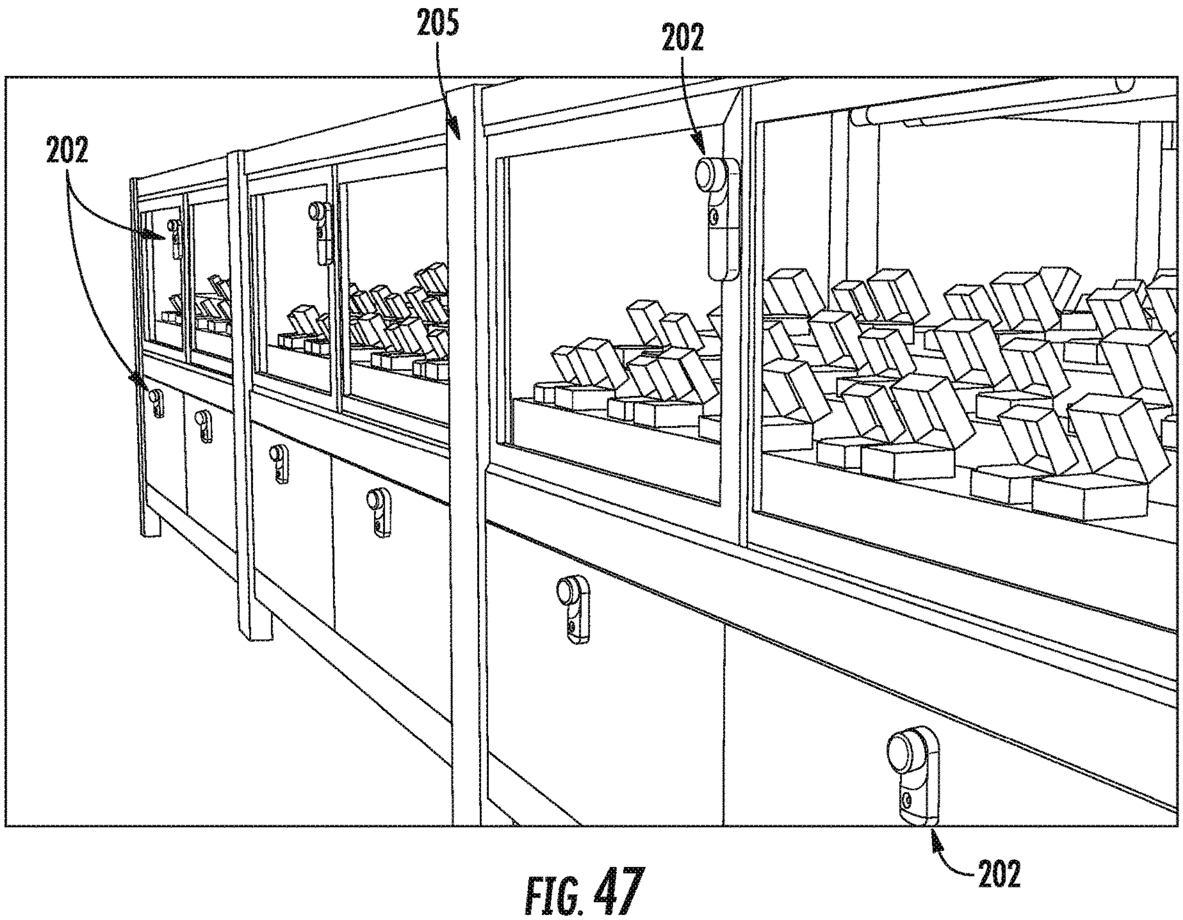
FIG. 47 is a perspective view of a merchandise display security system according to another embodiment.
Figure 48:
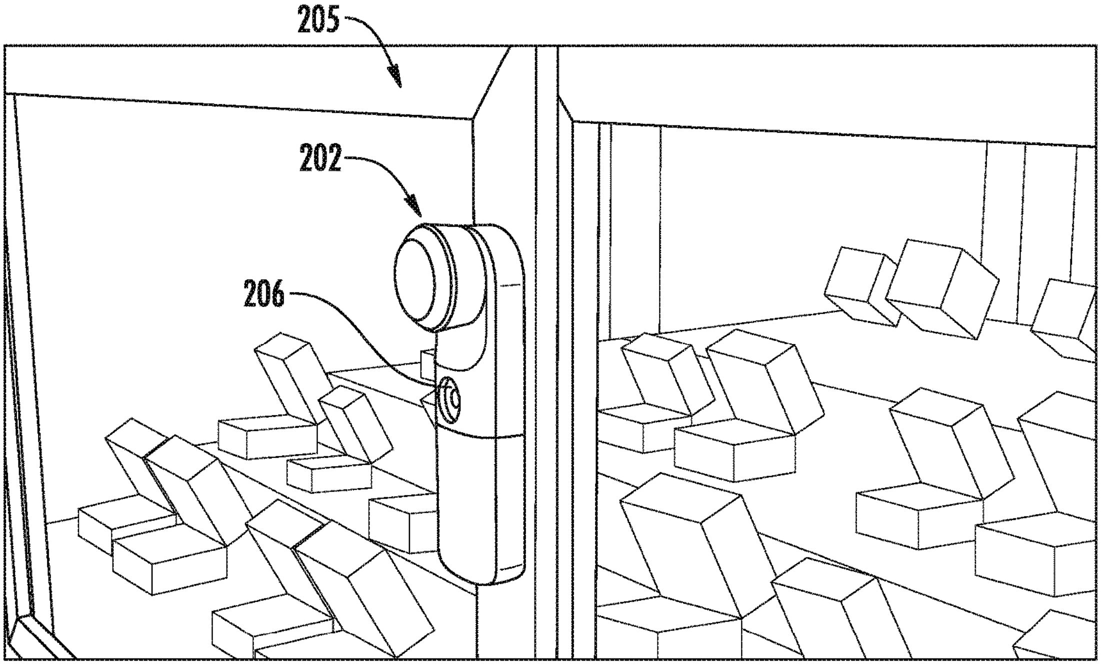
FIG. 48 is a perspective view of a lock mounted to a fixture according to one embodiment.
Figure 49:
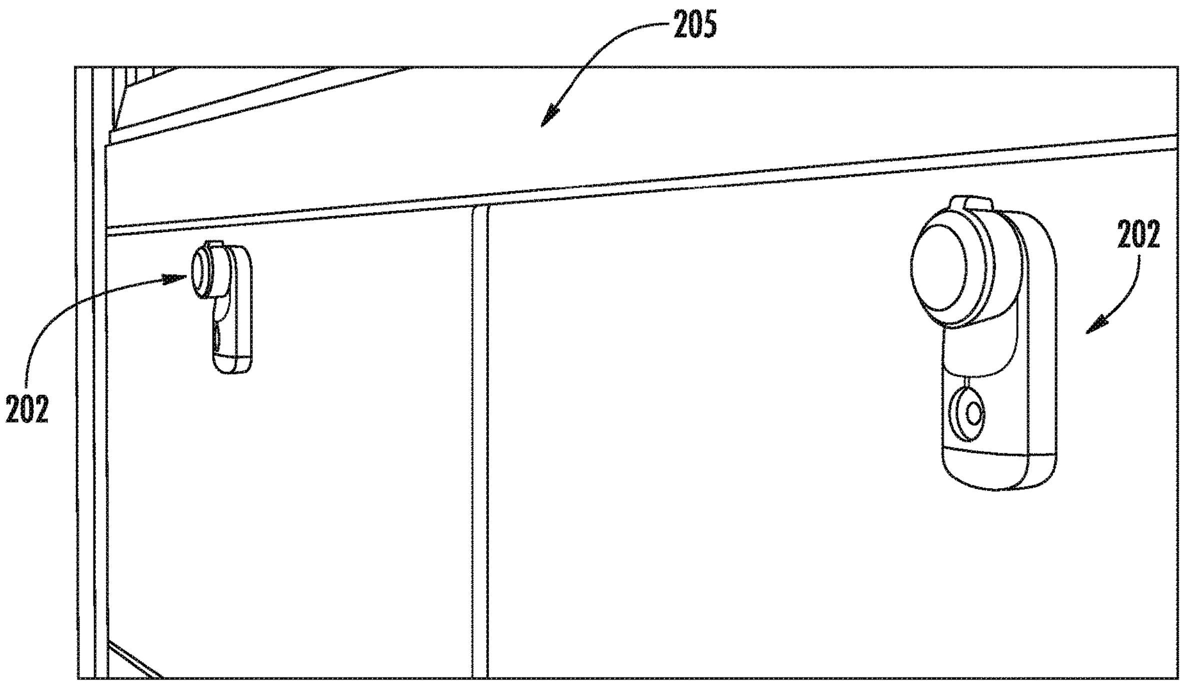
FIG. 49 is a perspective view of a fixture having locks mounted thereto according to one embodiment.

As discussed above, electronic keys 12, 120 and computing devices 26 may be configured to communicate and/or control various security devices 14. FIG. 43 illustrates embodiments of a merchandise display security system 200 include locks 202 used for locking various types of fixtures, such as cabinets and drawers. In the examples shown in FIGS. 43 and 47, locks 202 may be used to secure sliding glass doors and drawers (see also FIGS. 48-49). The system 10 may include various wireless functionality for communication between the locks 202, computing devices 26, hubs or gateways, electronic keys 12, 120, and/or remote devices. For instance, FIG. 44 illustrates that a retail store may include wireless communication circuitry in the form of a wireless router or other like hub 24 may facilitate Wi-Fi communication, although other forms of communication could be used such as cellular. The hub 24 may be used to facilitate communication between the computing devices 26 and one or more remote devices. In some cases, the electronic keys 120 may be configured to communicate with the one or more remote devices as well via the hub 24. Communication between the computing devices 26 and one or more remote devices may be used to assigning authorization to the various computing devices and/or communicating various types of data such as the types of data disclosed above.

Computing devices 26 may include wireless communications circuitry configured for BLE, Bluetooth, and/or NFC communication. The computing devices 26 may also or alternatively include a camera or a scanner for scanning images or information from the locks 202 as discussed in further detail below. Similarly, the locks 202 may include various wireless communications circuitry configured for BLE, Bluetooth, and/or NFC communication. The locks 202 may also or alternatively include a barcode or other identifier. In some cases, the computing devices 26 may be configured to be paired with one or more locks 202 (e.g., via Bluetooth communication) and/or include one or more additional communication protocols for operating the lock (e.g., NFC, camera, barcode, etc.).

In one example embodiment, the computing devices 26 are configured to communicate with one or more locks 202 using a first communication protocol (e.g., Bluetooth). In order to unlock a specific lock, the computing device 26 may further be configured to communicate with each lock using a second communication protocol (e.g., NFC or image scanning) The second communication protocol may be used to identify a specific lock 202 that the computing device 26 is authorized to unlock. For instance, an NFC tag may have an identifier that is unique to the lock 202 (similar to a serial number), and if the computing device 26 confirms that the identifiers match, then the computing device is authorized to unlock the lock. If the computing device 26 is authorized based on confirmation of identification of the lock 202, the computing device may then communicate an unlock command to the lock using the first communication protocol.

Figure 45A:
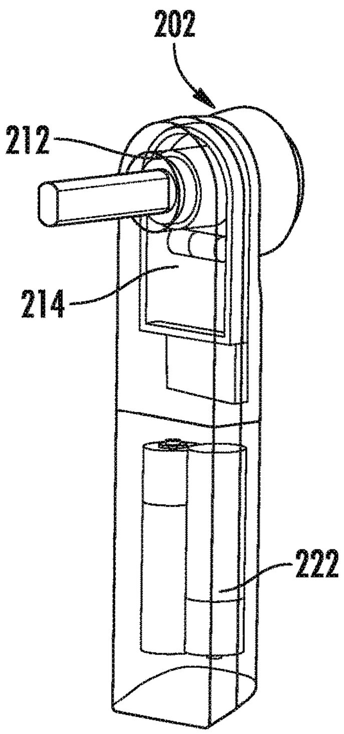
FIGS. 45A-C illustrate internal can cross-sectional views of a lock according to one embodiment.
Figure 45B:
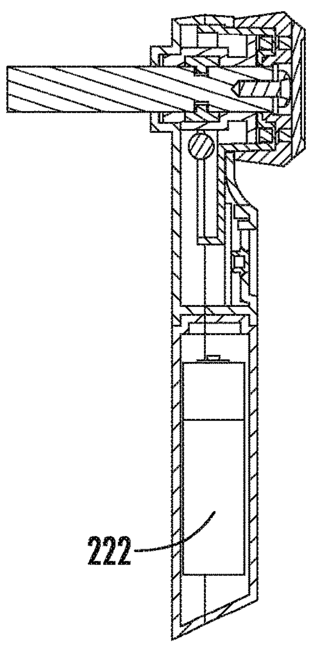
Figure 45C:
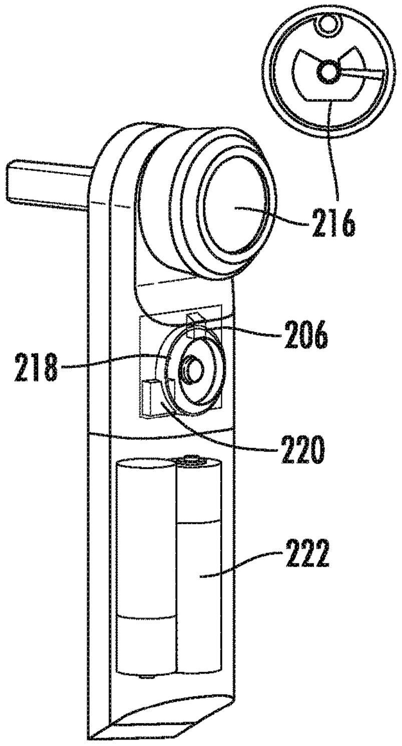
Figure 46A:
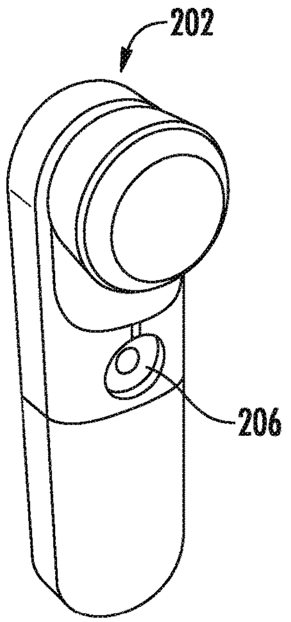
FIG. 46A-B are perspective views of different locks according to additional embodiments.
Figure 46B:
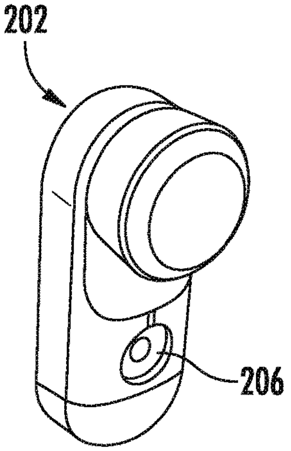
Figure 50A:
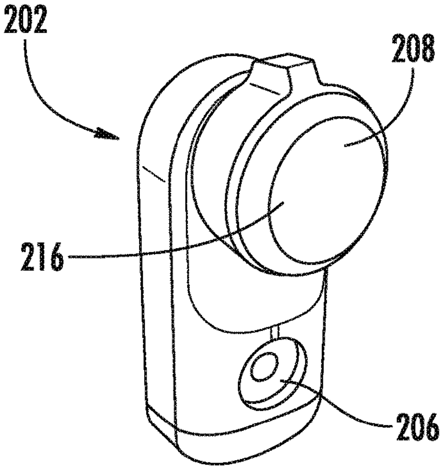
FIGS. 50A-B are perspective views of different locks according to additional embodiments.
Figure 50B:
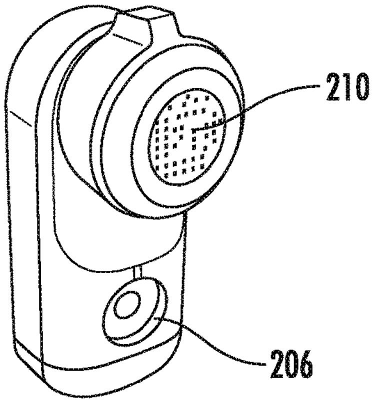

The locks 202 may take many different forms and configurations. The locks 202 may include various types of lock assemblies for different applications, such a plunger lock for sliding cabinet doors or a cam lock for drawers. FIG. 45 shows one embodiment of a lock 202, where the lock includes a lock assembly, a drive assembly, an NFC tag, a transfer port with an IR transceiver, an inductive coil, a PCBA 214 with a Bluetooth module, and an internal power source (e.g., batteries). Moreover, FIG. 46 shows that the locks 202 may have different shapes depending on the application. For instance, some locks 202 may or may not include an internal power source, thereby affecting the size of the lock. In some applications, the internal power source may be external to the lock 202, such as for a drawer where the lock may be positioned on the front of the drawer and the internal power source may be positioned inside the drawer and in electrical communication with the lock. In one embodiment further illustrated in FIG. 50, the lock 202 may include an NFC tag 204 and a transfer port 206, where the transfer port is similar to that described above for communication with an electronic key 12, 120. The NFC tag 204 may be positioned behind a cover 208 that masks or otherwise conceals the NFC tag. For instance, the cover may be plastic with a spun metal effect. In another example, the lock 202 may include a 2D barcode 210. The lock 202 may include a removable cover 208 that is configured to conceal the NFC tag 204, barcode 210, or like identifier and to be removed for communication with a computing device 26.

Figure 51:
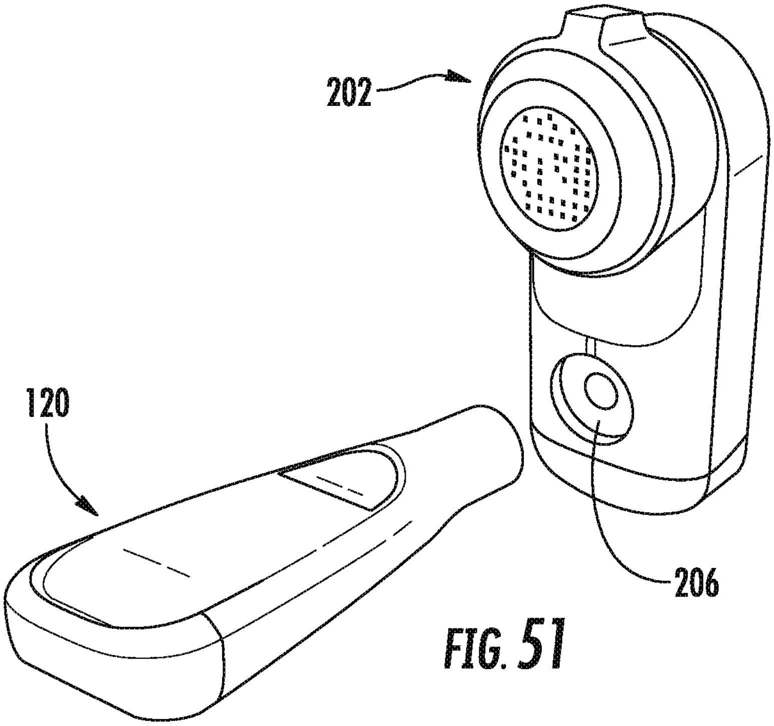
FIG. 51 is a perspective view of a lock and an electronic key according to one embodiment.
Figure 52A:
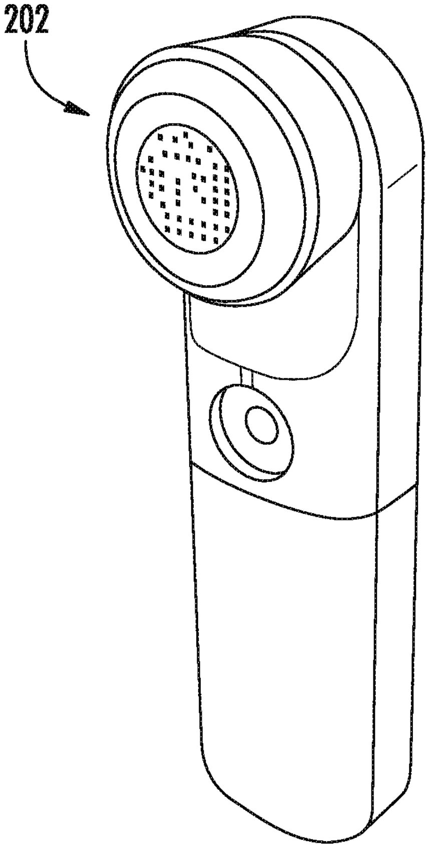
FIGS. 52A-B are perspective views of a lock having a modular component according to one embodiment.
Figure 52B:
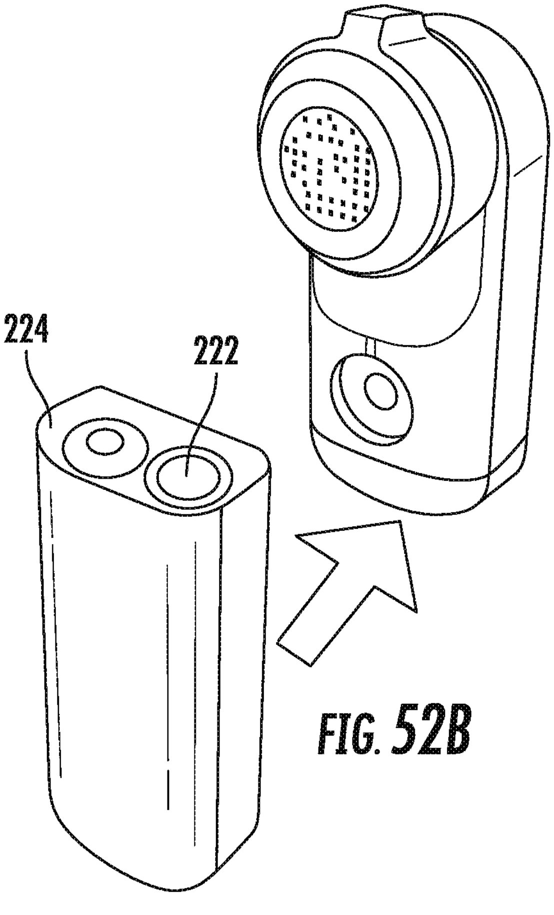

As noted above, the lock 202 may be configured to communicate with an electronic key 120 for unlocking the lock. FIG. 51 shows an example of a key 120 communicating with the lock 202 via the transfer port 206. The key 120 may be used in addition or alternatively to using a computing device 26 to unlock the lock. In the instance where the power source of the lock 202 is no longer capable of unlocking the lock (e.g., the batteries are depleted), the key 120 may be configured to transfer power to the lock for operating the lock, as disclosed above. In another embodiment, FIG. 52 shows that the internal power source may be a modular component 212 such that the power source may be replaced with another power source, such as in the form of a removable battery pack having a housing containing one or more batteries. In other cases, the removable battery pack may be removed and replaced with a cover if the internal power source is no longer needed or the lock is being used for a different application. Thus, embodiments of the present invention enable operation of the locks 202 even if the internal power source is incapable of unlocking the lock.

In some embodiments, the modularity of the power source (e.g., battery pack) may be dependent or independent of the operation of the lock 202. In this regard, theft of the power source may be problematic if it hinders the operation of the lock 202. In one example, the locking mechanism used to unlock the lock 202 may be dependent on a mechanism for accessing the internal power source. Thus, a user would need to use a computing device 26 or electronic key 120 to access the internal power source. The lock 202 may be required to be in an unlocked state before the internal power source may be accessed thereby requiring an authorized user to be present before being able to access the internal power source. In other embodiments, a second lock mechanism that is independent of the locking mechanism of the lock 202 may be employed for accessing the internal power source. The second lock mechanism may be configured to be operated by a computing device 26, electronic key 120, and/or other type of key. For example, a mechanical lock mechanism may be operable using a magnetic key or tool configured to unlock the lock mechanism for releasing or accessing the internal power source. In some cases, different user access levels may be used such that only certain users are authorized to unlock the second lock mechanism for accessing the internal power source (e.g., a manager may be assigned access privileges for such access but a retail associate is not). Such access levels could be used when assigning access privileges as disclosed above.

Figure 53A:
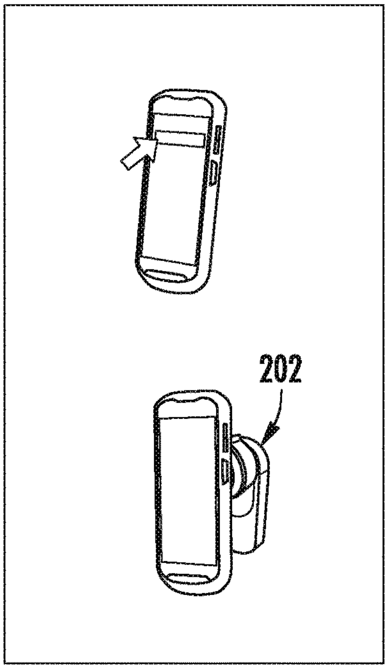
FIG. 53A-C illustrate the operation of various locks according to additional embodiments.
Figure 53B:
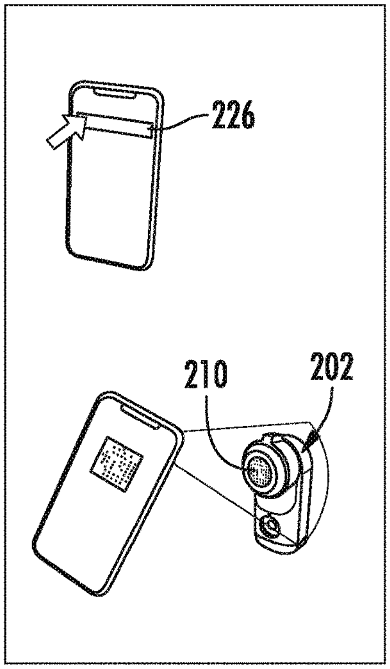
Figure 53C:
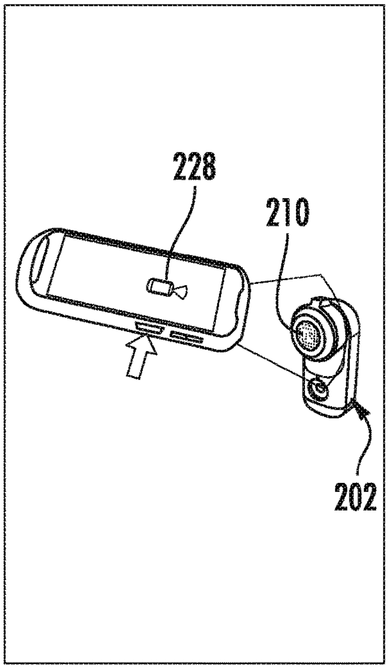

In operation, FIG. 53 shows an example of a user using a computing device 26 to unlock a lock using NFC communication where the user places the computing device in close proximity to the NFC tag 204 which results in automatically unlocking the lock. FIG. 53 also shows that a user may use a camera or scanner of a computing device 26 to scan a barcode 210 for unlocking the lock. Consumers or store associates may use the camera of the computing device 26 to unlock the lock 202, whereas only a store associate may be authorized to use a scanner of a computing device 26. The computing device 26 may include a software application that facilitates communication with the locks in any of the above examples, such as by allowing a user to select an "unlock" command for unlocking the lock 202 if the user is authorized to do so. Authorization may be accomplished in various ways, such as via the embodiments described above (e.g., assignment of particular locks or zones). In other cases, the user may be authorized by virtue of being pre-authorized by downloading the software application and entering various information for identifying the user. The software application may also be password protected for ensuring the user is authorized to operate the lock 202. In addition, the software application may facilitate data collection and communication to one or more remote device.

Figure 54A:
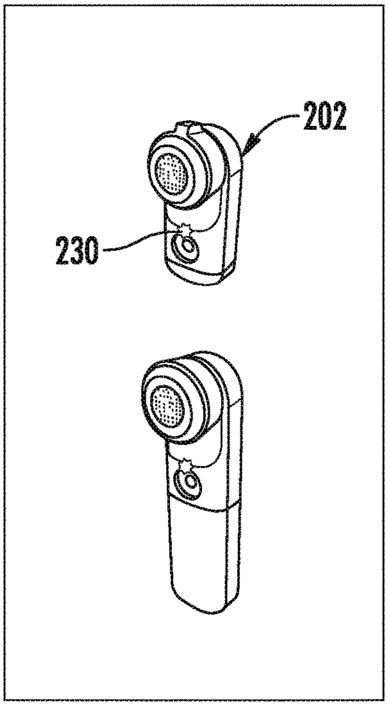
FIGS. 54A-C illustrate the operation of various locks according to additional embodiments.
Figure 54B:
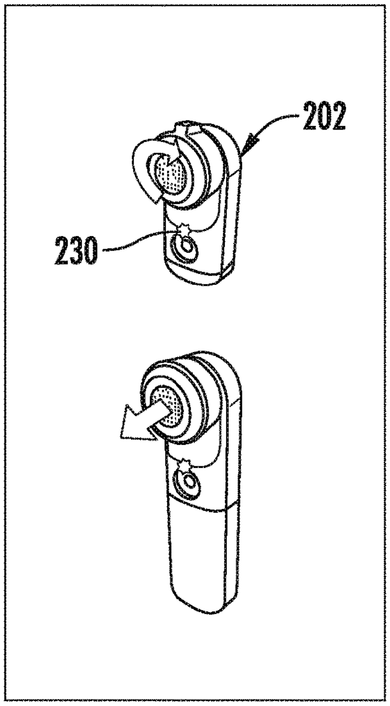
Figure 54C:
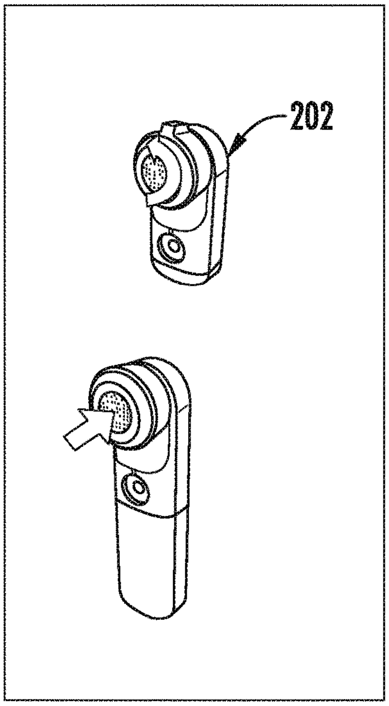

In some embodiments, the user may be required to manually unlatch the lock 202 after using a computing device 26 or electronic key 120 to unlock the lock. Following a successful unlock command from a computing device 26, FIG. 54 shows that the user may have a limited or pre-determined amount of time in which to unlatch the lock 202. For instance, the lock 202 may include a visible indicator (e.g., an LED) that illuminates or flashes different colors of frequencies depending on whether the lock 202 is capable of being unlatched or not. If the user chooses to unlatch the lock 202 after a successful unlocking command, the lock may be configured to be manually unlatched, such as by rotating or pulling a portion of the lock. For example, if the lock 202 is a cam style lock, the user may be able to rotate a knob for unlatching the lock, whereas if the lock is a plunger style lock, the user may be able to pull the know for unlatching the lock. The lock 202 may be configured to automatically relock itself after a predetermined period time. Moreover, the user may be required to manually relatch the lock 202. In some cases, the user may be required to rotate or push the knob of the lock 202 in an opposite direction to relatch that was used to unlatch the lock. If the user prematurely relatches the lock 202, the user may be required to first unlock the lock the lock to again relatch the lock when the fixture is in its fully closed position. It is understood that the lock 202 may include various actuators for unlatching the lock, such as knobs, handles, etc. that may be used to manually unlatch and relatch the lock. In other embodiments, a separate latching operation may be omitted, such as where the user is able to open the door without having to unlatch a latch mechanism.

Figure 55:
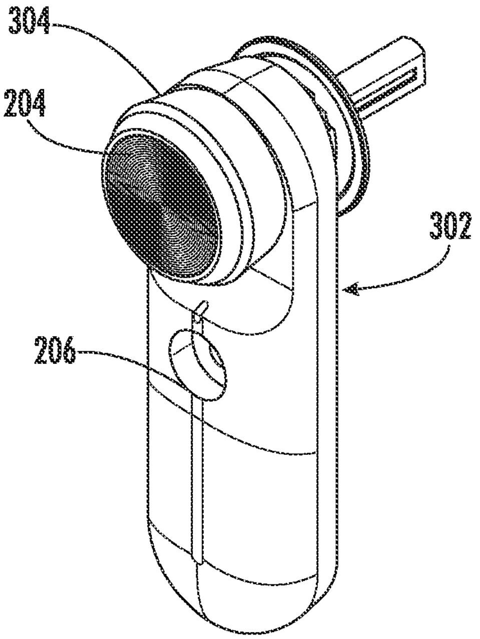
FIG. 55 is a perspective view of a lock according to one embodiment of the present invention.
Figure 56:
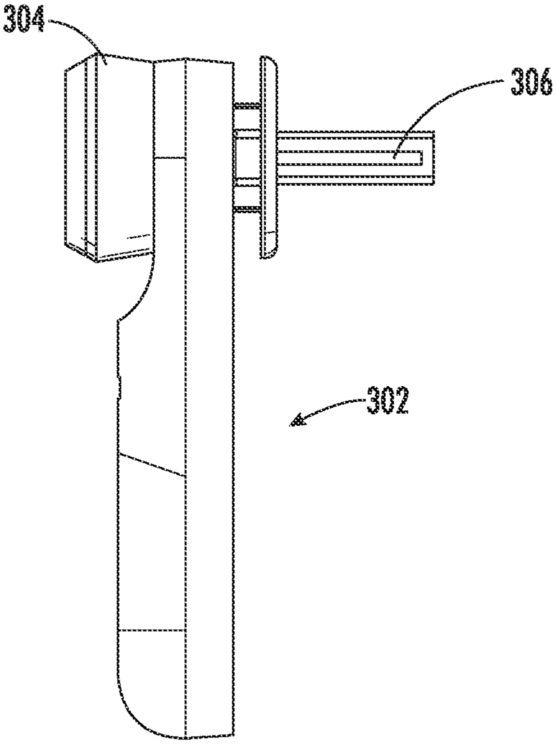
FIG. 56 is a side view of the lock shown in FIG. 55.

FIGS. 55-56 illustrate a lock 302 according to one embodiment of the present invention. In this embodiment, the lock 302 may be a plunger lock configured for use with a fixture such as a sliding door. For example, unlocking of the lock 302 allows unlatching of a plunger pin 306 in engagement with the fixture to thereby allow access to the fixture (e.g., sliding a door open). Similar to the embodiments discussed above, the lock 302 may be configured to communicate with various computing devices 26, hubs or gateways, electronic keys 12, 120, and/or remote devices. Moreover, the lock 302 may include a NFC tag 204, barcode 210, or like identifier for communication with a computing device 26, and/or a transfer port 206 for communication with an electronic key 12, 120. In this embodiment, a knob 304 may be configured to be pushed and pulled axially by a user between latched and unlatched positions, although other manual motions could be employed such as rotation of the knob. In other embodiments, the plunger pin 306 may be configured to move automatically without manual actuation. The knob 304 may be coupled to the plunger pin 306 that is configured to be manually moved between latched and unlatched positions relative to a fixture.

Figure 57:
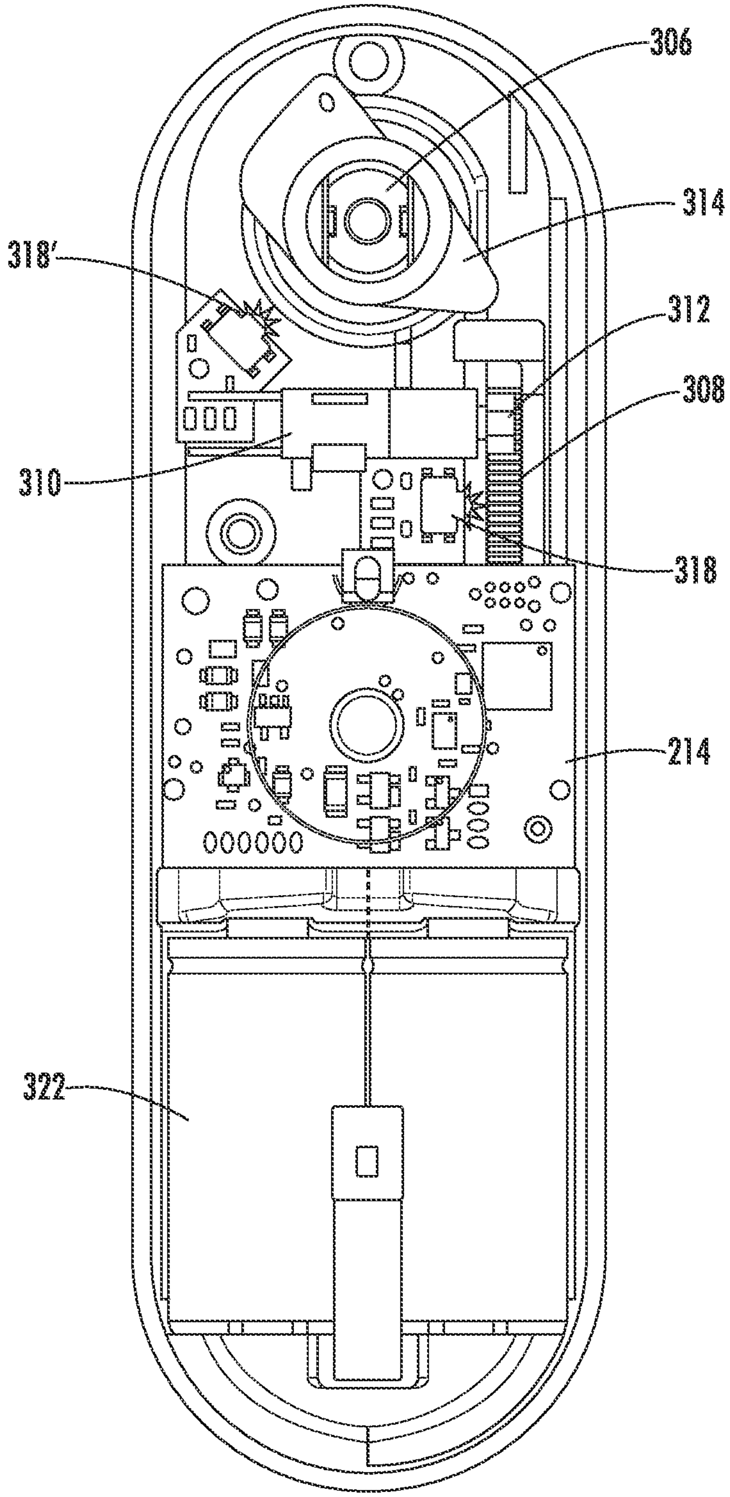
FIG. 57 is an internal elevation view of the lock shown in FIG. 55.
Figure 58:
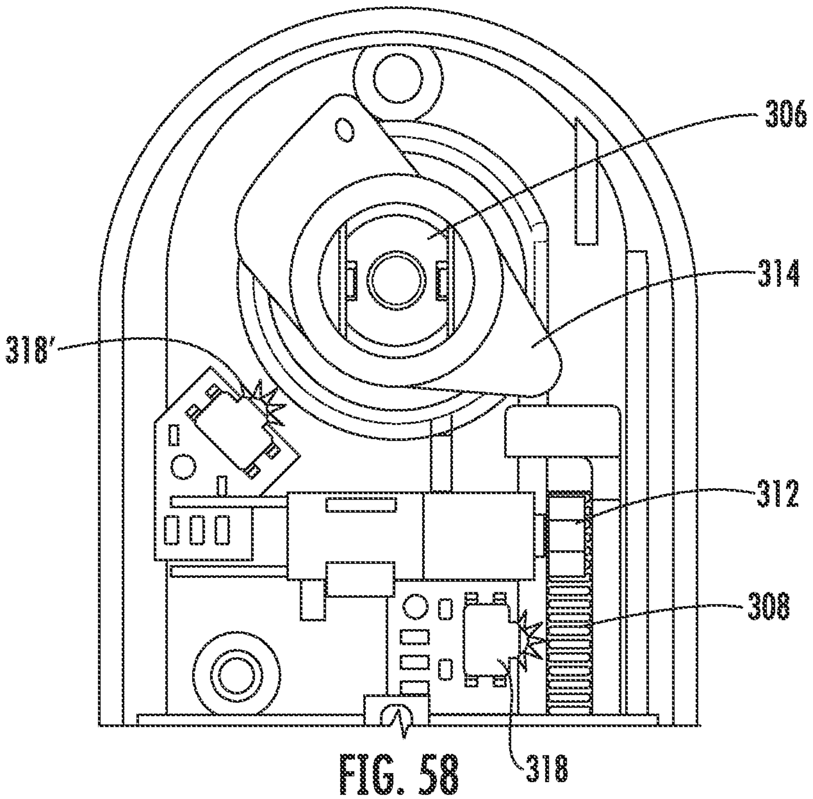
FIG. 58 is another internal elevation view of the lock shown in FIG. 55.

FIGS. 57-58 show embodiments of internal views of the lock 302 with the top housing of the lock removed for purposes of illustration. The lock 302 includes a rack gear 308 that is operably engaged with a motor 310 and a pinion gear 312. Thus, energizing the motor 310 causes the pinion gear 312 to rotate which in turn causes the rack 308 to move linearly to move the cam 314. The cam 314 may be configured to rotate when contacted by the rack gear 308. Thus, movement of the rack gear 308 in one direction will cause the cam to rotate in a first direction (e.g., counterclockwise), while movement of the rack gear 308 in an opposite direction will cause the cam to rotate in a second opposite direction (e.g., clockwise). The cam 314 may be biased to rotate in one direction in some cases, such as biased towards a locked state relative to the plunger pin 306 with a spring(s) (e.g., a torsion spring). The rotational axis of the cam 314 may be co-axial to the longitudinal axis of the plunger pin 306. In some cases, the cam 314 may define an opening for receiving and surrounding the plunger pin 306.

Figure 59:
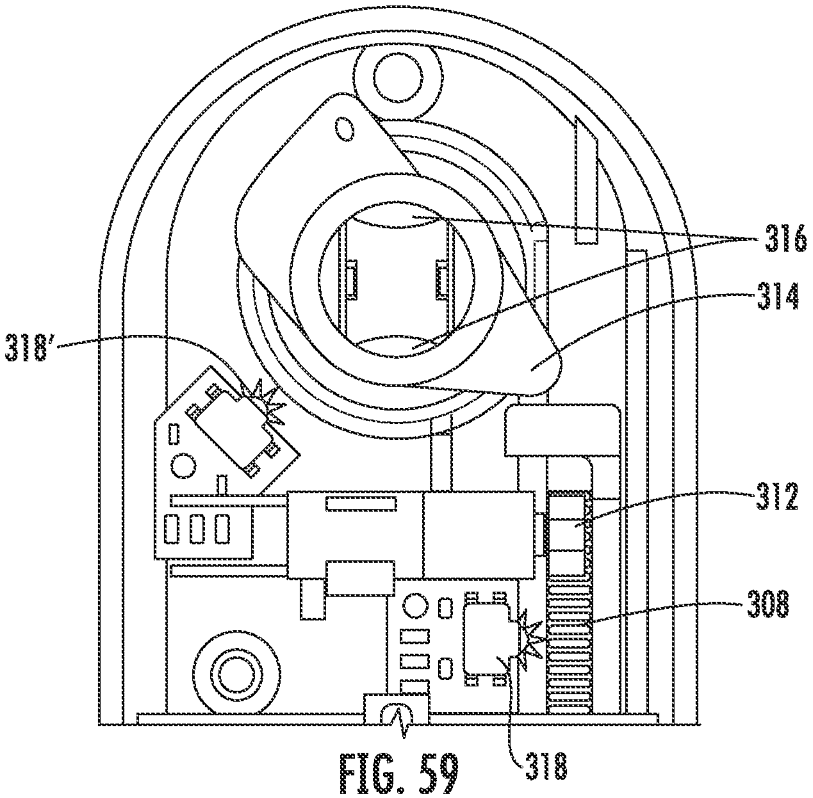
FIG. 59 is another internal elevation view of the lock shown in FIG. 55.
Figure 60:
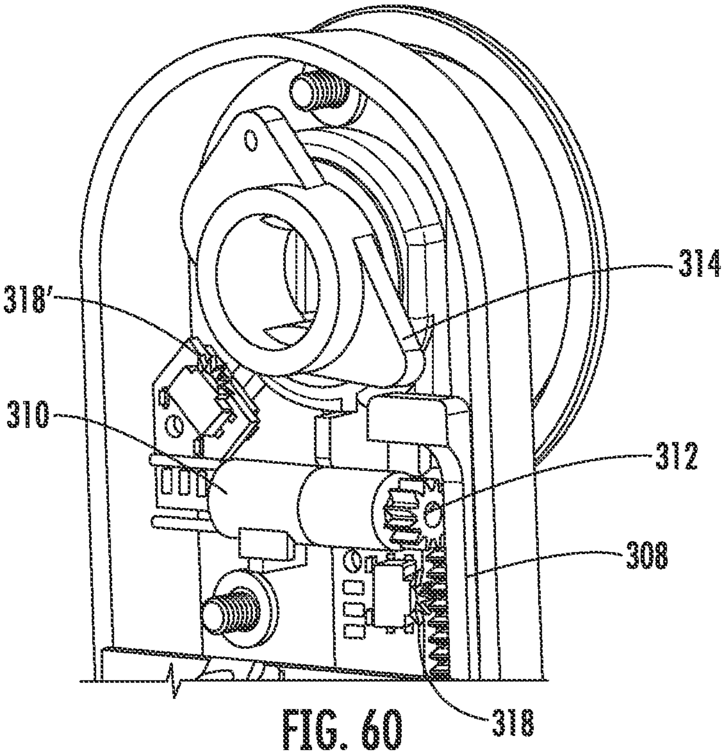
FIG. 60 is an internal perspective view of the lock shown in FIG. 55.
Figure 61:
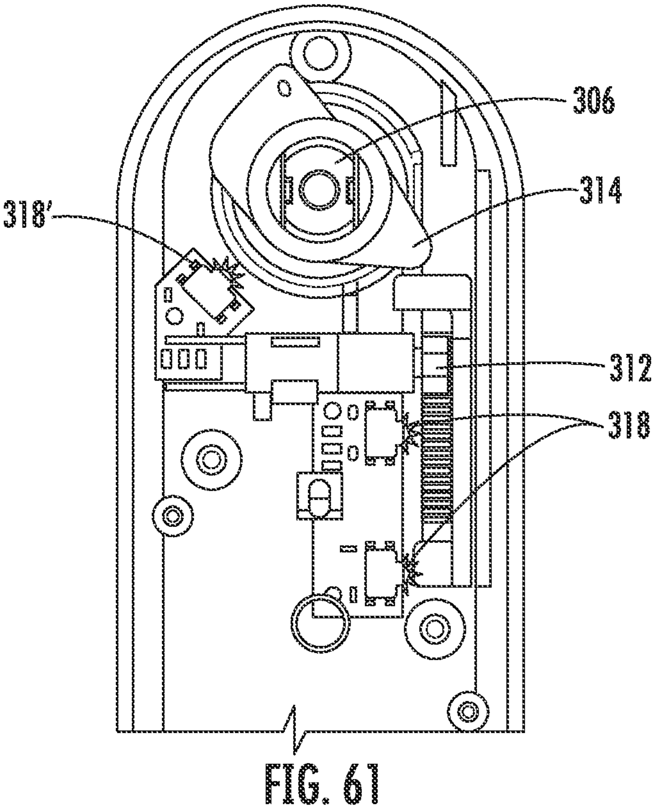
FIG. 61 is another internal elevation view of the lock shown in FIG. 55.
Figure 62:
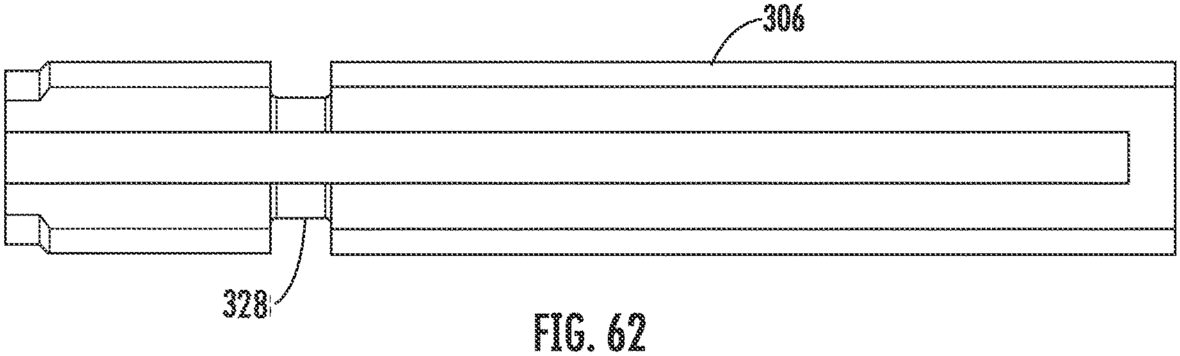
FIG. 62 is an elevation view of a plunger pin according to one embodiment.
Figure 63:
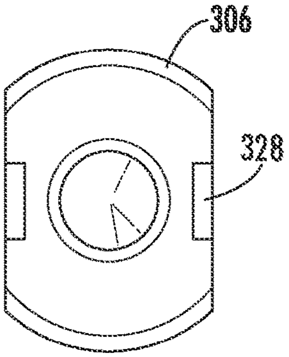
FIG. 63 is an end view of the plunger pin shown in FIG. 62.
Figure 64:
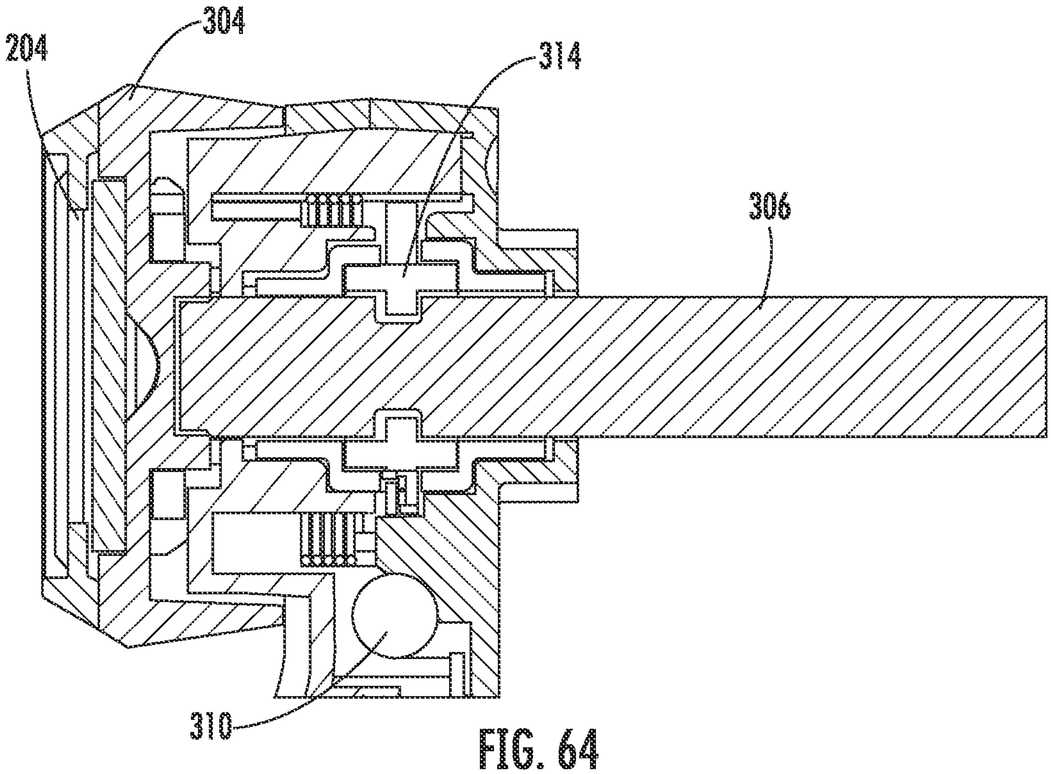
FIG. 64 is a side cross-sectional view of the lock shown in FIG. 55.

The cam 314 may include one or more engagement members 316 configured to move between locked and unlocked states relative to the plunger pin 306 in response to rotation of the cam. In the illustrated example shown in FIG. 59 (the plunger pin 306 has been removed for illustration purposes), the cam 314 may include a pair of engagement members 316 positioned radially opposite one another. The engagement members 316 may be defined on in inner surface of the cam 314. The plunger pin 306 may include one or more corresponding engagement members 328 configured to mate with and engage the engagement members 316 of the cam 314 when in the locked state. Thus, in the locked state, the knob 304 is incapable of moving the plunger pin 306. As shown in FIGS. 62-63, the plunger pin 306 may include a pair of engagement members 328 in the form of slots defined radially opposite one another. In some cases, the engagement members 328 are defined on an outer surface of the plunger pin 306.

In some cases, an authorized user of a computing device 26 or electronic key 12, 120 may communicate with the lock 302 for moving the engagement members 316 to an unlocked state thereby disengaging the engagement members 328 of the plunger pin 306. Thus, rotation of the pinion gear 312 causes movement of the rack 308, which in turn causes the cam 314 to rotate, which then causes the engagement members 316 to move out of engagement with the engagement members 328 of the plunger pin 306 to an unlocked state. A user is then capable of pulling the knob 304 axially to unlatch the plunger pin 306 from the fixture to thereby allow the fixture to be opened and accessed. To relatch the plunger pin 306, the user may push the knob 304 axially in an opposite direction to re-engage the plunger pin with the fixture, and the cam 314 may be configured to re-engage the plunger pin, such as by being biased towards the locked state. Thus, in some cases, the engagement members 316 may be configured to automatically engage the plunger pin 306 when the plunger pin is moved from the unlatched position to the latched position.

Figure 65:
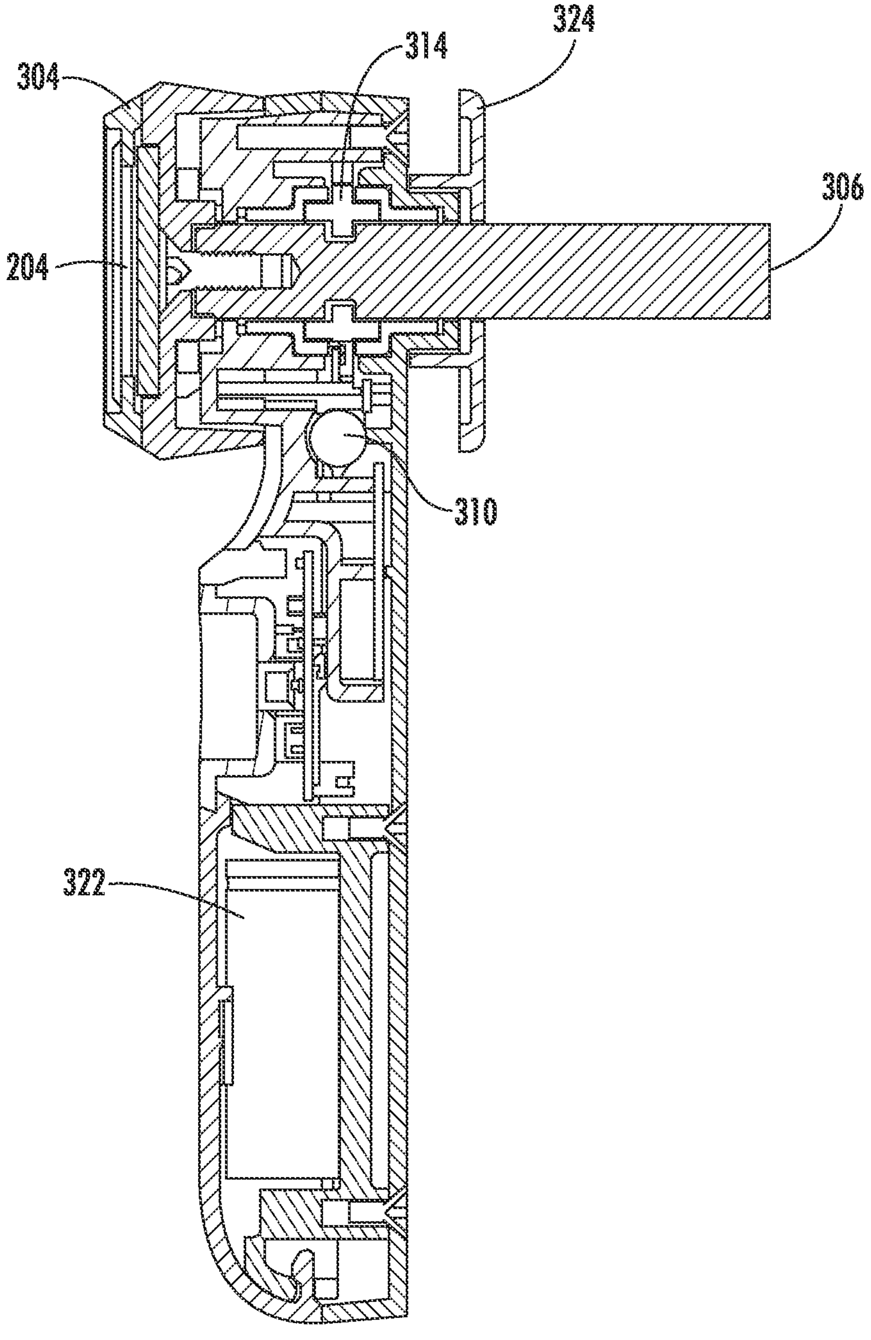
FIG. 65 is a side cross-sectional view of the lock shown in FIG. 55.

In some embodiments, the lock 302 may further include one or more switches 318 that is configured to be engaged and disengaged in response to movement of the rack 308 for signaling the motor 310 to turn on or off. In this way, the motor 310 may turn on when an authorized computing device 26 or electronic key 12, 120 is presented and turn off when the rack 308 has moved a predetermined distance sufficient to disengage the engagement members 316 from the plunger pin 306. The lock 302 may further include a switch 318' that is configured to provide a signal that the lock is in an unlocked state and/or a locked state, which may be based on movement of the rack 308. This data may be reported to the computing device 26, electronic key 12, 120, and/or a remote device. Similar to embodiments discussed above, the lock 302 may include a power source 322, which may be housed within a modular component 212 in some cases (see, e.g., FIG. 65).

With respect to installation, the lock 302 may include a removable back plate 324 in some embodiments. The back plate 324 may allow for installation of the lock 302 to a fixture, such as a sliding door. A portion of the lock 302 may be configured to be positioned through an opening defined in the fixture, and the back plate may be configured to be attached to the rear of the lock housing (e.g., with adhesive, screws, washers, and/or nuts) to thereby sandwich a portion of the fixture between the lock housing and the back plate. The back plate 324 may include an opening for receiving the plunger pin 306 therethrough. The end of the plunger pin 306 may be configured to engage and disengage the fixture, such as within an opening sized and configured to receive the plunger pin. Thus, when the plunger pin 306 is retracted from the fixture, the fixture may be capable of being opened (e.g., slid to an open position to access an item).

The foregoing has described one or more exemplary embodiments of various security systems. Embodiments of a security system have been shown and described herein for purposes of illustrating and enabling one of ordinary skill in the art to make, use and practice the invention. Those of ordinary skill in the art, however, will readily understand and appreciate that numerous variations and modifications of the invention may be made without departing from the spirit and scope thereof. Accordingly, all such variations and modifications are intended to be encompassed by the appended claims.

That which is claimed is:

1. A security system for a fixture comprising:

at least one lock configured to protect one or more items from theft from the fixture, the fixture configured to be moved between an open position in which the one or more items are accessible and a closed position in which the one or more items are inaccessible, wherein the lock comprises a plunger pin configured to be moved between a latched position and an unlatched position, the fixture configured to be in engagement with the plunger pin in the latched position and to be disengaged from the plunger pin in the unlatched position, wherein the lock comprises a cam configured to be moved between a locked state and an unlocked state, in the locked state the plunger pin being in engagement with the fixture and unable to be moved to the unlatched position, in the unlocked state the plunger pin configured to be in engagement with the fixture when the fixture is in the closed position, the plunger pin configured to be moved from the latched position to the unlatched position when in the unlocked state such that the fixture is configured to be moved to the open position, wherein the cam is configured to be moved in response to receiving a wireless authorization signal to transition the lock from the locked state the unlocked state.

2. The security system of claim 1, further comprising a computing device configured to transmit the wireless authorization signal to the lock to transition the lock between the locked state and the unlocked state.

3. The security system of claim 1, further comprising an electronic key configured to transmit the wireless authorization signal to the lock to transition between the locked state and the unlocked state.

4. The security system of claim 1, wherein the cam is configured to rotate about an axis, and wherein the plunger pin is configured to be moved axially along the axis between the latched position and the unlatched position.

5. The security system of claim 1, wherein the cam is configured to be rotated to transition between the locked state and the unlocked state.

6. The security system of claim 1, wherein the cam comprises at least one engagement member configured to be moved into and out of engagement with the plunger pin in response to movement of the cam, the plunger pin being in the locked state when the at least one engagement member is engaged with the plunger pin and in the unlocked state when the at least one engagement member is disengaged from the plunger pin.

7. The security system of claim 6, wherein the at least one engagement member is configured to automatically engage the plunger pin in the locked state when the plunger pin is moved from the unlatched position to the latched position.

8. The security system of claim 6, wherein the cam comprises a plurality of engagement members.

9. The security system of claim 8, wherein the plurality of engagement members are positioned radially opposite one another.

10. The security system of claim 6, wherein the plunger pin comprises at least one engagement member configured to engage the at least one engagement member of the cam.

11. The security system of claim 10, wherein the at least one engagement member of the plunger pin is defined on an outer surface thereof.

12. The security system of claim 10, wherein the at least one engagement member of the plunger pin is a slot.

13. The security system of claim 1, wherein the cam includes an opening configured to receive and surround the plunger pin.

14. The security system of claim 1, wherein the cam is co-axial to the plunger pin.

15. The security system of claim 1, wherein the lock further comprises a rack and a pinion gear, and wherein the rack is configured to engage the cam for moving the cam.

16. The security system of claim 15, further comprising a switch configured to provide a signal that the lock is in the unlocked state or the locked state in response to movement of the rack.

17. The security system of claim 15, further comprising a motor operably engaged with the pinion gear and configured to move the rack when activated.

18. The security system of claim 17, further comprising one or more switches that is configured to be engaged and disengaged in response to movement of the rack for signaling the motor to activate or deactivate.

19. The security system of claim 1, wherein the lock further comprises a knob coupled to the plunger pin and configured to be manually actuated for moving the plunger pin between the latched position and the unlatched position.

20. The security system of claim 1, wherein the lock does not have an internal power source.

21. The security system of claim 1, wherein the lock includes an internal power source.

22. The security system of claim 21, wherein the lock comprises a housing containing an internal power source, and wherein the housing is modular and configured to be attached and detached from the lock.

23. The security system of claim 1, further comprising a back plate configured to be engaged by the plunger pin in the latched position, the lock and the back plate configured to be mounted to the fixture on opposite sides of one another.

24. The security system of claim 1, wherein the lock is configured to be mounted to an outer surface of the fixture, and wherein the plunger pin is configured to extend through an opening defined in the fixture to an inner surface of the fixture, opposite the outer surface, in the latched position.

25. The security system of claim 1, wherein the plunger pin is configured to be moved from the unlatched position to the latched position and into engagement with the fixture.

26. A security system for a fixture comprising:

at least one lock configured to protect one or more items from theft from the fixture; and a computing device, wherein the lock comprises a plunger pin configured to be moved between a latched position and an unlatched position, the fixture configured to be in engagement with the plunger pin in the latched position and to be accessed in the unlatched position, wherein the lock comprises a cam configured to be rotated about an axis between a locked state and an unlocked state, the plunger pin being unable to be moved to the unlatched position when in the locked state, the plunger pin configured to be moved axially along the axis from the latched position to the unlatched position and out of engagement with the fixture when in the unlocked state, wherein the cam is configured to be rotated in response to receiving a wireless authorization signal from the computing device to transition the lock from the locked state to the unlocked state.

27. The security system of claim 26, further comprising an electronic key configured to transmit the wireless authorization signal to the lock to transition the lock between the locked state and the unlocked state.

28. The security system of claim 26, wherein the lock further comprises a rack and a pinion gear, and wherein the rack is configured to engage the cam for moving the cam.

29. The security system of claim 28, further comprising a motor operably engaged with the pinion gear and configured to move the rack when activated.

30. The security system of claim 26, wherein the cam comprises at least one engagement member configured to be moved into and out of engagement with the plunger pin in response to movement of the cam, the plunger pin being in the locked state when the at least one engagement member is engaged with the plunger pin and in the unlocked state when the at least one engagement member is disengaged from the plunger pin.

31. The security system of claim 30, wherein the at least one engagement member is configured to automatically engage the plunger pin in the locked state when the plunger pin is moved from the unlatched position to the latched position.

32. The security system of claim 26, wherein the cam includes an opening configured to receive and surround the plunger pin.

33. The security system of claim 26, wherein the lock further comprises a knob coupled to the plunger pin and configured to be manually actuated for moving the plunger pin between the latched position and the unlatched position.

34. The security system of claim 26, wherein the lock does not have an internal power source.

35. The security system of claim 26, wherein the lock includes an internal power source.

36. The security system of claim 26, further comprising a back plate configured to be engaged by the plunger pin in the latched position, the lock and the back plate configured to be mounted to the fixture on opposite sides of one another.

37. The security system of claim 26, wherein the lock is configured to be mounted to an outer surface of the fixture, and wherein the plunger pin is configured to extend through an opening defined in the fixture to an inner surface of the fixture, opposite the outer surface, in the latched position.

38. The security system of claim 26, wherein the plunger pin is configured to be moved from the unlatched position to the latched position and into engagement with the fixture.

39. A method for securing items from theft from a fixture, the method comprising:

mounting at least one lock to a fixture configured to protect one or more items from theft, the fixture configured to be moved between an open position in which the one or more items are accessible and a closed position in which the one or more items are inaccessible, wherein the lock comprises a cam configured to be moved between a locked state and an unlocked state and a plunger pin; and causing a wireless authorization signal to be transmitted to the lock to move the cam and thereby transition the lock from the locked state to the unlocked state;

moving the plunger pin from a latched position to an unlatched position while the lock is in the unlocked state, the fixture configured to be in engagement with the plunger pin in the latched position and to be disengaged from the plunger pin in the unlatched position, in the locked state the plunger pin being in engagement with the fixture and unable to be moved to the unlatched position, in the unlocked state the plunger pin configured to be in engagement with the fixture when the fixture is in the closed position; and moving the fixture from the closed position to the open position after moving the plunger pin to the unlatched position.

* * * * *